US012018594B2

(12) United States Patent
Sibbach et al.

(10) Patent No.: US 12,018,594 B2
(45) Date of Patent: Jun. 25, 2024

(54) PERICRITICAL FLUID SYSTEMS FOR TURBINE ENGINES

(71) Applicant: General Electric Company, Schenectady, NY (US)

(72) Inventors: Arthur William Sibbach, Boxford, MA (US); Aaron Michael Dziech, Crittenden, KY (US); Scott Alan Schimmels, Miamisburg, OH (US); Robert R. Rachedi, West Chester Township, OH (US); Jeffrey Douglas Rambo, Mason, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/462,064

(22) Filed: Sep. 6, 2023

(65) Prior Publication Data

US 2024/0011417 A1   Jan. 11, 2024

Related U.S. Application Data

(63) Continuation-in-part of application No. 17/687,960, filed on Mar. 7, 2022, now Pat. No. 11,788,474.

(51) Int. Cl.
*F02C 7/224* (2006.01)
*F01K 23/02* (2006.01)
(Continued)

(52) U.S. Cl.
CPC ............ *F01K 23/02* (2013.01); *F01K 25/103* (2013.01); *F02C 3/22* (2013.01); *F02C 3/30* (2013.01);
(Continued)

(58) Field of Classification Search
CPC .... F02C 7/224; F02C 7/18; F02C 9/18; F02C 3/22; F02C 3/30; F01K 23/02; F01K 25/103

See application file for complete search history.

(56) References Cited

U.S. PATENT DOCUMENTS 3,039,305 A    6/1962  Hall
4,756,854 A    7/1988  Wegrzyn
(Continued)

FOREIGN PATENT DOCUMENTS

CA    885178 A      11/1971
CN    1627063 A     6/2005
(Continued)

OTHER PUBLICATIONS

Drafts, Acoustic Wave Technology Sensors, Fierce Electronics, Oct. 2000, 17 Pages.
(Continued)

*Primary Examiner* — Sabbir Hasan
(74) *Attorney, Agent, or Firm* — Dority & Manning, P.A.

(57) ABSTRACT

A pericritical fluid system for a thermal management system associated with a turbine engine may include one or more sensors configured to generate sensor outputs corresponding to one or more phase properties of a pericritical fluid flowing through a cooling circuit of the thermal management system, and a controller configured to generate control commands configured to control one or more controllable components of the thermal management system based at least in part on the sensor outputs. The one or more sensors may include one or more phase detection sensors, such as an acoustic sensor.

20 Claims, 26 Drawing Sheets

(51) Int. Cl.
*F01K 25/10* (2006.01)
*F02C 3/22* (2006.01)
*F02C 3/30* (2006.01)

(52) U.S. Cl.
CPC .......... *F02C 7/224* (2013.01); *F05D 2220/31* (2013.01); *F05D 2220/32* (2013.01); *F05D 2220/72* (2013.01); *F05D 2220/74* (2013.01); *F05D 2240/36* (2013.01); *F05D 2260/213* (2013.01)

(56) References Cited

U.S. PATENT DOCUMENTS

| | | |
|---|---|---|
| 4,784,959 A | 11/1988 | Wegrzyn |
| 4,822,743 A | 4/1989 | Wegrzyn |
| 4,844,743 A | 7/1989 | Koblenzer et al. |
| 6,984,465 B2 | 1/2006 | Canepa et al. |
| 7,192,459 B2 | 3/2007 | Puri et al. |
| 7,752,885 B2 | 7/2010 | Huang |
| 7,811,688 B2 | 10/2010 | Flynn et al. |
| 7,915,047 B2 | 3/2011 | Thorn et al. |
| 8,113,708 B2 | 2/2012 | Albertson |
| 8,319,833 B2 | 11/2012 | Weinstein et al. |
| 8,394,553 B2 | 3/2013 | Flynn et al. |
| 8,470,933 B2 | 6/2013 | Thorn et al. |
| 8,778,545 B2 | 7/2014 | Lehar et al. |
| 8,858,679 B2 | 10/2014 | Buhrman et al. |
| 9,022,730 B2 | 5/2015 | Vysohlid et al. |
| 9,239,008 B2 | 1/2016 | Ekanayake et al. |
| 9,269,205 B1 | 2/2016 | Lamkin et al. |
| 9,318,757 B2 | 4/2016 | Koenig et al. |
| 9,561,856 B2 | 2/2017 | Mevenkamp et al. |
| 9,683,910 B2 | 6/2017 | Ekanayake et al. |
| 10,112,486 B2 | 10/2018 | Ban et al. |
| 10,222,291 B2 | 3/2019 | Thompson et al. |
| 10,286,336 B2 | 5/2019 | Durward |
| 10,286,408 B2 | 5/2019 | Lam et al. |
| 10,386,259 B2 | 8/2019 | Zhang et al. |
| 10,473,031 B2 | 11/2019 | Ellsworth et al. |
| 10,578,585 B1 | 3/2020 | Gerardi et al. |
| 10,584,616 B2 | 3/2020 | Moxon |
| 10,584,635 B2 | 3/2020 | Armstrong et al. |
| 10,823,066 B2 | 11/2020 | Miller et al. |
| 11,015,534 B2 * | 5/2021 | Smith ................. F02C 7/185 |
| 11,073,169 B2 | 7/2021 | Thatte |
| 11,125,165 B2 | 9/2021 | Niergarth et al. |
| 11,139,491 B2 | 10/2021 | Kwon et al. |
| 11,261,792 B2 * | 3/2022 | Niergarth ................. F02C 7/16 |
| 2006/0257094 A1 | 11/2006 | McEvoy et al. |
| 2012/0026483 A1 | 2/2012 | Messerchmidt |
| 2013/0139897 A1 | 6/2013 | Kim et al. |
| 2015/0101419 A1 | 4/2015 | Hill et al. |
| 2017/0167382 A1 | 6/2017 | Miller et al. |
| 2017/0217592 A1 | 8/2017 | Hinderliter |
| 2018/0050811 A1 | 2/2018 | Niergarth et al. |
| 2019/0003386 A1 | 1/2019 | Stapp |
| 2019/0218971 A1 | 7/2019 | Niergarth et al. |
| 2020/0340881 A1 | 10/2020 | Hattori |
| 2020/0348662 A1 | 11/2020 | Cella et al. |
| 2021/0148283 A1 | 5/2021 | Niergarth et al. |

FOREIGN PATENT DOCUMENTS

| | | |
|---|---|---|
| CN | 200990131 Y | 12/2007 |
| EP | 3805107 A1 | 4/2021 |
| JP | 2014025741 A | 2/2014 |
| WO | WO2011119338 A1 | 9/2011 |

OTHER PUBLICATIONS

Ke et al., Detecting Phase Transitions in Supercritical Mixtures: An Enabling Tool for Greener Chemical Reactions, Proceedings of the Royal Society A, vol. 466, 2010, pp. 2799-2812.

Ke et al., The Phase Equilibrium and Density Studies of the Ternary Mixtures of CO2 + Ar + N2 and CO2 + Ar + H2, Systems Relevance to CCS Technology, International Journal of Greenhouse Gas Control, vol. 56, Jan. 2017, pp. 55-56.

Fandino et al., Phase Behavior of (CO2 + H2) and (CO2 + N2) at Temperatures Between (218.15 and 303.15) K at Pressures up to 15 MPa, International Journal of Greenhouse Gas Control, vol. 36, May 2015, 39 Pages.

Fehrm, Bjorn's Corner: The Challenges of Hydrogen. Part 29. Gas Turbine Heat Management, Mar. 19, 2021, 3 Pages. Accessed on-line at: https://leehamnews.com/2021/03/19/bjorns-corner-the-challenges-of-hydrogen-part-29-gas-turbine-heat-management/.

Gonzalez-Portillo, A New Concept in Thermal Engineering Optimization: The Pericritical Cycle with Multi-Heating and Its Application to Concentrating Solar Power, Sep. 2019, 233 Pages. (Abstract Only) Retrieved Mar. 7, 2022 from Weblink: https://oa.upm.es/56492/.

Goos et al., Phase Diagrams of CO2 and CO2—N2 Gas Mixtures and Their Application in Compression Processes, Energy Procedia, vol. 4, 2011, pp. 3778-3785.

Javed et al., Thermodynamic Speed of Sound Data for Liquid and Supercritical Alcohols, Journal of Chemical & Engineering Data, vol. 64, No. 3, 2019, pp. 1035-1044.

Legoix et al., Phase Equilibria of the CH4—CO2 Binary and the CH4—CO2—H2O Ternary Mixtures in the Presence of a CO2-Rich Liquid Phase, 10122034, Energies, vol. 10, 2017, 11 Pages.

Oag et al., Probing the Vapor-Liquid Phase Behaviors of Near-Critical and Supercritical Fluids Using a Shear Mode Piezoelectric Sensor, Analytical Chemistry, vol. 75, No. 3, Feb. 1, 2003, p. 479-485.

Park et al., Measurements of Density and Sound Speed in Mixtures Relevant to Supercritical CO2 Cycles, Journal of Energy Resources Technology, vol. 142, Oct. 2020, 7 Pages.

Wetenhall et al., The Effect of CO2 Purity on the Development of Pipeline Networks for Carbon Capture and Storage Schemes, International Journal of Greenhouse Gas Control, vol. 30, 2014, pp. 197-211.

* cited by examiner

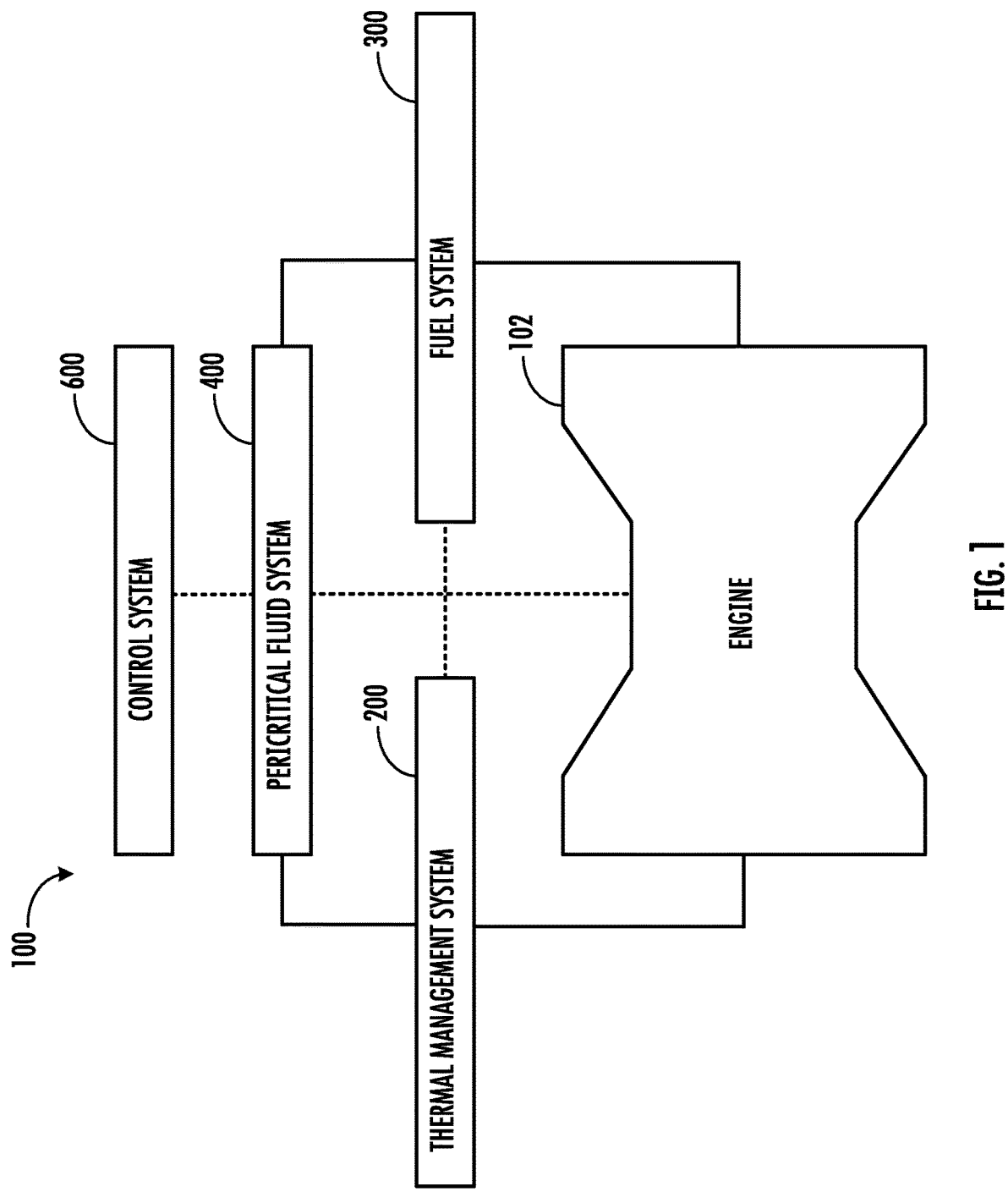

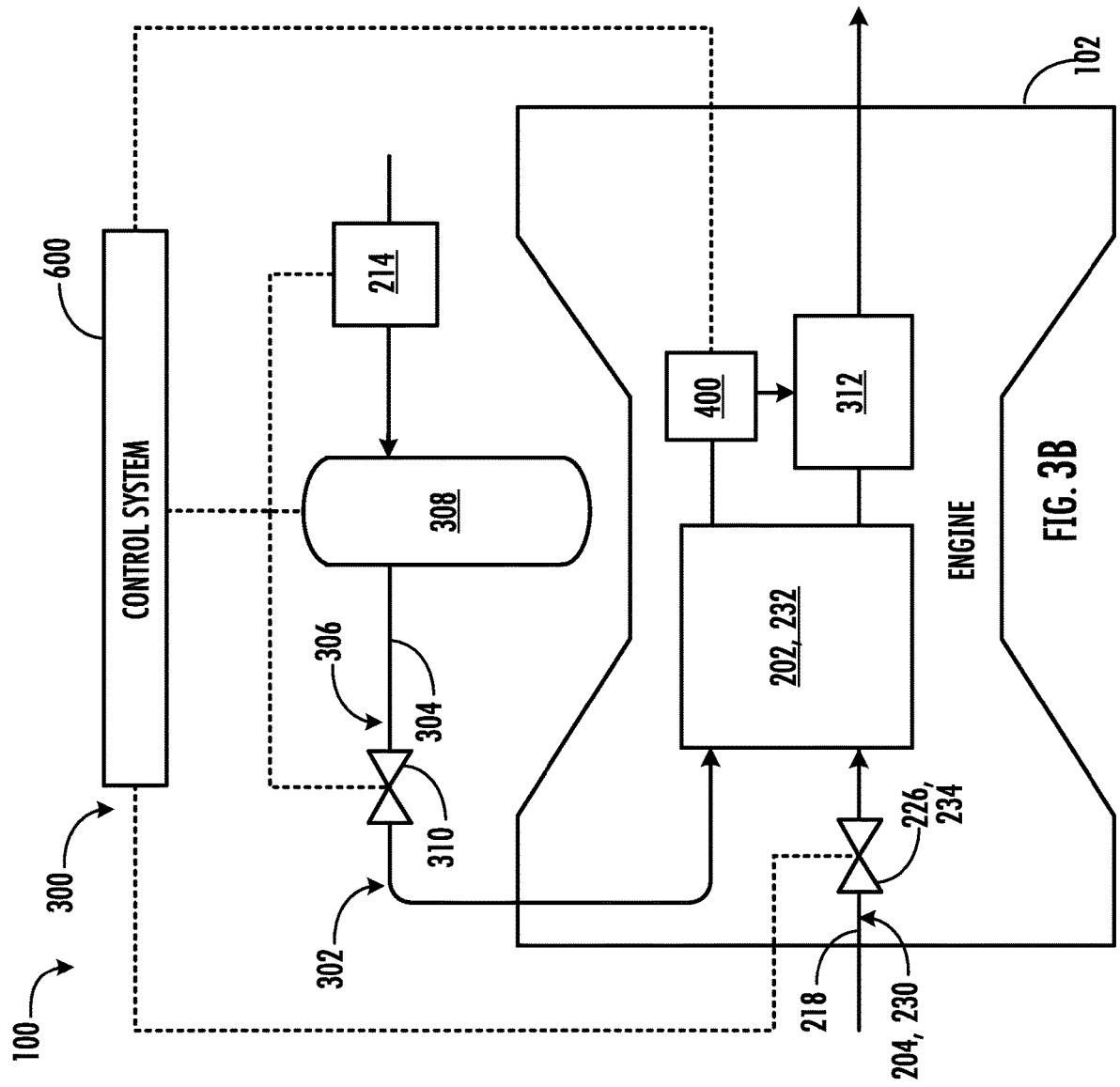

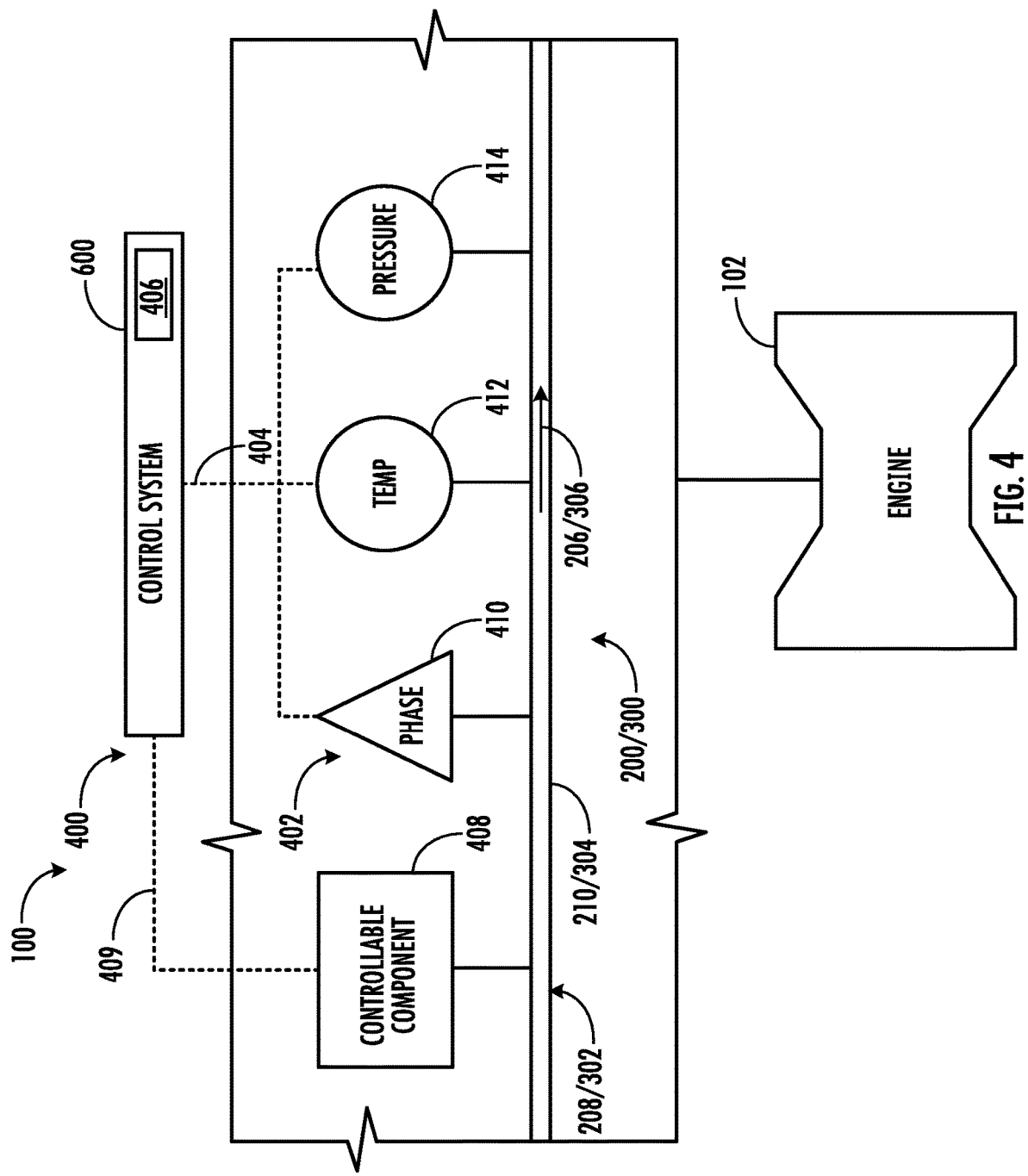

PERICRITICAL FLUID SYSTEMS FOR TURBINE ENGINES

CROSS-REFERENCE TO RELATED APPLICATIONS

This application is a continuation-in-part application of U.S. application Ser. No. 17/687,960 filed Mar. 7, 2022, which is hereby incorporated by reference in its entirety.

FIELD

The present disclosure generally pertains to monitoring and controlling phase properties of pericritical fluids including supercritical fluids and near-supercritical fluids. More particularly, the present disclosure generally pertains to pericritical fluids used in connection with engines, such as turbine engines, including thermal management systems and fuel systems that utilize pericritical fluids.

BACKGROUND

An engine, such as a turbine engine, may utilize pericritical fluids for various purposes. Such pericritical fluids may be utilized while exhibiting a near-supercritical or supercritical phase state. For example, a pericritical fluid may be utilized in a near-supercritical or supercritical state to cool various fluid streams or components of the engine. As another example, an engine may utilize a fuel that has a pericritical state, such as a near-supercritical or a supercritical phase state.

One or more operations of the engine may be impacted by a phase state of such a pericritical fluid. For example, the engine may be configured for the pericritical fluid to be utilized in a pericritical phase state, such as in a near-supercritical phase state and/or in a supercritical phase state. Additionally, or in the alternative, one or more operations of the engine may be impacted by variations in one or more phase properties of the pericritical fluid, such as variations corresponding to a phase change in the pericritical fluid and/or variations that may occur within a respective phase state of the pericritical fluid.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 1 schematically depicts an exemplary power generation system that includes an engine and a pericritical fluid system;

FIGS. 3A and 3B respectively schematically depict an exemplary fuel system that may utilize or include a pericritical fluid system, such as in connection with the power generation system and/or engine of FIG. 1;

FIG. 4 schematically depicts an exemplary pericritical fluid system that may be utilized by or included in the exemplary thermal management systems of FIGS. 2A-2E and/or that may be utilized or included in the exemplary fuel systems of FIGS. 3A and 3B;

Figure 2A:
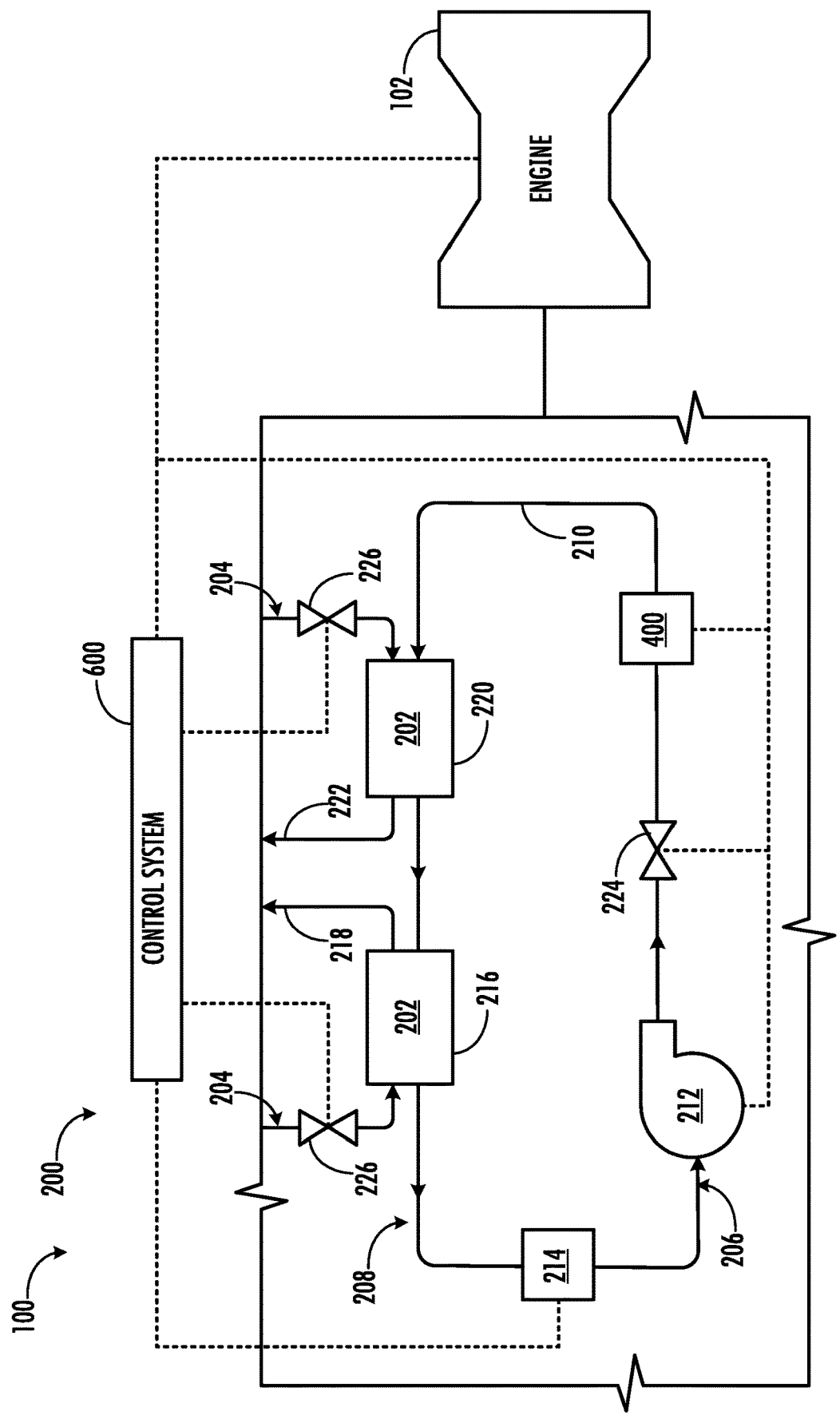
FIGS. 2A-2E respectively schematically depict an exemplary thermal management systems that may utilize or include a pericritical fluid system, such as in connection with the power generation system and/or engine of FIG. 1.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upper", "lower", "right", "left", "vertical", "horizontal", "top", "bottom", "lateral", "longitudinal", and so forth, shall relate to the disclosure as it is oriented in the drawing figures. However, it is to be understood that the disclosure may assume various alternative orientations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The terms "forward" and "aft" refer to relative positions within a turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "at least one of" in the context of, e.g., "at least one of A, B, and C" refers to only A, only B, only C, or any combination of A, B, and C.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

The term "turbomachine" refers to a machine that includes a combustor section and a turbine section with one or more turbines that together generate a thrust output and/or a torque output. In some embodiments, a turbomachine may include a compressor section with one or more compressors that compress air or gasses flowing to the combustor section.

As used herein, the term "turbine engine" refers to an engine that may include a turbomachine as all or a portion of its power source. Example turbine engines include gas turbine engines, as well as hybrid-electric turbine engines, such as turbofan engines, turboprop engines, turbojet engines, turboshaft engines, and the like.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "bypass ratio" of a turbine engine is a ratio of bypass air through a bypass of the turbine engine to core air through a core inlet of a turbomachine of the turbine engine. For example, the bypass ratio is a ratio of bypass air 62 entering the bypass airflow passage 56 to core air 64 entering the turbomachine 16.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

One or more components of the engines described herein may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing technologies in accordance with the present disclosure include, for example, Selective Laser Melting (SLM), Direct Metal Laser Melting (DMLM), Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), and other known processes.

Suitable powder materials for the manufacture of the structures provided herein as integral, unitary, structures include metallic alloy, polymer, or ceramic powders. Exemplary metallic powder materials are stainless-steel alloys, cobalt-chrome alloys, aluminum alloys, titanium alloys, nickel-based superalloys, and cobalt-based superalloys. In addition, suitable alloys may include those that have been engineered to have good oxidation resistance, known as "superalloys" which have acceptable strength at the elevated temperatures of operation in a turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure generally provides systems and methods for monitoring and/or controlling phase properties of pericritical fluids including supercritical fluids and near-supercritical fluids. Such pericritical fluids may be used in connection with engines, such as turbine engines, for example, as a cooling fluid and/or as a fuel. The present disclosure provides pericritical fluid systems that may be utilized to monitor and/or control one or more phase properties of a pericritical fluid, such as a phase state of the pericritical fluid. In some embodiments, a pericritical fluid system may be utilized by, and/or may be included as part of, a thermal management system associated with an engine. The thermal management system may utilize a pericritical fluid, for example, to cool one or more fluid streams associated with and engine and/or to cool one or more components on the engine. Additionally, or in the alternative, in some embodiments, a pericritical fluid system may be utilized by, and/or may be included as part of, a fuel system associated with an engine. The fuel system may utilize a pericritical fluid as a fuel source for the engine. The pericritical fluid system may include one or more sensors configured to generate sensor outputs that may be utilized by a control system to perform control operations, such as control operations associated with the pericritical fluid system. The sensor outputs may be utilized to monitor one or more phase properties of the pericritical fluid. The control system may provide control commands to one or more controllable components, for example, to control the one or more phase properties of the pericritical fluid.

In accordance with the present disclosure, the one or more sensors utilized by the pericritical fluid system may include a phase detection sensor configured to generate sensor outputs that may be correlated to one or more phase properties of the pericritical fluid, such as a phase state of the pericritical fluid. In some embodiments, the sensor outputs from a phase detection sensor may be utilized to determine one or more phase properties of the fluid. Additionally, or in the alternative, the sensor outputs from a phase detection sensor may be utilized in combination with further sensor outputs from one or more temperature sensors and/or pressure sensors. For example, the sensor outputs from the phase detection sensor may indicate a change in one or more phase properties of the pericritical fluid, and the sensor outputs from the one or more temperature sensors and/or pressure sensors may be utilized to associate the change in the one or more phase properties of the pericritical fluid with a phase state of the pericritical fluid. Stated differently, in some embodiments, the sensor outputs from the phase detection sensor may be utilized to indicate that some change in one or more phase properties of the pericritical fluid has occurred, and the sensor outputs from the one or more temperature sensors and/or pressure sensors may be utilized to associate the change with a particular phase state of the pericritical fluid. Additionally, or in the alternative, in some embodiments, one or more sensor outputs from a phase detection sensor may be utilized to determine one or more phase properties of a pericritical fluid, such as a phase state of the pericritical fluid, for example, without reference to other sensor outputs such as from a temperature sensor and/or pressure sensor.

As used herein, the term "pericritical fluid" refers to a fluid that has a supercritical phase state or a near-supercritical phase state. The term "pericritical fluid" is inclusive of a fluid that constitutes a supercritical fluid or a near-supercritical fluid. A fluid may be referred to as having a pericritical phase state when the fluid has a temperature and a pressure corresponding to the pericritical phase of the fluid.

As used herein, the term "supercritical fluid" refers to a fluid that has a temperature and pressure that exceed those of the critical point of the fluid. A fluid may be referred to as having a supercritical phase state when the fluid has a temperature that exceeds the critical temperature of the fluid and a pressure that exceed the critical pressure of the fluid.

As used herein, the term "near-supercritical fluid" refers to a fluid other than a supercritical fluid that has a temperature that is at least 70% of the critical temperature of the fluid, as calculated based on absolute temperature, and a pressure that is at least 70% of the critical pressure of the fluid, as calculated based on absolute pressure. A near-supercritical fluid may have a temperature that is above the critical temperature of the fluid and a pressure that is below the critical pressure of the fluid, or a near-supercritical fluid may have a pressure that is above the critical pressure of the fluid and a temperature that is below the critical temperature of the fluid. A fluid may be referred to as having a near-supercritical phase state when the fluid has a temperature and a pressure corresponding to the near-supercritical phase of the fluid. A near-supercritical fluid may have a liquid phase state or a gas phase state.

As used herein, the term "critical temperature" refers to the temperature above which a gas cannot be liquified by pressure alone. As used herein, the term "critical pressure" refers to the pressure required to liquify a gas at its critical temperature. The term "critical point," as used herein in relation to a fluid, refers to a point defined by the critical temperature and critical pressure of a fluid.

As used herein, the term "phase property" refers to and includes a phase state of a fluid, or a physical property of a fluid that depends on the phase state of the fluid. A phase property of a fluid may differ as between different phases, for example, as between at least two of: a liquid phase, a gas phase, a near-supercritical phase, and a supercritical phase. Additionally, or in the alternative, a phase property of a fluid may differ as between different phase states, including as between different phase states within a given phase. By way of example, physical properties of a fluid that depend on the phase state of the fluid, and are encompassed by the term "phase property," include: density, heat capacity, refractive index, thermal conductivity, viscosity, and coefficient of thermal expansion.

As used herein, the term "phase state" refers to a condition of a fluid with respect to a phase of the fluid and/or with respect to a region within a phase of the fluid. By way of example, phase state of a fluid may include and refer to a condition of a fluid with respect to a pericritical phase or a region within the pericritical phase, a supercritical phase or a region within the supercritical phase, a near-supercritical phase or a region within the near-supercritical phase, a gas phase or a region within the gas phase, or a liquid phase or a region within the liquid phase.

In some embodiments, a fluid may include a single component. In some embodiments, a fluid may include at least two components. A fluid that has two components may sometimes be referred to as a bimodal fluid. Such combination of two fluid components may sometimes be referred to as a bimodal combination. A fluid that has at least two components may sometimes be referred to as a multimodal fluid. The term multimodal fluid includes bimodal fluids. A combination of at least two fluid components may sometimes be referred to as a multimodal combination.

As used herein, the term "multiphasic state" refers to a fluid that includes a plurality of components that have respectively different phase states. As used herein, the term "multiphasic region" refers to a region of a phase diagram for a multimodal fluid within which the fluid has a multiphasic state. For example, a fluid that has a multiphasic state may include a first fluid-component and a second fluid-component, and the first fluid-component and the second fluid-component may respectively have: a liquid phase state and a gas phase state, a liquid phase state and a pericritical phase state, a gas phase state and a pericritical phase state, a liquid phase state and a supercritical phase state, a liquid phase state and a near-supercritical phase state, a gas phase state and a supercritical phase state, a gas phase state and a near-supercritical phase state, or a supercritical phase state and a near-supercritical phase state.

As examples, suitable fluids that may be utilized in accordance with the present disclosure include carbon monoxide, carbon dioxide, ammonia, methane, methanol, ethanol, ethylene, propane, propylene, heptane, 1-octanol, 2-octanol, 2-propanol, difluoromethane, ethane, difluoroethane, tetrafluoroethene, acetone, nitrous oxide, argon, bromine, neon, hydrogen, oxygen, or water, as well as combinations of these. In some embodiments, a bimodal or multimodal fluid may include one or more of the aforementioned exemplary fluids, such as at least two of the aforementioned exemplary fluids. By way of example, a bimodal or multimodal fluid may include at least one of: carbon dioxide and nitrogen; carbon dioxide and hydrogen; carbon dioxide and oxygen; carbon dioxide and methane; carbon dioxide and heptane; carbon dioxide and 1-octanol; carbon dioxide and 2-octonal; carbon dioxide, nitrogen, and ethane; carbon dioxide, hydrogen, and ethane; and carbon dioxide, 2-propanol, and nitrogen.

By way of example, some critical points of some exemplary fluids are as follows: carbon monoxide: about 133.2 K and about 3.5 MPa; carbon dioxide: about 304.2 K and about 7.4 MPa; ammonia: about 405.5 K and about 11.3 MPa; methane: about 190.6 K and about 4.6 MPa; methanol: about 512.6 K and about 8.1 MPa; ethanol: about 516.3 K and about 6.4 MPa; ethylene: about 282.4 K and about 5.1 MPa; propane: about 369.9 K and about 4.3 MPa; propylene: about 365.6 K and about 4.7 MPa; heptane: about 540.6 K and about 2.7 MPa; 1-octanol: about 655.1 K and about 2.7 MPa; 2-octanol: about 632.7 K and about 2.8 MPa; 2-propanol: about 508.8 K and 5.4 MPa; difluoromethane: about 304.1 K and about 7.38 MPa; ethane: about 3.5.5 K and about 4.9 mPa; difluoroethane: about 351 K and about 5.8 MPa; tetrafluoroethene: about 306.5 K and about 3.8 MPa; acetone: about 508 K and about 4.8 MPa; nitrous oxide: about 309.6 K and about 7.3 MPa; argon: about 150.7 K and about 4.9 MPa; bromine: about 588 K and about 10.3 MPa; neon: about 44.4 K and about 2.8 MPa; hydrogen: about 33.2 K and about 1.3 MPa; oxygen: about 154.6 K and about 5.1 MPa; and water: about 647.1 K and about 22.1 MPa.

Exemplary embodiments of the present disclosure will now be described in further detail. Referring to FIG. 1, an exemplary power generation system 100 is shown. An exemplary power generation system 100 may include an engine 102, such as a turbine engine. The engine 102 may be mounted to an aircraft, such as a fixed-wing or rotary-wing aircraft. The power generation system 100 may be configured to provide propulsion and/or thrust to power the aircraft, such as during flight and/or during on-ground maneuvers. The engine 102 may be mounted to an aircraft, such as in an under-wing configuration or in a tail-mounted configuration. In other embodiments, the engine 102 may be configured as a rocket engine, a ramjet engine, a turbo-rocket engine that includes a combination of a turbomachine and a rocket engine, a turbo-ramjet that includes a combination of a turbomachine and a ramjet engine, or a rocket-ramjet that includes a combination of a rocket engine and a ramjet engine.

As shown in FIG. 1, in some embodiments, a power generation system 100 and/or an engine 102 may include a thermal management system 200. A thermal management system 200 may be configured to transfer heat from one or more heat sources associated with the engine 102 and/or power generation system 100. The thermal management system 200 may be configured to circulate a cooling fluid through a cooling circuit, and heat from the one or more heat sources may be transferred to the cooling fluid. In some embodiments, when circulated through the cooling circuit, the cooling fluid may have a pericritical phase state, such as a supercritical phase state and/or a near-supercritical phase state. As further shown in FIG. 1, in some embodiments, a power generation system 100 and/or an engine 102 may include a fuel system 300. A fuel system 300 may be configured to supply fuel to the engine 102. In some embodiments, the fuel may be a cryogenic fuel. In accordance with the present disclosure, a power generation system 100 and/or an engine 102 may include a pericritical fluid system 400, as shown in FIG. 1. In some embodiments, a pericritical fluid system 400 may be utilized in connection with a thermal management system 200. Additionally, or in the alternative, a pericritical fluid system 400 may be utilized in connection with a fuel system 300.

The presently disclosed subject matter may be implemented in any desired setting that includes a power generation system 100 and/or an engine, such as land vehicles, marine vessels, power generation facilities, manufacturing facilities, industrial machinery, and the like. In the context of an aircraft, the presently disclosed subject matter may be implemented in any desired fixed or rotary wing aircraft, including commercial, military, or civilian aircraft, as well as unmanned aircraft such as unmanned aerial vehicles, drones, and the like. The presently disclosed subject matter may be useful in numerous other settings, and it is intended that the presently disclosed subject matter may be implemented in any setting without departing from the intended scope of the present disclosure.

Referring now to FIGS. 2A-2E, exemplary thermal management systems 200 are further described. As shown in FIGS. 2A-2E, an exemplary thermal management system 200 may include one or more heat exchangers 202 respectively configured to cool a fluid stream 204 associated with the engine 102 and/or the power generation system 100. The fluid stream 204 flowing through a respective heat exchanger 202 may be cooled by a cooling fluid 206 flowing through a cooling circuit 208. The cooling fluid 206 may be a pericritical fluid, such as a supercritical fluid or a near-supercritical fluid. The cooling circuit 208 may include one or more cooling conduits 210. The one or more cooling conduits 210 may be configured to supply the cooling fluid 206 to the one or more heat exchangers 202, for example with the cooling fluid 206 having a pericritical phase state, such as a supercritical phase state and/or a near-supercritical phase state. The one or more cooling conduits 210 may be defined at least in part by a structure of the one or more heat exchangers 202, such as a monolithic structure of the one or more heat exchangers 202. The cooling circuit 208 may include one or more cooling conduits 210 and may be configured to receive cooling fluid 206 discharging from the one or more heat exchangers 202.

During operation, the cooling fluid 206 may be supplied to the one or more heat exchangers 202 and/or circulated through the cooling circuit 208 in a pericritical phase state. Additionally, or in the alternative, the cooling fluid 206 may have a pericritical phase state when the cooling fluid 206 flows through the one or more heat exchangers 202 and/or circulates through the cooling circuit 208. The cooling circuit 208 may include a pump 212 configured to circulate the cooling fluid 206 through the cooling circuit 208. In some embodiments, the thermal management system 200 and/or the cooling circuit 208 may include a refrigeration system 214 configured to bring the cooling fluid 206 to a pericritical phase state and/or maintain the cooling fluid 206 at a pericritical phase state, such as a supercritical phase state and/or a near-supercritical phase state. The refrigeration system 214 may include components configured to perform any suitable refrigeration cycle, such as evaporative cooling, absorption refrigeration, thermoelectric refrigeration, or mechanical-compression refrigeration, cryogenic refrigeration, as well as combinations of these. Additionally, or in the alternative, the refrigeration system 214, such as a refrigeration system 214 configured to perform cryogenic refrigeration, may include a cryocooler, such as a Stirling-type cooler, a Gifford-McMahon cooler, a pulse-tube refrigerator, or a Joule-Thomson cooler, as well as combinations of these. Additionally, or in the alternative, the cooling circuit 208 may include any other suitable source of cooling fluid 206, such as a tank or vessel configured to supply cooling fluid 206 to the cooling circuit 208, for example, with the cooling fluid 206 having a pericritical phase state. The cooling circuit 208 may include one or more cooling fluid-control valves 224 configured to control a flow of cooling fluid 206 flowing through the cooling circuit 208. Additionally, or in the alternative, the thermal management system 200 may include one or more fluid stream-control valves 226 configured to control a flow of a fluid stream 204 flowing through a respective heat exchanger 202.

As shown, for example, in FIG. 2A, in some embodiments, the thermal management system 200 may include a plurality of heat exchangers 202. By way of example, the thermal management system 200 may include a first heat exchanger 216 configured to cool a first fluid stream 204 flowing through a first fluid conduit 218. The first fluid conduit 218 may be defined at least in part by a structure of the first heat exchanger 216, such as a monolithic structure of the first heat exchanger 216. The first fluid conduit 218 may include one or more fluid supply lines in fluid communication with the first heat exchanger 216 and configured to supply the first fluid 204 to the first heat exchanger 216 and/or to receive the first fluid 204 flowing out of the first heat exchanger 216. Additionally, or in the alternative, the thermal management system 200 may include a second heat exchanger 220 configured to cool a second fluid stream 204 flowing through a second fluid conduit 222. The second fluid conduit 222 may be defined at least in part by a structure of the second heat exchanger 220, such as a monolithic structure of the second heat exchanger 220. The second fluid conduit 222 may include one or more fluid supply lines in fluid communication with the second heat exchanger 220 and configured to supply the second fluid 204 to the second heat exchanger 220 and/or to receive the second fluid 204 flowing out of the second heat exchanger 220.

In some embodiments, as shown, for example, in FIG. 2A, the cooling circuit 208 may be configured as a thermal transport bus that includes a plurality of heat exchangers 202, such as a first heat exchanger 216 and a second heat exchanger 220, respectively configured to transfer heat from a fluid stream 204 to the cooling fluid 206. By way of example, a respective one of the plurality of heat exchangers 202 may include a fuel system heat exchanger, a lubrication system heat exchanger, a sump heat exchanger, a bleed air heat exchanger, a compressor cooling air heat exchanger, thermal clearance control heat exchanger, an engine casing heat exchanger, an environmental control system heat exchanger, or an auxiliary systems heat exchanger. Additionally, or in the alternative, a thermal management system 200 may include any other heat exchanger utilized in connection with a power generation system 100, an engine 102, and/or a vehicle powered by the engine 102.

Figure 2B:
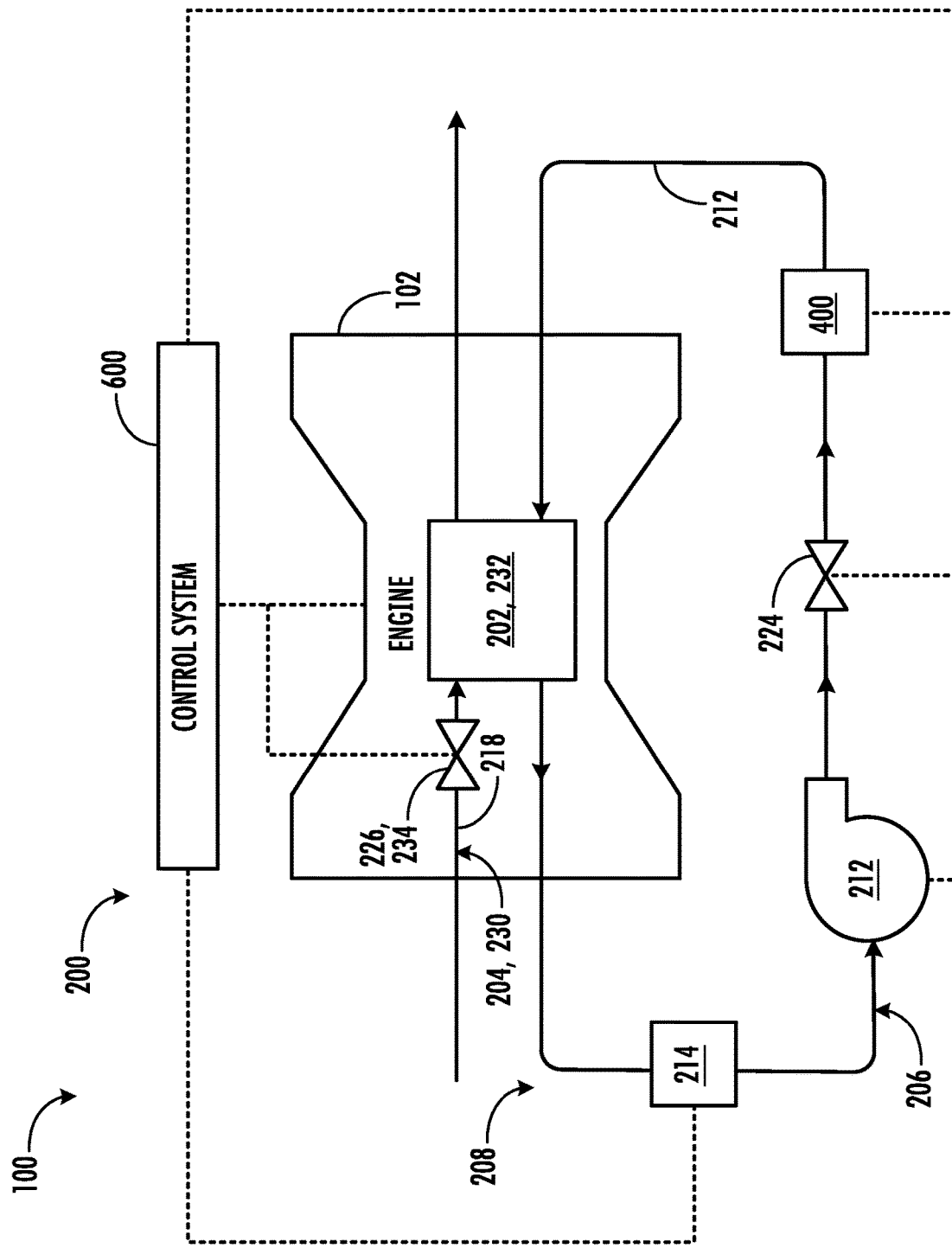
Figure 2C:
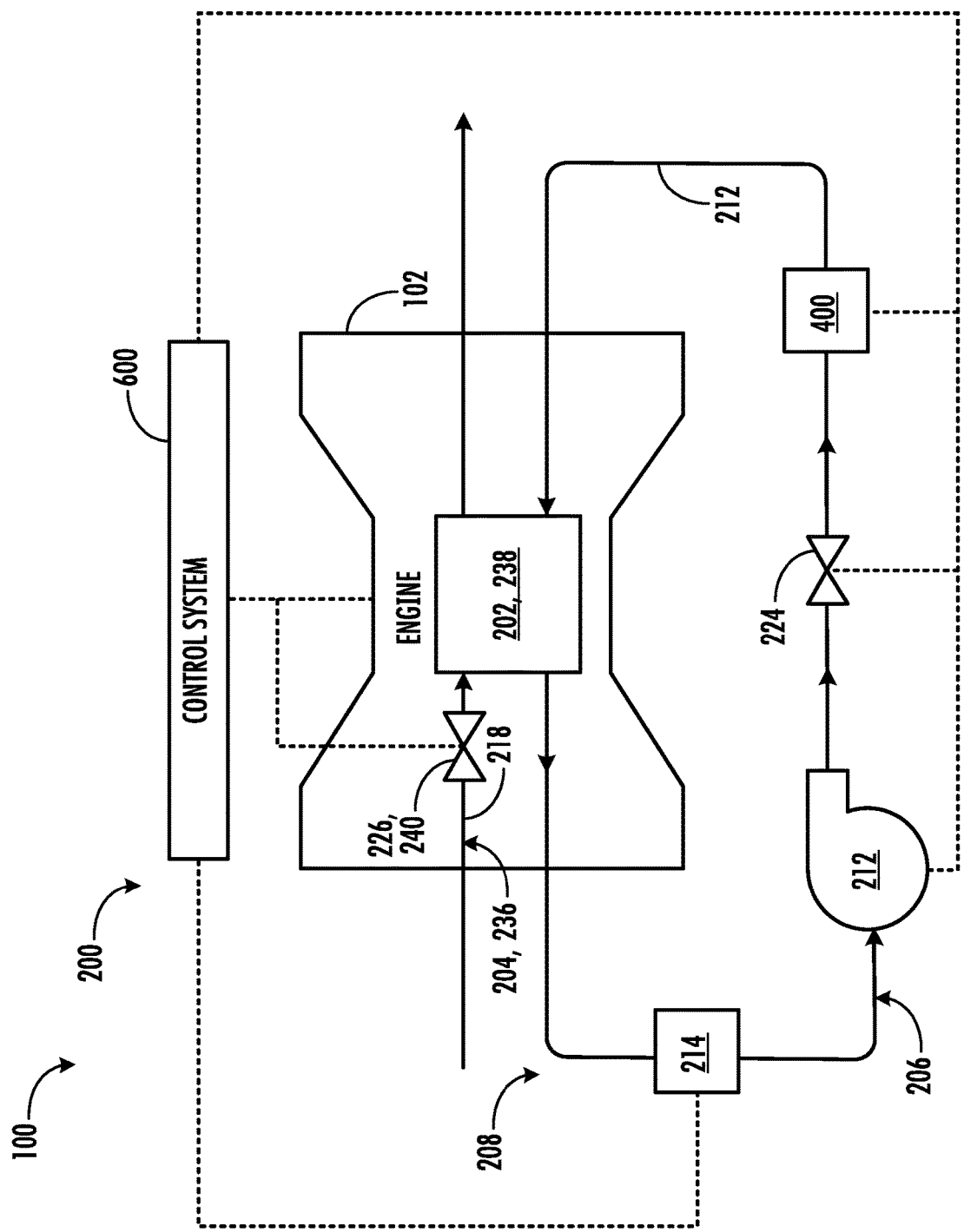

As shown, for example, in FIG. 2B, in some embodiments, the fluid stream 204 cooled by the one or more heat exchangers 202 may include a working fluid utilized by the engine 102 and/or by the power generation system 100. In some embodiments, the engine 102 may be configured as a turbine engine, and the fluid stream 204 may include intake air 230 flowing into a compressor section of the turbine engine. The one or more heat exchangers 202 may include a precooler 232 configured to precool the intake air 230 supplied to the compressor section of the turbine engine. As shown, a fluid stream-control valve 226, such as a variable geometry inlet duct 234, may be configured to control the flow of intake air 230 flowing through the precooler 232. Additionally, or in the alternative, as shown, for example, in FIG. 2C, in some embodiments, the engine 102 may be configured as a turbine engine, and the fluid stream 204 may include compressor bleed air 236 from a compressor section of the turbine engine. The compressor bleed air 236 may be utilized to cool components of the turbine engine, such as blades, hubs, and/or casings of a turbine section of the turbine engine. The compressor bleed air 236 may additionally or alternatively be utilized by one or more auxiliary systems associated with the engine 102 and/or the power generation system 100. For example, the fluid stream 204 may be utilized by an environmental control system configured, for example, to provide pressurization and/or temperature control to a cabin or other areas of an aircraft. The one or more heat exchangers 202 may include a bleed air-heat exchanger 238 configured to cool the compressor bleed air 236 prior to being utilized to cool such components of the turbine engine and/or prior to being utilized by such environmental control system. As shown, a fluid stream-control valve 226, such as a bleed air-control valve 240, may be configured to control the flow of compressor bleed air 236 flowing through the bleed air-heat exchanger 238.

Figure 2D:
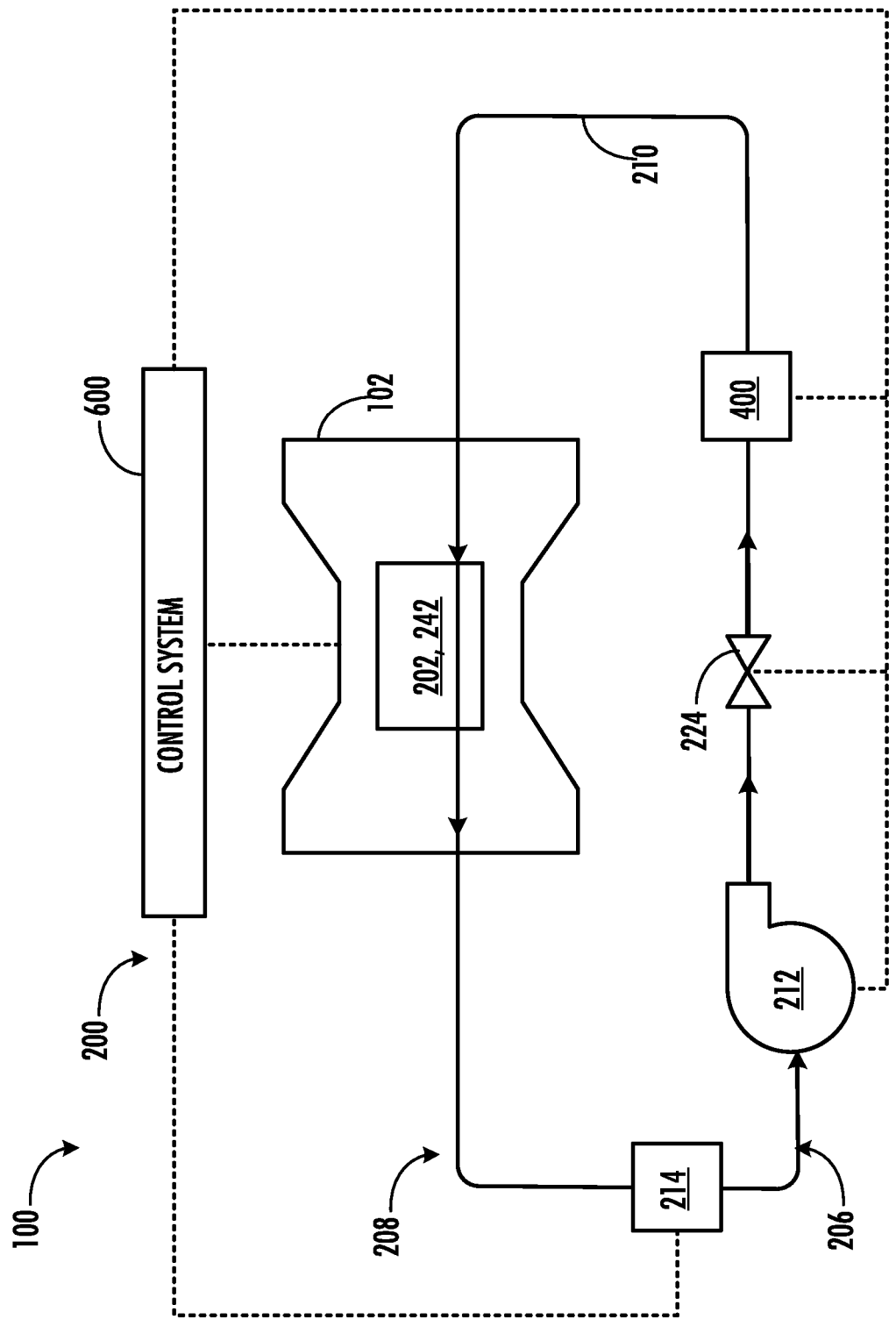
Figure 2E:
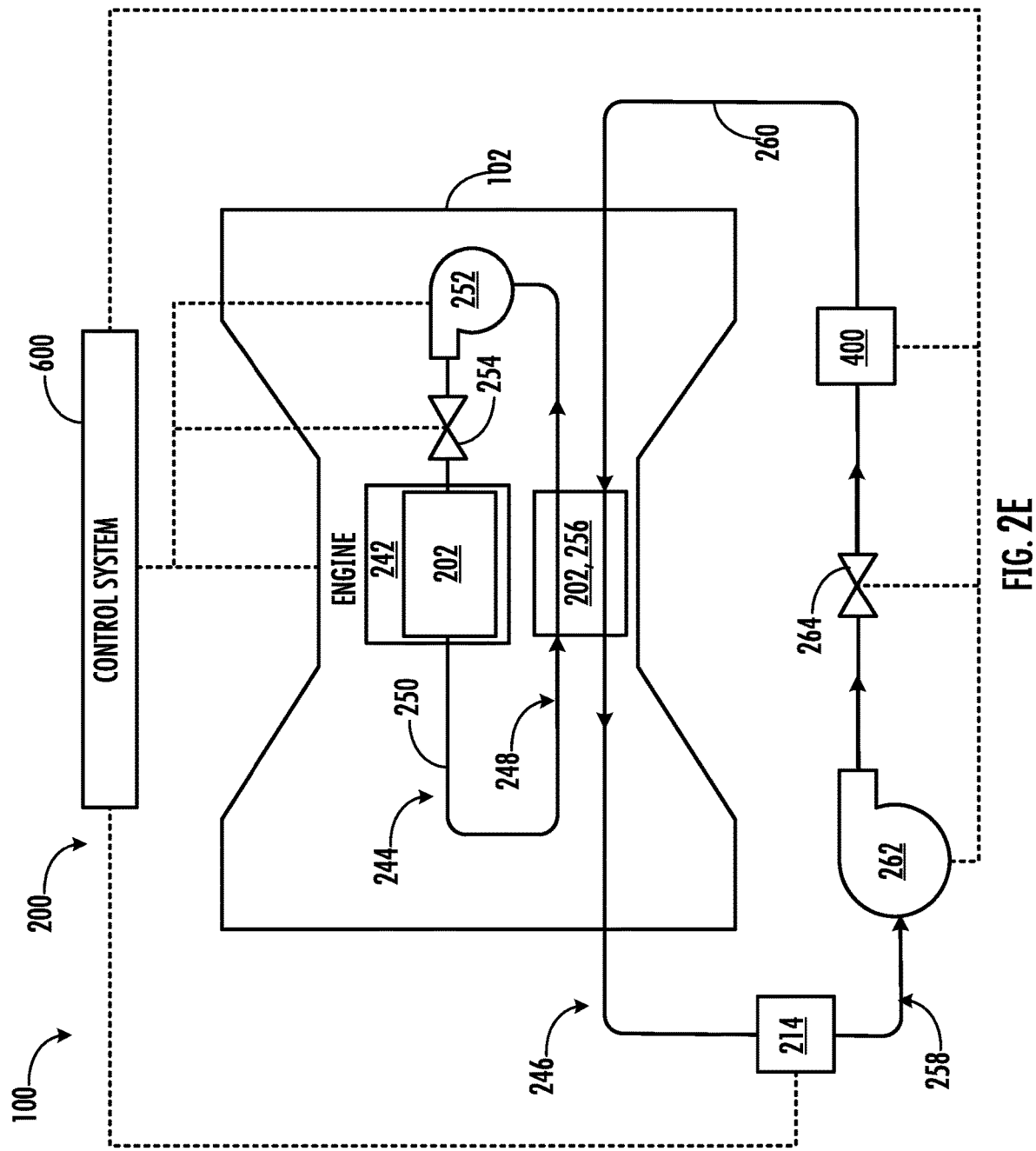

As shown, for example, in FIGS. 2D and 2E, in some embodiments, the cooling fluid 206 may be utilized to cool one or more components 242 of the engine 102. In some embodiments, as shown in FIG. 2D, the one or more components 242 of the engine 102 may define at least a portion of the one or more cooling conduits 210 of the cooling circuit 208. For example, the cooling fluid 206 may flow through one or more cooling conduits 210 defined by a structure of the one or more components 242 of the engine 102, such as a monolithic structure of the one or more components of the engine 102. Additionally, or in the alternative, the one or more components 242 of the engine 102 cooled by the cooling fluid 206 may define a heat exchanger 202 through which the cooling fluid 206 may flow. For example, the heat exchanger 202 may be defined by a structure of the one or more components 242 of the engine 102, such as a monolithic structure of the one or more components of the engine 102.

In some embodiments, the one or more components 242 of the engine cooled by the cooling fluid 206 may include an engine case. For example, in some embodiments, the engine 102 may be configured as a hybrid electric turbine engine, and the one or more components 242 cooled by the cooling fluid 206 may include one or more components of an electric motor, such as a rotor, a stator, and/or a casing of the electric motor. As another example, the engine 102 may be configured as a turbine engine, and the one or more components 242 cooled by the cooling fluid 206 may include a plurality of turbine blades, plurality of stator blades, a plurality of turbine hubs, and/or one or more casing elements that encase a turbine section of the turbine engine.

In some embodiments, as shown in FIG. 2E, the thermal management system 200 may include a primary cooling circuit 244 and an intermediate cooling circuit 246. The primary cooling circuit 244 may be configured to cool one or more components 242 of the engine 102 by heat transfer to a primary cooling fluid 248 flowing through the primary cooling circuit 244. By way of example, the primary cooling fluid 248 may include oil, a liquid hydrocarbon-based material, a dielectric fluid, a liquid metal, or any other fluid that may be suitable for use as a primary cooling fluid 248.

The one or more components 242 of the engine 102 may define one or more heat exchangers 202 through which the primary cooling fluid 248 may flow. For example, the heat exchanger 202 may be defined by a structure of the one or more components 242 of the engine 102, such as a monolithic structure of the one or more components of the engine 102. Additionally, or in the alternative, the primary cooling circuit 244 may include one or more primary cooling conduits 250. The one or more primary cooling conduits 250 may be configured to supply the primary cooling fluid 248 to the one or more heat exchangers 202. The one or more primary cooling conduits 250 may be defined at least in part by a structure of the one or more heat exchangers 202, such as a monolithic structure of the one or more heat exchangers 202. The one or more primary cooling conduits 250 may be configured to receive primary cooling fluid 248 discharging from the one or more heat exchangers 202. In some embodiments, the primary cooling circuit 244 may include a primary pump 252 configured to circulate the primary cooling fluid 248 through the primary cooling circuit 244. Additionally, or in the alternative, the primary cooling circuit 244 may include one or more primary cooling fluid-control valves 254 configured to control a flow of the primary cooling fluid 248 flowing through the primary cooling circuit 244.

The primary cooling circuit 244 and/or the intermediate cooling circuit 246 may include an intermediate heat exchanger 256 configured to transfer heat from the primary cooling fluid 248 flowing through the primary cooling circuit 244 to an intermediate cooling fluid 258 flowing through the intermediate cooling circuit 246. During operation, the intermediate cooling fluid 258 may be supplied to the intermediate heat exchanger 256 and/or circulated through the intermediate cooling circuit 246 in a pericritical phase state, such as a supercritical phase state and/or a near-supercritical phase state. Additionally, or in the alternative, the intermediate cooling fluid 258 may have a pericritical phase state when the intermediate cooling fluid 258 flows through the intermediate heat exchanger 256 and/or circulates through the intermediate cooling circuit 246.

The intermediate cooling circuit 246 may include one or more intermediate cooling conduits 260. The one or more intermediate cooling conduits 260 may be configured to supply the intermediate cooling fluid 258 to the intermediate heat exchanger 256. The one or more intermediate cooling conduits 260 may be defined at least in part by a structure of the intermediate heat exchanger 256, such as a monolithic structure of the intermediate heat exchanger 256. The one or more intermediate cooling conduits 260 may be configured to receive intermediate cooling fluid 258 discharging from the one or more heat exchangers 202.

In some embodiments, the intermediate cooling circuit 246 may include an intermediate cooling-pump 262 configured to circulate the intermediate cooling fluid 258 through the intermediate cooling circuit 246. In some embodiments, the thermal management system 200 and/or the intermediate cooling circuit 246 may include a refrigeration system 214 configured to bring the intermediate cooling fluid 258 to a pericritical phase state, such as a supercritical phase state and/or a near-supercritical phase state. Additionally, or in the alternative, the intermediate cooling circuit 246 may include any other suitable source of intermediate cooling fluid 258, such as a tank or vessel configured to supply intermediate cooling fluid 258 to the intermediate cooling circuit 246, for example, with the intermediate cooling fluid 258 having a pericritical phase state. The intermediate cooling circuit 246 may include one or more intermediate cooling fluid-control valves 264 configured to control a flow of intermediate cooling fluid 258 flowing through the intermediate cooling circuit 246.

Still referring to FIGS. 2A-2E, as shown, the cooling circuit 208 or the intermediate cooling circuit 246 may include a pericritical fluid system 400. In some embodiments, the pericritical fluid system 400 may define a portion of the thermal management system 200. The pericritical fluid system 400 may be configured to determine one or more phase properties of the cooling fluid 206 and/or the intermediate cooling fluid 258. The one or more phase properties of the cooling fluid 206 and/or the intermediate cooling fluid 258 may include a phase state, a transition to or from one phase state to another, and/or one or more physical properties that depend on such a phase state.

Figure 3A:
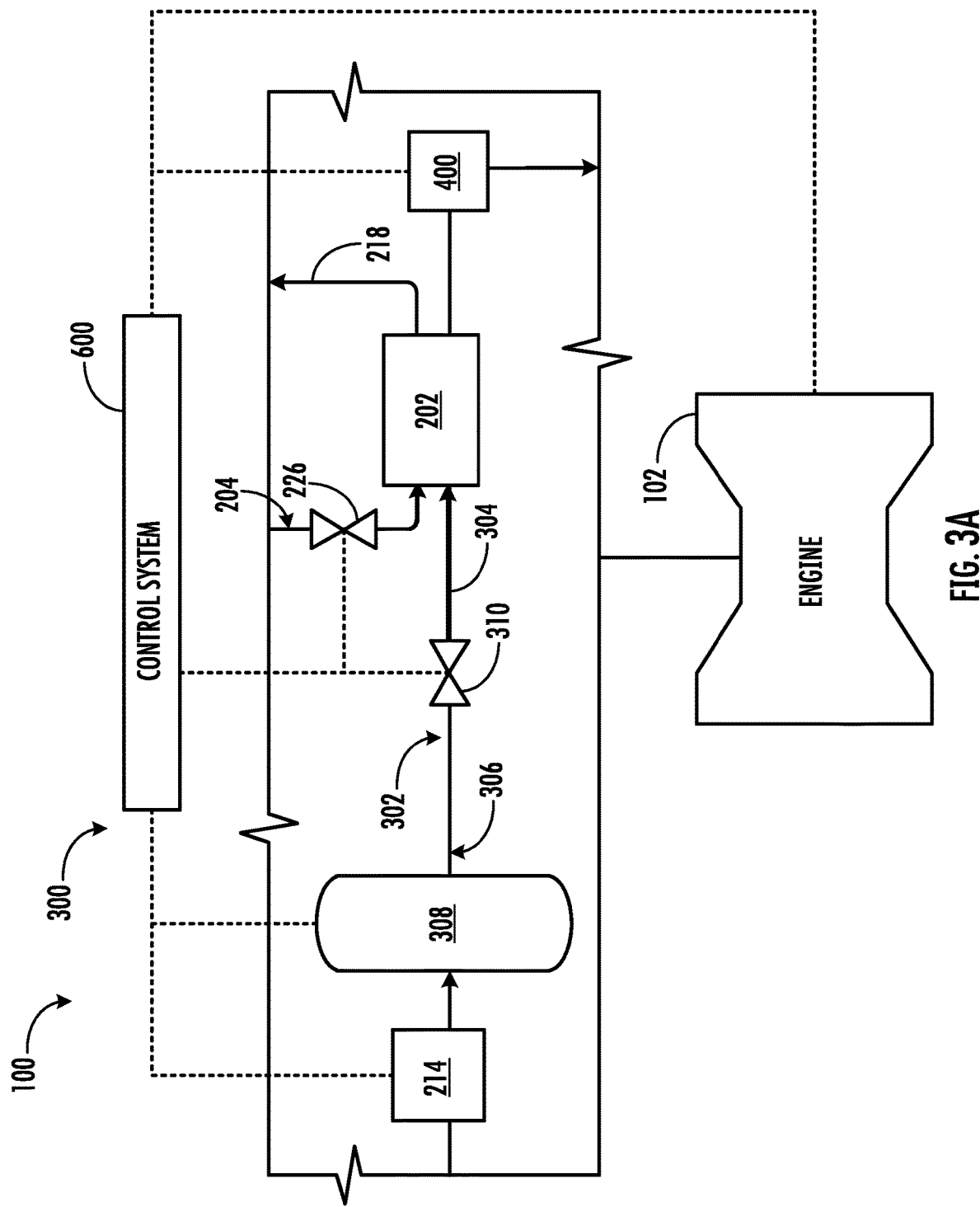

Referring now to FIGS. 3A and 3B, exemplary fuel systems 300 are further described. As shown in FIGS. 3A and 3B, an exemplary fuel systems 300 may include a fuel pathway 302. The fuel pathway 302 may include one or more fuel conduits 304. The fuel conduits 304 may be configured to supply a fuel 306 to the engine 102, for example with the fuel 306 having a pericritical phase state, such as a supercritical phase state and/or a near-supercritical phase state. For example, the fuel 306 may be supplied to the engine 102 in a pericritical phase state. Additionally, or in the alternative, the fuel pathway 302 may include a cooling circuit 208 (FIGS. 2A-2E) through which the fuel 306 may be circulated. By way of example, an exemplary fuel 306 may include hydrogen, methane, liquid natural gas, kerosene, kerosene-type jet fuel (e.g., Jet A, Jet A-1, JP-5, JP-8), as well as combinations of these. In some embodiments, the thermal management system 200 may define at least a portion of a fuel system 300. Additionally, or in the alternative, a fuel system 300 may include a thermal management system 200. In some embodiments, a cooling fluid 206 utilized by a thermal management system 200 may include a fuel 306. Additionally, or in the alternative, in some embodiments, a power generation system 100 and/or an engine 102 may separately include a thermal management system 200 and a fuel system 300.

As shown in FIGS. 3A and 3B, in some embodiments, the fuel system 300 may include a fuel tank 308 configured to store the fuel 306 in a pericritical phase state, such as in a supercritical phase state and/or a near-supercritical phase state. Additionally, or in the alternative, the fuel system 300 may include a pump 212 (FIGS. 2A-2E) configured to supply fuel 306 to the fuel pathway 302 in such a pericritical phase state. The fuel pathway 302 may include one or more fuel-control valves 310 configured to control a flow of fuel 306 flowing through the fuel pathway 302.

As shown, for example, in FIG. 3A, in some embodiments, the fuel system 300 may include one or more heat exchangers 202 respectively configured to cool a fluid stream 204 associated with the engine 102 and/or the power generation system 100. The fluid stream 204 flowing through a respective heat exchanger 202 may be cooled by the fuel 306 flowing through the fuel pathway 302. The fuel pathway 302 may include one or more fuel conduits 304 configured to supply the fuel 306 to the one or more heat exchangers 202, for example with the fuel 306 having a pericritical phase state. The one or more fuel conduits 304 may be defined at least in part by a structure of the one or more heat exchangers 202, such as a monolithic structure of the one or more heat exchangers 202. Additionally, or in the alternative, the fuel pathway 302 may include one or fuel conduits 304 may be configured to receive fuel 306 discharging from the one or more heat exchangers 202. In some embodiments, the fuel system 300 may include one or more fluid stream-control valves 226 configured to control a flow of a fluid stream 204 flowing through a respective heat exchanger 202.

In some embodiments, as shown, for example, in FIG. 3B, the fluid stream 204 cooled by the one or more heat exchangers 202 may include a working fluid utilized by the engine 102 and/or by the power generation system 100. In some embodiments, the engine 102 may be configured as a turbine engine, and the fluid stream 204 may include intake air 230 flowing into a compressor section of the turbine engine. The one or more heat exchangers 202 may include a precooler 232 configured to utilize the fuel 306 to precool the intake air 230 supplied to the compressor section of the turbine engine. As shown, a fluid stream-control valve 226, such as a variable geometry inlet duct 234, may be configured to control the flow of intake air 230 flowing through the precooler 232. Fuel exiting the precooler 232 may flow to a combustion section 312 of the engine 102. At the combustion section 312, the fuel 306 may be combined with intake air 230, and the resulting combination may be combusted, generating thrust.

Still referring to FIGS. 3A and 3B, as shown, the fuel system 300 may include a pericritical fluid system 400. In some embodiments, the pericritical fluid system 400 may define a portion of the fuel system 300. The pericritical fluid system 400 may be configured to determine one or more phase properties of the fuel 306. The one or more phase properties of the fuel 306 may include a phase state, a transition to or from one phase state to another, and/or one or more physical properties that depend on such a phase state.

Referring now to FIG. 4, exemplary pericritical fluid systems 400 are further described. An exemplary pericritical fluid system 400 may be included in and/or utilized by a thermal management system 200 and/or a fuel system 300. In some embodiments, a first pericritical fluid system 400 may define a portion of a thermal management system 200 and a second pericritical fluid system 400 may define a portion of a fuel system 300. As shown in FIG. 4, a pericritical fluid system 400 may include one or more sensors 402 configured to generate sensor outputs 404 corresponding to one or more phase properties of a fluid 401. The fluid 401 may include a cooling fluid 206 associated with a thermal management system 200, such as described herein with references to FIGS. 2A-2E. Additionally, or in the alternative, the fluid 401 may include a fuel 306 associated with a fuel system 300, such as described herein with reference to FIGS. 3A and 3B. The fluid 401 may include a pericritical fluid, such as a supercritical fluid and/or a near-supercritical fluid. Additionally, or in the alternative, the fluid 401 may include a liquid and/or a gas. Additionally, or in the alternative, the fluid 401 may include a multimodal fluid.

The sensor outputs 404 may be transmitted to the control system 600. The one or more sensors 402 and/or the control system 600 may generate fluid monitoring data 406 based at least in part on the sensor outputs 404. Additionally, or in the alternative, the fluid monitoring data 406 may include the sensor outputs 404. The sensor outputs 404 and/or the fluid monitoring data 406 that may be utilized, for example, by the control system 600, to determine one or more phase properties the fluid 401. The fluid monitoring data 406 may include one or more phase properties of the fluid 401, such as one or more phase properties of the fluid 401 determined from the sensor outputs 404. Additionally, or in the alternative, the control system 600 may utilize the fluid monitoring data 406 to control one or more controllable components 408, for example, to adjust and/or maintain a desired phase property of the fluid 401.

As shown in FIG. 4, the one or more sensors 402 may include one or more phase detection sensors 410. Additionally, or in the alternative, the one or more sensors 402 may include one or more temperature sensors 412. Additionally, or in the alternative, the one or more sensors 402 may include one or more pressure sensors 414. The one or more sensors 402 may be respectively configured to generate sensor outputs 404 that may be transmitted to the control system 600. The sensor outputs 404 from respective ones of a plurality of sensors 402 may be combined, for example, to generate fluid monitoring data 406. Additionally, or in the alternative, fluid monitoring data 406 may be generated based at least in part on sensor outputs 404 from a plurality of sensors 402. Additionally, or in the alternative, fluid monitoring data 406 may be generated based at least in part on a comparison of one or more sensor outputs 404 to other data, such as a look-up table, a model, or the like, and/or based at least in part on one or more operations performed upon the one or more sensor outputs 404, for example, based at least in part on such a look-up table, a model, or the like.

The one or more phase detection sensors 410 may include any suitable sensor configured to generate sensor outputs 404 from which one or more phase properties of the fluid 401 may be determined. In some embodiments, one or more phase properties of the fluid 401 may be determined from sensor outputs 404 generated by a phase detection sensors 410, for example, without reference to other data. Additionally, or in the alternative, one or more phase properties of the fluid 401 may be determined based at least in part on sensor outputs 404 generated by a phase detection sensor 410 and at least in part on data from another source, such as additional sensor outputs 404 from one or more other sensors 402, fluid monitoring data 406, a look-up table, a model, or the like.

In some embodiments, sensor outputs 404 generated by a phase detection sensor 410 may exhibit a change in sensor output 404 values, such as an abrupt change in sensor output 404 values, when a phase boundary is crossed as a result of a change in temperature and/or pressure. The change in sensor output 404 values exhibited by the sensor outputs 404 generated by the phase detection sensor 410 may include sensor output 404 values above an upper threshold value, sensor output 404 values below a lower threshold value, sensor output 404 values exhibiting a rate of change value above an upper threshold rate of change value, sensor output 404 values exhibiting a rate of change value below an upper threshold rate of change value, or the like, as well as combinations of these.

In some embodiments, a phase detection sensor 410 may include an acoustic sensor, such as a speed of sound sensor or an acoustic wave sensor. An exemplary speed of sound sensor may be configured to determine a velocity of a sound wave propagating through the fluid 401. The speed of sound sensor may include a transducer, such as an ultrasonic transducer, configured to emit sound waves, such as ultrasonic sound waves. The speed of sound sensor may include a receiver configured to receive the sound waves and covert the sound waves into electrical signals. The transducer and the receiver may be integrated in to a common component or may be provided as separate components. The sensor outputs 404 from a phase detection sensor 410 such as a speed of sound sensor may include electrical signals corresponding to sound waves received by the speed of sound sensor. In some embodiments, the velocity of sound waves, such as ultrasonic sound waves propagating through the fluid may depend at least in part on one or more phase properties of the fluid. In some embodiments, the velocity of the sound waves may approach a minimum at about the critical point of the fluid. One or more phase properties of the fluid 401 may correlate to sensor outputs 404 from a phase detection sensor 410 such as a speed of sound sensor.

An acoustic wave sensor may be configured to apply an oscillating electric field to generate acoustic waves that propagate through a piezoelectric substrate. Suitable piezoelectric substrates may include quartz, lithium tantalate, lithium niobate, gallium arsenide, silicon carbide, langasite, zinc oxide, aluminum nitride, lead zirconium titanate, polyvinylidene fluoride, as well as combinations of these. The acoustic waves are converted back to electrical signals. Exemplary acoustic wave sensors include bulk acoustic wave sensors, surface acoustic wave sensors, and the like. An exemplary acoustic wave sensor may include a piezoelectric substrate. The sensor outputs 404 from a phase detection sensor 410 such as an acoustic wave sensor may include electrical signals corresponding to the acoustic waves propagating through the piezoelectric substrate. Exemplary acoustic wave sensors include bulk acoustic wave sensors, such as thickness shear mode sensors, shear-horizontal acoustic plate mode sensors, shear-horizontal surface acoustic wave sensors. Thickness shear mode sensors are sometimes referred to as quartz crystal microbalance resonator. Advantageously, the acoustic waves generated by such bulk acoustic wave sensors propagate in the shear-horizontal direction, which avoids radiating appreciable acoustic energy into the fluid 401. In some embodiments, a surface acoustic wave sensor may radiate acoustic waves into the fluid 401, causing damping of the acoustic waves.

One or more properties of the acoustic waves propagating through the piezoelectric substrate, such as frequency, amplitude, or phase, as well as a combination of these, may depend at least in part on one or more phase properties of the fluid 401. One or more phase properties of the fluid 401 may correlate to sensor outputs 404 from a phase detection sensor 410 such as an acoustic wave sensor. An impedance minimum of an equivalent circuit of the acoustic wave sensor may be proportional to the density and viscosity of the fluid 401. In some embodiments, an impedance minimum exhibited by an acoustic wave sensor may be proportional to the density and viscosity of the fluid 401 according to the following relationship: $Z_{min} \propto (\rho\eta)^{1/2}$, where $Z_{min}$ is the impedance minimum, $\rho$ is the density of the fluid 401, and $\eta$ is the viscosity of the fluid.

In some embodiments, impedance values from a phase detection sensor 410, such as an acoustic wave sensor, may exhibit respectively different characteristics in relation to a vaporization curve, such as liquid saturation curve and/or a vapor saturation curve of a fluid 401. For example, the impedance values from an acoustic wave sensor may exhibit an inflection point representing a moderate increase when a fluid 401 reaches a bubble point (liquid saturation point). The moderate increase in impedance values may be attributable to bubbles forming upon a surface of the acoustic wave sensor, such as upon a surface of the piezoelectric substrate. Additionally, or in the alternative, the impedance values from an acoustic wave sensor may exhibit an inflection point representing a significant increase when a fluid 401 reaches a dew point (vapor saturation point). The significant increase in impedance values may be attributable to condensate forming upon a surface of the acoustic wave sensor, such as upon a surface of the piezoelectric substrate. For a bimodal or multimodal fluid 401, the impedance values from an acoustic wave sensor may exhibit multiple inflection points respectively corresponding to the component parts of the bimodal or multimodal fluid 401.

Exemplary phase detection sensor 410, such as acoustic wave sensors, are sensitive to very small changes in the quantity of bubbles or condensate in the fluid 401. For example, such bubbles or condensate may accumulate on a surface of an acoustic wave sensor. Such changes the quantity of bubbles or condensate may yield appreciable changes in sensor outputs 404, such as impedance values, from the phase detection sensor 410. In some embodiments, a bubble point may be distinguished from a dew point based at least in part on a change in sensor output 404 values, such as a change in impedance values. Additionally, or in the alternative, a critical point may be determined based at least in part on a change in sensor output 404 values, such as a change in impedance values. Additionally, or in the alternative, a proximity of a bubble point or a dew point to the critical point may be determined based at least in part on a change in sensor output 404 values, such as a change in impedance values. For example, the closer a bubble point or dew point to the critical point, the smaller the change in sensor output 404 values upon reaching the bubble point or dew point, respectively. In some embodiments, the change in sensor output 404 values at the critical point may be approximately zero.

In some embodiments, a phase detection sensor 410 may include an optical sensor, such as a fiber-optic reflectometer or an infrared spectrometer. An exemplary fiber-optic reflectometer may include a light source configured to generate a probe beam, an optical fiber configured to introduce the probe beam into a measuring chamber, and a photodiode configured to measure an intensity of the probe beam. The probe beam may pass through the fluid 401 and thereafter may become incident upon the photodiode. Transmission, reflection, and/or refraction of the probe beam may depend at least in part on one or more phase properties of the fluid 401. The intensity of the probe beam may be compared to a reference value and/or to a reference beam emitted by the light source. By way of example, the reference beam may be split from the probe beam by a beam splitter and may become incident upon a photodiode. The reference beam may be monitored by a reference photodiode, for example, to compensate for intensity variations and the like. In some embodiments, a fiber-optic reflectometer may include one or more microstructure optical fibers that include a core material and a plurality of channels defined within the core material through which light may be guided by way of total internal reflection and/or constructive interference of scattered light. Exemplary microstructure optical fibers include photonic-crystal fibers, photonic-bandgap fibers, holey fibers, hole-assisted fibers, and Bragg fibers.

The sensor response of a phase detection sensor 410, such as a fiber-optic reflectometer, may depend at least in part on one or more phase properties of the fluid 401. One or more phase properties of the fluid 401 may correlate to sensor outputs 404 from a phase detection sensor 410 such as a fiber-optic reflectometer. In some embodiments, one or more phase properties of the fluid 401 may be determined based at least in part on sensor output 404 values from a phase detection sensor 410, such as a fiber-optic reflectometer. For example, a fluid 401 may exhibit a different refractive index depending on a phase state of the fluid 401. For example, a refractive index of a fluid 401 may differ as between at least two of: a liquid phase state, a gas phase state, a pericritical phase state, a supercritical phase state, and a near-supercritical phase state. Additionally, or in the alternative, a refractive index of a fluid 401 may differ as between at least two different phase states within a phase, such as within a liquid phase, a gas phase, a pericritical phase, a supercritical phase, and/or a near-supercritical phase. Additionally, or in the alternative, a refractive index of a fluid 401 may depend at least in part on one or more other phase properties of a fluid 401, such as a density of the fluid 401.

Additionally, or in the alternative, one or more phase properties of the fluid 401 may be determined based at least in part on a level of noise or deviation in sensor output 404 values from a phase detection sensor 410 such as a fiber-optic reflectometer. For example, a level of noise or deviation in sensor output 404 values may increase as a result of phase separation. The increase in noise or deviation may be attributable to differences in refractive index, for example, as between bubbles and condensate in the fluid 401, as between a phase of the fluid 401 and bubbles present in the phase of the fluid 401, and/or as between a phase of the fluid 401 and condensate present in the phase of the fluid 401. A level of noise or deviation in sensor output 404 values may additionally or alternatively increase for a fluid 401 that has a multiphasic state, for example, as a result of phase separation of one or more components in the fluid 401. In some embodiments, a refractive index of the fluid 401 may increase when a phase state of the fluid 401 reaches a vaporization curve and/or a vapor point on the vaporization curve, such as a liquid saturation curve and/or a bubble point on the liquid saturation curve, such as when the phase state of the fluid 401 crosses the vaporization curve. Additionally, or in the alternative, a refractive index of the fluid 401 may decrease when a phase state of the fluid 401 reaches a vapor saturation curve and/or a dew point on the vapor saturation curve, such as when the phase state of the fluid 401 crosses the vapor saturation curve from a gaseous state. Advantageously, a level of noise or deviation in sensor output 404 values from a phase detection sensor 410, such as a fiber-optic reflectometer, may be utilized to delineate respectively different phase states of a multimodal fluid, such as a multimodal fluid that exhibits a multiphasic state.

An exemplary infrared spectrometer may include a transmission infrared spectrometer, or an attenuated total reflection infrared spectrometer. An exemplary infrared spectrometer may include an infrared light source, a measurement window configured to be in contact with the fluid 401, and an infrared detector such as a photodiode configured to detect infrared light transmitted through the measurement window. An infrared spectrometer, such as an attenuated total reflection infrared spectrometer may be configured to detect total internal reflection. The infrared beam generates evanescent waves at reflection nodes where the infrared beam reflects from the internal surface of the measurement window in contact with the fluid 401. The penetration depth of the evanescent waves may depend at least in part on one or more phase properties of the fluid 401. By way of example, the penetration depth of a fluid 401 in the gaseous phase may be greater than the penetration depth of the fluid 401 in the liquid phase. A change in intensity detected by the infrared detector may indicate a phase change. Additionally, or in the alternative, an absorbance intensity may correspond to a wavenumber depends at least in part on one or more phase properties of the fluid 401. For example, a respectively different phase states of a fluid 401 may exhibit a peak absorbance at respectively different wavenumbers. Additionally, or in the alternative, an absorbance intensity may depend at least in part on a proximity of a phase state of the fluid 401 to a vaporization curve, such as vapor saturation curve and/or a liquid saturation curve. For example, an absorbance intensity may increase as a phase state of the fluid 401 approaches the vaporization curve, such as the vapor saturation curve and/or the liquid saturation curve. Additionally, or in the alternative, fluid combinations, such as bimodal and/or multimodal fluids may exhibit respectively different absorbance intensity values and/or peak absorbance at respectively different wavenumbers, such that one or more phase properties of respective parts of a bimodal and/or multimodal fluid 401 may be determined from sensor outputs 404 from a phase detection sensor 410 such as an attenuated total reflection infrared spectrometer or other infrared spectrometer.

In some embodiments, a phase detection sensor 410 may include a pressure drop sensor, such as a micro-channel pressure drop sensor, or a packed-bed pressure drop sensor. A pressure drop sensor may include a sample pathway through which a fluid 401 may flow. The fluid 401 may exhibit a pressured drop due to friction of the fluid interacting with surfaces of the microchannels, packed bed, or the like. The pressure drop across the sample pathway may depend at least in part on one or more phase properties of the fluid 401. One or more phase properties of the fluid 401 may correlate to sensor outputs 404 from a phase detection sensor 410 such as a pressure drop sensor. In some embodiments, when undergoing a phase transition, a fluid 401 may exhibit a defined change in pressured drop. For example, a liquid phase may exhibit a greater pressure drop than a gaseous phase. Additionally, or in the alternative, a supercritical phase may exhibit a relatively lower pressure drop, for example, due to a lack of surface tension in the fluid 401. Additionally, or in the alternative, a multimodal fluid exhibit a greater pressure drop in a multiphasic state relative to a single-phase state, for example, due to surface tension interactions between respectively different phase states of the fluid components. Additionally, or in the alternative, a pressure drop of the fluid 401 may depend at least in part on a density of the fluid 401.

In some embodiments, one or more phase properties of the fluid 401 may be determined based at least in part on sensor outputs 404 from the one or more phase detection sensors 410 regardless of the type of phase detection sensor 410 utilized by the pericritical fluid system 400. For example, the control system 600 may be configured to determine one or more phase properties of the fluid 401 based at least in part on a correlation between sensor outputs 404 from the one or more phase detection sensors 410 and one or more phase properties of the fluid 401. By way of example, the control system 600 may include one or more models, lookup tables, or the like that correlate sensor outputs 404 from the one or more phase detection sensors 410 and one or more phase properties of the fluid 401. Additionally, or in the alternative, in some embodiments, sensor outputs 404 from one or more phase detection sensors 410 may be utilized in combination with sensor outputs 404 from one or more temperature sensors 412 and/or one or more pressure sensors 414. For example, one or more phase properties of the fluid 401 based at least in part on a correlation between sensor outputs 404 from the one or more phase detection sensors 410 and sensor outputs 404 from the one or more temperature sensors 412 and/or one or more pressure sensors 414. In some embodiments, sensor outputs 404 from the one or more temperature sensors 412 and/or one or more pressure sensors 414 may be utilized in combination with sensor outputs 404 from one or more phase detection sensors 410 to determine one or more phase properties of the fluid 401, for example, without correlating the sensor outputs 404 from the one or more phase detection sensors 410 to the phase property of the fluid 401 being determined. For example, a change in value of the sensor outputs 404 from a phase detection sensor 410 may indicate an occurrence of a phase change, and the sensor outputs 404 from the one or more temperature sensors 412 and/or one or more pressure sensors 414 may be utilized to determine a phase state corresponding to the phase change indicated by the change in value of the sensor outputs 404 from a phase detection sensor 410. In some embodiments, the controller may be configured to determine, based at least in part on the sensor outputs 404 from the one or more temperature sensors 412 and/or one or more pressure sensors 414, whether the phase state corresponding to the phase change includes a liquid phase state, a gas phase state, a pericritical phase state, a supercritical phase state, a near-supercritical phase state, or a multiphasic state. As another example, sensor outputs 404 from the one or more temperature sensors 412 and/or one or more pressure sensors 414 may be utilized in combination with sensor outputs 404 from one or more phase detection sensors 410 to differentiate between one or more of: a vapor saturation curve and a liquid saturation curve, a dew point and a bubble point, a critical point and a dew point or a bubble point, a bubble point and a cricondenbar, and/or a dew point and a circumcenter. Additionally, or in the alternative, in some embodiments, a phase state corresponding to a phase change indicated by the change in value of the sensor outputs 404 from a phase detection sensor 410 may be determined without reference to sensor outputs 404 from the one or more temperature sensors 412 and/or one or more pressure sensors 414, for example, by way of a correlation between one or more phase properties of the fluid 401 and the sensor outputs from the phase detection sensor 410. Additionally, or in the alternative, in some embodiments, one or more phase properties of the fluid 401 may be determined based at least in part on sensor outputs 404 from the one or more phase detection sensors 410, without requiring sensor outputs 404 from one or more temperature sensors 412 nor from one or more pressure sensors 414.

Regardless of the particular configuration of the pericritical fluid system 400 in accordance with the present disclosure, the control system 600 may be configured to determine one or more phase properties of the fluid 401 based at least in part on one or more sensor outputs 404, such as sensor outputs 404 from the one or more phase detection sensors 410, and/or based at least in part on sensor outputs 404 from the one or more phase detection sensors 410 in combination with sensor outputs 404 from one or more temperature sensors 412 and/or pressure sensors 414. The one or more phase properties of the fluid 401 may be determined based at least in part on a correlation between one or more sensor outputs 404 from the one or more phase detection sensors 410 and the one or more phase properties of the fluid 401, alone and/or in combination with one or more sensor output 404 values from or more temperature sensors 412 and/or one or more pressure sensors 414. The one or more phase properties of the fluid 401 may be determined based at least in part on a model, a lookup table, or the like, for example, that utilizes the one or more sensor outputs 404 as inputs for determining the one or more phase properties of the fluid 401.

In some embodiments, the control system 600 may be configured to determine a phase state of the fluid 401 based at least in part on the sensor outputs 404, such as whether the fluid 401 exhibits a liquid phase state, a gaseous phase state, a pericritical phase state, a supercritical phase state, a near-supercritical phase state, and/or a multiphasic state, and/or a proximity of the phase state of the fluid 401 to such a phase state. Additionally, or in the alternative, the control system 600 may be configured to determine a phase state of the fluid 401 coinciding with, and/or a proximity with respect to one or more of: a vaporization curve, a vapor point, a vapor saturation curve, a dew point, a liquid saturation curve, a bubble point, a critical point, a cricondenbar, and/or a circumcenter. In some embodiments, the control system 600 may be configured to determine a density of the fluid 401 based at least in part on such sensor outputs 404. In some embodiments, for bimodal or multimodal fluids 401, the control system 600 may be configured to determine a phase state of respective components parts of the bimodal or multimodal fluid 401, such as whether a respective portion and/or portions of the fluid 401 exhibit a liquid phase state, a gaseous phase state, a pericritical phase state, a supercritical phase state, a near-supercritical phase state, and/or a multiphasic state, and/or a proximity of the phase state of the respective portion and/or portions of the fluid 401 to such a phase state. Additionally, or in the alternative, for bimodal or multimodal fluids 401, the control system 600 may be configured to determine a phase state of a respective portion and/or portions of the fluid 401 coinciding with, and/or a proximity with respect to one or more of: a vaporization curve, a vapor point, a vapor saturation curve, a dew point, a liquid saturation curve, a bubble point, a critical point, a cricondenbar, and/or a circumcenter. Additionally, or in the alternative, for a bimodal or multimodal fluid 401, the control system 600 may be configured to determine a bulk density of such bimodal or multimodal fluid 401, and/or a density of the component parts of such bimodal or multimodal fluid 401, based at least in part on such sensor outputs 404.

In some embodiments, the control system 600 may be configured to control one or more controllable components 408 based at least in part on one or more sensor outputs 404 and/or based at least in part on one or more phase properties of the fluid 401 determined from such sensor output 404 values. For example, a controllable component 408 may be configured to control one or more phase properties of a fluid 401 based at least in part on control commands 409 from the control system 600. In some embodiments, the one or more controllable components 408 may be configured to change a temperature and/or a pressure of the fluid 401. Additionally, or in the alternative, the one or more controllable components 408 may be configured to change a flow rate of the fluid 401. The change in temperature, pressure, and/or flow rate of the fluid 401 imparted by the control system 600 may be effective to change and/or maintain a phase state of the fluid 401. Additionally, or in the alternative, the change in temperature, pressure, and/or flow rate of the fluid 401 imparted by the control system 600 may be effective to change and/or maintain a density of the fluid 401, for example, with respect to a respective phase state of the fluid 401. In some embodiments, the control system 600 may be configured to maintain the fluid 401 in a pericritical phase state, such as a supercritical phase state and/or a near-supercritical phase state, for example, by controlling the controllable component. Additionally, or in the alternative, the control system 600 may be configured to maintain the phase state of the fluid 401 within a specified control range. The specified control range may include an upper control limit and/or a lower control limit. The desired range may be selected based at least in part on a desire density range of the fluid. Additionally, or in the alternative, the desired range may be selected based at least in part on one or more of: a vaporization curve, a vapor point, a vapor saturation curve, a dew point, a liquid saturation curve, a bubble point, a critical point, a cricondenbar, and/or a circumcenter. For example, a desired range may be selected at least in part to maintain the fluid 401 at desired phase state, such as a phase state that has a desired proximity with respect to such vapor saturation curve, dew point, liquid saturation curve, bubble point, critical point, cricondenbar, and/or circumcenter. Such desired proximity may be selected at least in part to avoid the fluid 401 incurring a phase change, for example, as a result of changing operating conditions of the power generation system 100 and/or engine 102.

Exemplary controllable components 408 that may be controlled by the control system 600 may include any component that may be controlled to change a temperature, a pressure, and/or a flow rate of the fluid. For example, a controllable component 408 may include one or more of: a control valve, a compressor, a pump, and/or an accumulator. In some embodiments, a controllable component 408 may include one or more cooling fluid-control valves 224 configured to control a flow of a fluid 401, such as a cooling fluid 206 flowing through a cooling circuit 208. Additionally, or in the alternative, a controllable component 408 may include one or more fuel-control valves 310 configured to control a flow of fuel 306 flowing through a fuel pathway 302. Additionally, or in the alternative, in some embodiments, a controllable component 408 may include a pump 212 configured to circulate a fluid 401, such as a pump 212 configured to circulate a cooling fluid 206 through the cooling circuit 208, and/or a pump 212 configured to supply fuel 306 to a fuel pathway 302. In some embodiments, a controllable component 408 may include one or more components of a refrigeration system 214 configured to bring the fuel 306 to a pericritical phase state and/or maintain the fuel 306 at a pericritical phase state, such as a supercritical phase state and/or a near-supercritical phase state. Additionally, or in the alternative, in some embodiments, a controllable component 408 may include one or more fluid stream-control valves 226 configured to control a flow of a fluid stream 204 flowing through a heat exchanger 202, such as a variable geometry inlet duct 234 configured to control the flow of intake air 230 flowing through a precooler 232, or such as a bleed air-control valve 240 configured to control a flow of compressor bleed air 236 flowing through a bleed air-heat exchanger 238, or such as a primary cooling fluid-control valves 254 configured to control a flow of primary cooling fluid 248 flowing through a primary cooling circuit 244.

Figure 5A:
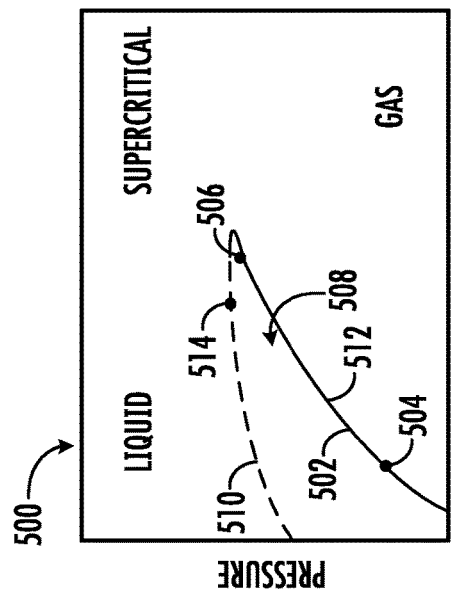
FIGS. 5A-5D schematically depict exemplary phase diagrams for a fluid in relation to temperature and pressure.
Figure 5B:
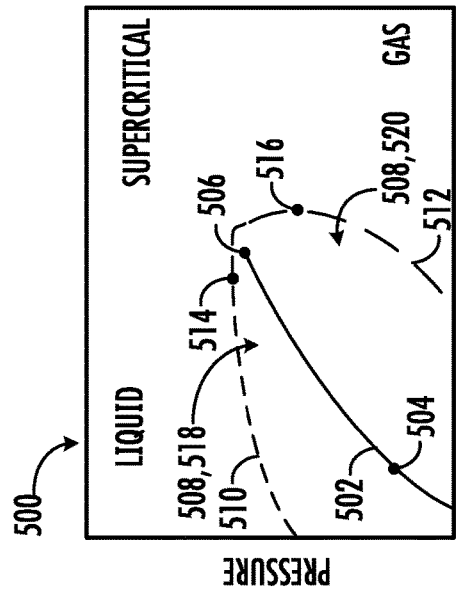
Figure 5C:
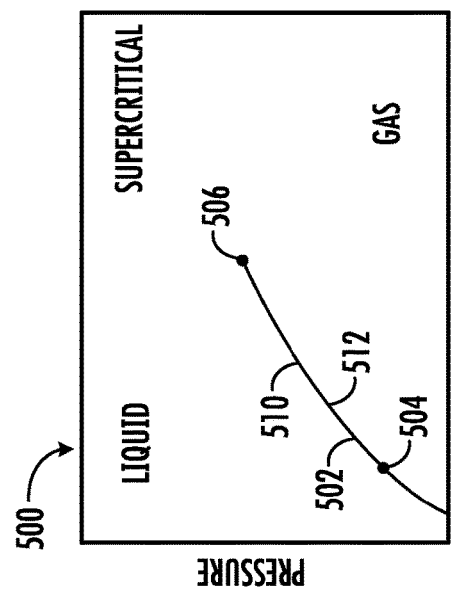
Figure 5D:
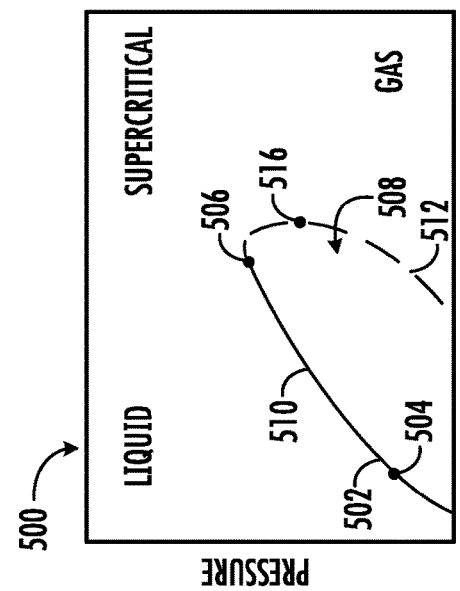
Figure 5E:
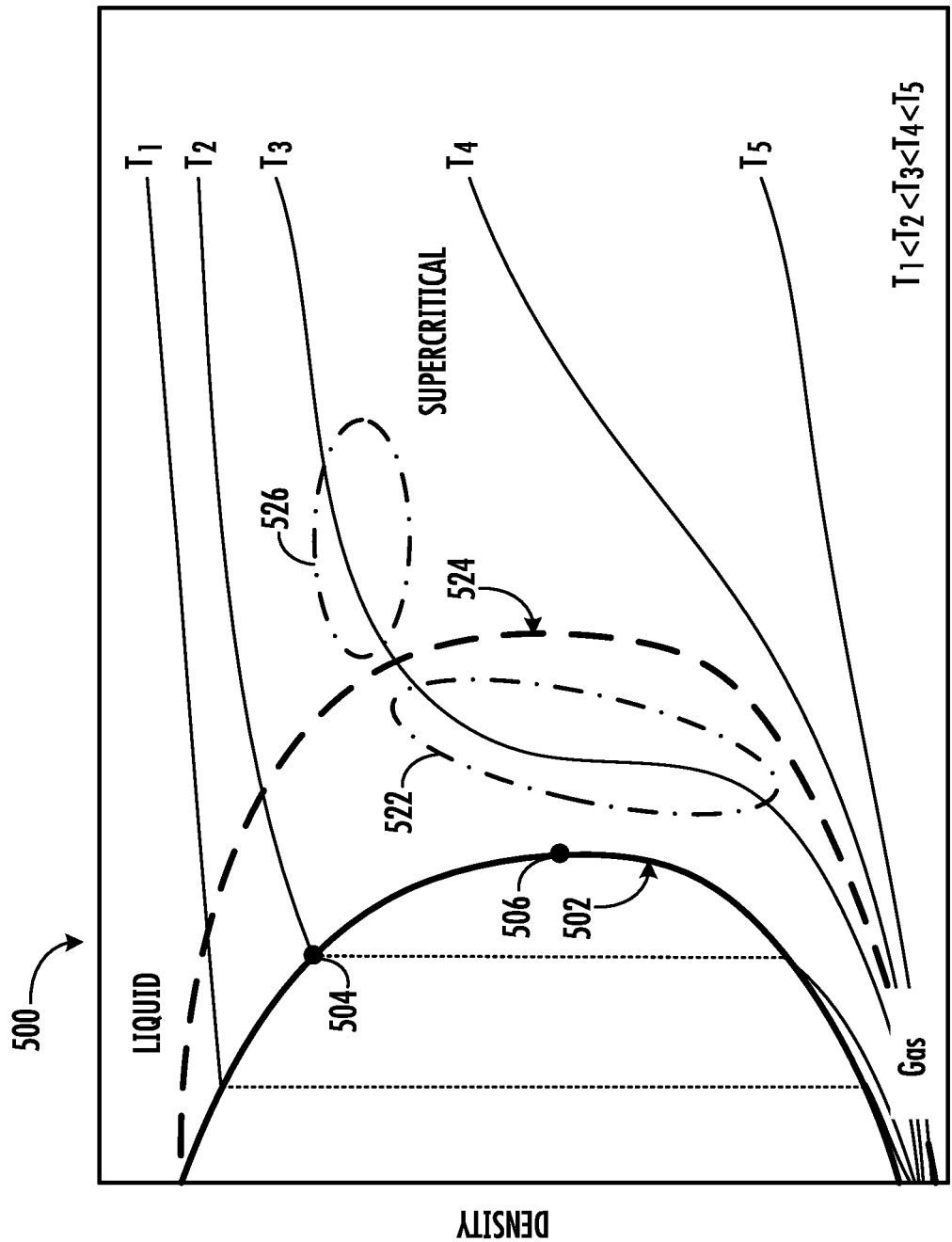
FIG. 5E schematically depicts an exemplary phase diagrams for a fluid in relation to pressure and density.

Referring now to FIGS. 5A-5E, exemplary phase diagrams 500 for a fluid 401 are described. The fluid 401 may be a cooling fluid 206 and/or a fuel 306. FIGS. 5A-5D show phase diagrams of a fluid 401 in relation to temperature and pressure. FIG. 5E show a phase diagram of a fluid in relation to pressure and density. As shown, a phase diagram for a fluid 401 may include a vaporization curve 502 defined by a plurality of vapor points 504. At a pressure above the vaporization curve, the fluid may have a liquid phase. At a pressure below the vaporization curve, the fluid may have a gas phase. At a temperature to the right of the vaporization curve, the fluid may have a gas phase. At a temperature to the left of the vaporization curve, the fluid may have a liquid phase. The vaporization curve 502 may terminate at a critical point 506. The fluid 401 may have a supercritical phase state when the fluid has a temperature and pressure that exceeds the critical point of the fluid. Except when the fluid 401 exhibits a supercritical phase state, the fluid 401 may exhibit a near-supercritical phase state when the fluid 401 has a temperature that is at least 70% of the critical temperature of the fluid 401 and a pressure that is at least 70% of the critical pressure of the fluid 401. The fluid 401 may have a pericritical phase state when the fluid exhibits a supercritical phase or a near-supercritical phase.

The phase diagram shown in FIG. 5A may correspond to a fluid 401 that has a single component, such as a first component. By way of example, in some embodiments, the first fluid-component may be carbon dioxide. The phase diagrams shown in FIGS. 5B and 5C may correspond to a bimodal fluid 401. The bimodal fluid 401 may include the first fluid-component and a second fluid-component. By way of example, in some embodiments, the first fluid-component may be carbon dioxide and the second fluid-component may be nitrogen. The phase diagram shown in FIG. 5D may correspond to a multimodal fluid 401. The multimodal fluid 401 may include the first fluid-component, the second fluid-component, and a third fluid. By way of example, in some embodiments, the first fluid-component may be carbon dioxide, the second fluid-component may be nitrogen, and the third fluid may be ethane. As shown in FIGS. 5B-5D, a bimodal fluid 401 or a multimodal fluid 401 may include a multiphasic region 508 within which the fluid 401 may include both a liquid phase and a gas phase. The multiphasic region may be delimited by a liquid saturation curve 510 and a vapor saturation curve 512. The liquid saturation curve 510 may be defined by a plurality of bubble points representing a liquid phase transitions to a gas phase. The plurality of bubble points may include a cricondenbar 514 representing a maximum pressure above which no gas can be formed regardless of the temperature. The temperature corresponding to a cricondenbar 514 may be referred to as a cricondenbar temperature. The vapor saturation curve 512 may be defined by a plurality of dew points representing a gas phase transitions to a liquid phase. The plurality of dew points may include a cricondentherm 516 representing a maximum temperature above which liquid cannot be formed regardless of the pressure. The pressure corresponding to a cricondentherm 516 may be referred to as a cricondentherm pressure. For a single component fluid, as shown, for example, in FIG. 5A, the liquid saturation curve 510 and the vapor saturation curve 512 may coincide with the vaporization curve 502, and the plurality of vapor points 504 respectively correspond to the plurality of bubble points and the plurality of dew points.

As shown in FIG. 5B, a bimodal fluid 401 may include a first fluid-component and a second fluid-component. A multiphasic region 508 for the bimodal fluid 401 may be delimited by a vapor saturation curve 512 defined by a plurality of dew points representing a transition of the first fluid-component from a gas phase to a liquid phase, a liquid saturation curve 510 defined by a plurality of bubble points representing a transition of the second fluid-component from a liquid phase to a gas phase. In some embodiments, within the multiphasic region 508 shown in FIG. 5B, the first fluid-component may have a liquid phase state and the second fluid-component may have a gas phase state. Additionally, or in the alternative, as shown in FIG. 5C, a bimodal fluid 401 may include a first fluid-component and a third fluid. A multiphasic region 508 for the bimodal fluid 401 may be delimited by a liquid saturation curve 510 defined by a plurality of bubble points representing a transition of the first fluid-component from a liquid phase to a gas phase, and a vapor saturation curve 512 defined by a plurality of dew points representing a transition of the third fluid from a gas phase to a liquid phase. In some embodiments, within the multiphasic region 508 shown in FIG. 5C, the first fluid-component may have a gas phase state and the third fluid-component may have a liquid phase state.

Additionally, or in the alternative, as shown in FIG. 5D, a multiphasic region 508 for a multimodal fluid 401 may be delimited by a liquid saturation curve 510 defined by a plurality of bubble points representing a transition of the second fluid-component from a liquid phase to a gas phase, and a vapor saturation curve 512 defined by a plurality of dew points representing a transition of the third fluid from a gas phase to a liquid phase. In some embodiments, the multiphasic region 508 for a multimodal fluid 401, may include a first multiphasic region 518 and a second multiphasic region 520, as shown, for example, in FIG. 5D. The first multiphasic region 518 may be delimited by the liquid saturation curve 510 representing the transition of the second fluid-component from a liquid phase to a gas phase, and the vaporization curve 502 representing the transition of the first fluid-component from a gas phase to a liquid phase. Within the first multiphasic region 518 shown in FIG. the first fluid-component may have a liquid phase state, the second fluid-component may have a gas phase state, and the third fluid-component may have a liquid phase state. The second multiphasic region 520 may be delimited by the vaporization curve 502 representing the transition of the first fluid-component from a liquid phase to a gas phase, and the vapor saturation curve 512 representing the transition of the third fluid-component from a gas phase to a liquid phase. Within the second multiphasic region 520 shown in FIG. 5D, the first fluid-component may have a gas phase state, the second fluid-component may have a gas phase state, and the third fluid-component may have a liquid phase state.

In some embodiments, a control system 600 may be configured to determine one or more phase properties of a bimodal or multimodal fluid 401 corresponding to a multiphasic region of the bimodal or multimodal fluid 401, for example, based at least in part on one or more sensor outputs 404 from one or more phase detection sensors 410. For example, with reference to FIGS. 5B and 5D, a bimodal or multimodal fluid 401 may include a first fluid-component and a second fluid-component, and the control system 600 may be configured to determine one or more phase properties, such as a phase state, of the second fluid-component, for example, in relation to a liquid saturation curve 510 representing a transition of the second fluid-component from a liquid phase to a gas phase. In some embodiments, the control system 600 may be configured to determine whether the second fluid-component has a liquid phase state and/or whether the second fluid-component has a gas phase state. Additionally, or in the alternative, the control system 600 may be configured to determine whether a phase state of the second fluid-component crosses the liquid saturation curve 510 and/or a proximity of the phase state of the second fluid-component in relation to the liquid saturation curve 510. Additionally, or in the alternative, the control system 600 may be configured to determine one or more phase properties, such as a phase state, of the second fluid-component in relation to a cricondenbar 514.

As another example, with reference to FIGS. 5C and 5D, a bimodal or multimodal fluid 401 may additionally or alternatively include a first fluid-component and a third fluid-component, and the control system 600 may be configured to determine one or more phase properties, such as a phase state, of the third fluid-component, for example, in relation to a vapor saturation curve 512 representing a transition of the third fluid-component from a gas phase to a liquid phase. In some embodiments, the control system 600 may be configured to determine whether the third fluid-component has a gas phase state and/or whether the third fluid-component has a liquid phase state. Additionally, or in the alternative, the control system 600 may be configured to determine whether a phase state of the third fluid-component crosses the vapor saturation curve 512 and/or a proximity of the phase state of the third fluid-component in relation to the vapor saturation curve 512. Additionally, or in the alternative, the control system 600 may be configured to determine one or more phase properties, such as a phase state, of the third fluid-component in relation to a cricondentherm 516.

In some embodiments, the control system 600 may be configured to determine one or more phase properties, such as a phase state, with respect to a first fluid-component of a bimodal or multimodal fluid 401 based at least in part on one or more phase properties, such as a phase state, of a second fluid-component and/or a third fluid-component of the bimodal or multimodal fluid 401. In some embodiments, with reference to FIG. 4 and FIGS. 5B-5D, the control system 600 may be configured to determine one or more phase properties of the first fluid-component based at least in part on one or more sensor outputs 404 from one or more phase detection sensors 410 corresponding to one or more phase properties, such as a phase state or a phase change, with respect to the second fluid-component. For example, the phase state or phase change of the second fluid-component may be in relation to the liquid saturation curve 510, such as a phase change of the second fluid-component from a liquid phase to a gas phase. In some embodiments, the first fluid-component may have a pericritical state, such as a supercritical state or a near-supercritical state, when the second fluid-component undergoes a phase change from the liquid phase to the gas phase. Additionally, or in the alternative, the control system 600 may determine one or more phase properties of the first fluid-component based at least in part on one or more sensor outputs 404 from one or more phase detection sensors 410 indicating one or more phase properties, such as a phase state or a phase change, with respect to the third fluid-component. For example, the phase state or phase change of the third fluid-component may be in relation to the vapor saturation curve 512, such as a phase change of the third fluid-component from a gas phase to a liquid phase. In some embodiments, the first fluid-component may have a pericritical state, such as a supercritical state or a near-supercritical state, when the third fluid-component undergoes a phase change from the gas phase to the liquid phase.

In some embodiments, the control system 600 may be configured to determine a phase state of the first fluid-component based at least in part on whether the second fluid-component has a liquid phase state or a gas phase state, and/or whether a phase state of the second fluid-component crosses the liquid saturation curve 510 and/or a proximity of the phase state of the second fluid-component in relation to the liquid saturation curve 510. Additionally, or in the alternative, the control system 600 may be configured to determine a proximity of the phase state of the first fluid-component in relation to the vaporization curve 502 based at least in part on the proximity of the phase state of the second fluid-component in relation to the liquid saturation curve 510. For example, the control system 600 may be configured to determine that the first fluid-component has a phase state approaching the vaporization curve 502 based at least in part on a determination that the fluid 401 has a multiphasic state corresponding to the first multiphasic region 518. The control system 600 may determine that the fluid 401 has a multiphasic state corresponding to the first multiphasic region 518 based at least in part on one or more sensor outputs 404 indicating that the second fluid-component has a gas phase state.

In some embodiments, the control system 600 may be configured to determine a phase state of the first fluid-component based at least in part on whether the third fluid-component has a gas phase state or a liquid phase state, and/or whether a phase state of the third fluid-component crosses the vapor saturation curve 512 and/or a proximity of the phase state of the third fluid-component in relation to the vapor saturation curve 512. Additionally, or in the alternative, the control system 600 may be configured to determine a proximity of the phase state of the first fluid-component in relation to the vaporization curve 502 based at least in part on the proximity of the phase state of the third fluid-component in relation to the vapor saturation curve 512. For example, the control system 600 may be configured to determine that the first fluid-component has a phase state approaching the vaporization curve 502 based at least in part on a determination that the fluid 401 has a multiphasic state corresponding to the second multiphasic region 520. The control system 600 may determine that the fluid 401 has a multiphasic state corresponding to the second multiphasic region 520 based at least in part on one or more sensor outputs 404 indicating that the third fluid-component has a liquid phase state.

In some embodiments, the control system 600 may utilize one or more phase properties, such as a phase state, of the second fluid-component and/or the third fluid-component of a bimodal or multimodal fluid 401 as an indicator or caution for one or more phase properties, such as a phase state, of the first fluid-component. As shown in FIG. 5D, a second fluid-component and/or a third fluid-component may be selected for combination with the first fluid-component such that the vaporization curve for the first fluid-component may be at least partially surrounded by the liquid saturation curve 510 representing the transition of the second fluid-component from a liquid phase to a gas phase and/or by the vapor saturation curve 512 representing a transition of the third fluid from a gas phase to a liquid phase. Additionally, or in the alternative, the second fluid-component and/or the third fluid-component may be selected for combination with the first fluid-component such that the critical point for the first fluid-component is located be within the multiphasic region 508 for the multimodal fluid 401.

For example, a proximity of the phase state of the second fluid-component in relation to the liquid saturation curve 510, such as a determination that the fluid 401 has a multiphasic state corresponding to the first multiphasic region 518, may serve as an indicator or caution that the first fluid-component has a phase state approaching the vaporization curve 502. In some embodiments, respective ones of a plurality of bubble points defining at least a portion of the liquid saturation curve 510 of the second fluid-component may have a pressure that is greater than corresponding ones of a plurality of vapor points 504 defining at least a portion of the vaporization curve 502 of the first fluid-component at respectively corresponding temperatures. Additionally, or in the alternative, in some embodiments, the cricondenbar 514 of the liquid saturation curve 510 may correspond to a pressure that is greater than the corresponding pressure of the critical point 506 of the first fluid-component.

As another example, a proximity of the phase state of the third fluid-component in relation to the vapor saturation curve 512, such as a determination that the fluid 401 has a multiphasic state corresponding to the second multiphasic region 520, may serve as an indicator or caution that the first fluid-component has a phase state approaching the vaporization curve 502. In some embodiments, respective ones of a plurality of dew points defining at least a portion of the vapor saturation curve 512 of the third fluid-component may have a temperature that is greater than corresponding ones of a plurality of vapor points 504 defining at least a portion of the vaporization curve 502 of the first fluid-component at respectively corresponding pressures. Additionally, or in the alternative, in some embodiments, the cricondentherm 516 of the vapor saturation curve 512 may correspond to a temperature that is greater than the corresponding temperature of the critical point 506 of the first fluid-component.

The control system 600 may provide one or more control commands 409 to one or more controllable components 408 based at least in part on one or more sensor outputs 404 indicating such as phase state with respect to the second fluid-component and/or the third fluid-component. For example, in the event of a determination that the fluid 401 has a multiphasic state corresponding to the first multiphasic region 518, the control system 600 may provide one or more control commands 409 to one or more controllable components 408 configured to increase the temperature and/or pressure of the fluid 401. In some embodiments, the one or more control commands 409 responsive to a determination that the fluid 401 has a multiphasic state corresponding to the first multiphasic region 518 may be configured to cause the one or more controllable components 408 to increase the pressure of the fluid 401 above the cricondenbar 514 and/or to increase the temperature of the fluid 401 above the cricondenbar temperature. Additionally, or in the alternative, the control system 600 may provide one or more control commands 409 to one or more controllable components 408 configured to increase the temperature and/or pressure of the fluid 401 in the event of a determination that the fluid 401 has a multiphasic state corresponding to the second multiphasic region 520. In some embodiments, the one or more control commands 409 responsive to a determination that the fluid 401 has a multiphasic state corresponding to the second multiphasic region 520 may be configured to cause the one or more controllable components 408 to increase the temperature of the fluid 401 above the cricondentherm 516 and/or to increase the pressure of the fluid 401 above the cricondentherm pressure.

In some embodiments, the concentration of the first-fluid component may make up a substantial majority of the total composition of the fluid 401. The second fluid-component and/or the third fluid-component may make up a substantial minority of the total composition of the fluid 401. In some embodiments, the first-fluid component may represent the primary component in the fluid 401 utilized by the thermal management system 200 and/or the fuel system 300, as applicable. In some embodiments, the second fluid-component and/or the third fluid-component may provide no appreciable effect to the thermal management system 200 and/or to the fuel system 300, as applicable, for example, with respect to the purpose for which the fluid 401 is utilized. Additionally, or in the alternative, the second fluid-component and/or the third fluid-component may be included in the fluid 401 at a concentration sufficient for use as a tracer, such as a concentration corresponding to a trace amount, sufficient for determining one or more phase properties, such as a phase state, thereof. In other embodiments, the second fluid-component and/or the third fluid-component may be included in the fluid 401 for a purpose other than as a tracer, such as for an advantageous effect to the thermal management system 200 and/or the fuel system 300, as applicable, in addition or in the alternative to serving as a tracer. Such a second fluid-component and/or third fluid-component may nevertheless be utilized as a tracer.

In some embodiments, the first fluid-component may be included in the fluid 401 in an amount of from about 30 mol. % to about 100 mol. %, such as from about 50 mol. % to about 100 mol. %, such as from about 80 mol. % to about 100 mol. %, such as from about 80 mol. % to about 90 mol. %, such as from about 90 mol. % to about 95 mol. %, such as from about 95 mol. % to about 99 mol. %, such as from about 99 mol. % to 99.8 mol. %, such as from about 99 mol. % to 99.9 mol. %, such as from about 99 mol. % to 99.998 mol. %, or such as from about 99 mol. % to 99.999 mol. %. In some embodiments, the second fluid-component may be included in the fluid 401 in an amount of from about 0.001 mol. % to about 50 mol. %, such as from about 1 mol. % to about 20 mol. %, such as from about 1 mol. % to about 10 mol. %, such as from about 1 mol. % to about 5 mol. %, such as from about 0.1 mol. % to about 1 mol. %, or such as from about 0.001 mol. % to about 1 mol. %. In some embodiments, the third fluid-component may be included in the fluid 401 in an amount of from about 0.001 mol. % to about 50 mol. %, such as from about 1 mol. % to about 20 mol. %, such as from about 1 mol. % to about 10 mol. %, such as from about 1 mol. % to about 5 mol. %, such as from about 0.1 mol. % to about 1 mol. %, or such as from about 0.001 mol. % to about 1 mol. %. In some embodiments, a concentration of the second fluid-component or the third fluid-component corresponding to a trace amount sufficient for determining one or more phase properties, such as a phase state, may be a concentration of from about 0.001 mol. % to about 5 mol. %, such as from about 0.1 mol. % to about 1 mol. %, or such as from about 0.001 mol. % to about 1 mol. %.

Referring further to FIG. 5E, another exemplary phase diagram for a fluid 401 is shown. As shown FIG. 5E, a density of a fluid 401 may depend on a pressure of the fluid 401. In some embodiments, an isothermal change in pressure may yield a substantial change in density. The phase diagram 500 shown in FIG. 5E includes a plurality of isothermal lines ($T_1$, $T_2$, $T_3$, $T_4$, and $T_5$) for a first fluid-component of the fluid 401. As shown, the first fluid-component has a vaporization curve 502 defined by a plurality of vapor points 504. In some embodiments, as indicated, for example, by the isothermal line $T_3$, an isothermal change in pressure of the first fluid-component may yield a substantial change in density within a pericritical phase, such as within a supercritical phase and/or within a near-supercritical phase. For example, at a variable density region 522, the first-fluid component may exhibit a substantial change in density as a result of a relatively nominal change in pressure and/or temperature. The range of interest for the variable density region 522 may be selected based at least in part on one or more phase properties of the fluid 401 and/or based at least in part on one or more desired operating conditions of the thermal management system 200 and/or fuel system 300.

In some embodiments, it may be desirable to avoid substantial changes in density of a fluid 401. In some embodiments, the control system 600 may be configured to determine one or more phase properties of a first fluid-component, such as a density of the first fluid-component, based at least in part on whether a second fluid-component has a liquid phase state or a gas phase state, and/or whether the second fluid-component undergoes a phase change. In some embodiments, the second fluid-component may be utilized as a tracer for determining one or more phase properties, such as density, of the first fluid-component. As shown in FIG. 5E, a first fluid-component may have a first vaporization curve 502 and a second fluid-component may have a second vaporization curve 524. The second fluid-component may be selected based at least in part on a relationship between pressure and density of the first fluid-component, and/or based at least in part on a range of interest for the variable density region 522 of the first fluid-component. In some embodiments, the thermal management system 200 and/or the fuel system 300, as applicable, may be operated such that the fluid 401 exhibits a first phase state 526, and a decrease in pressure, such as an isothermal decrease in pressure, may result in a change in phase state, such as a phase change, of the second fluid-component. For example, the second-fluid component may undergo a phase change from a liquid phase state to a gas phase state. The change in phase state of the second fluid-component may be determined by the control system 600 based at least in part on one or more sensor outputs 404 from one or more phase detection sensors 410. The change in phase state of the second fluid-component determined by the control system 600 may provide an indicator or caution that a further change in the phase state of the fluid 401, such as a further decrease in pressure and/or an increase in temperature, may result in a significant change in density of the first fluid-component. For example, the change in phase state of the second-fluid component may provide an indication or caution that the phase state of the first fluid-component may be approaching the variable density region 522.

The control system 600 may provide one or more control commands 409 to one or more controllable components 408 based at least in part on one or more sensor outputs 404 providing an indication or caution that the phase state of the first fluid-component may be approaching the variable density region 522. For example, the control system 600 may provide one or more control commands 409 to one or more controllable components 408 configured to increase the temperature and/or pressure of the fluid 401, such as to increase the pressure and/or temperature of the fluid 401 above the cricondenbar 514 and/or cricondentherm 516.

Still referring to FIGS. 5A-5E, in some embodiments, a fluid 401 may include a first fluid-component selected from among following: carbon monoxide, carbon dioxide, ammonia, methane, methanol, ethanol, ethylene, propane, propylene, heptane, 1-octanol, 2-octanol, 2-propanol, difluoromethane, ethane, difluoroethane, tetrafluoroethene, acetone, nitrous oxide, argon, bromine, neon, hydrogen, oxygen, water, liquid natural gas, kerosene, kerosene-type jet fuel (e.g., Jet A, Jet A-1, JP-5, JP-8). Additionally, or in the alternative, in some embodiments, the fluid 401 may include a second fluid-component and/or a third fluid-component selected from among the aforementioned fluids.

In some embodiments, a fluid 401, such as a cooling fluid 206, may include a first fluid-component that is carbon dioxide, and a second fluid-component and/or a third fluid-component that may be selected from among the following: carbon monoxide, ammonia, methane, methanol, ethanol, ethylene, propane, propylene, heptane, 1-octanol, 2-octanol, 2-propanol, difluoromethane, ethane, difluoroethane, tetrafluoroethene, acetone, nitrous oxide, argon, bromine, neon, hydrogen, oxygen, and water. By way of example, in some embodiments, the first fluid-component may be carbon dioxide, and the second fluid-component may be hydrogen. As another example, in some embodiments, the first fluid-component may be carbon dioxide, the second fluid-component may be nitrous oxide, and the third fluid-component may be ethane. As another example, the first fluid-component may be carbon dioxide, the second fluid-component may be 2-propanal, and the third fluid-component may be nitrogen. As another example, the first fluid-component may be carbon dioxide, the second fluid-component may be difluoromethane, and the third fluid-component may be tetrafluoroethene. As another example, the first fluid component may be argon, and the second fluid-component may be oxygen.

As another example, in some embodiments, a fluid 401, such as a fuel 306, may include a first fluid-component that is hydrogen, and a second fluid-component and/or a third fluid-component that may be selected from among the following: carbon monoxide, carbon dioxide ammonia, methane, methanol, ethanol, ethylene, propane, propylene, heptane, 1-octanol, 2-octanol, 2-propanol, difluoromethane, ethane, difluoroethane, tetrafluoroethene, acetone, nitrous oxide, argon, bromine, neon, oxygen, water, hydrogen, methane, liquid natural gas, kerosene, and kerosene-type jet fuel (e.g., Jet A, Jet A-1, JP-5, JP-8). By way of example, the first fluid-component may be hydrogen and the second fluid-component may be neon. As another example, the first fluid-component may be 1-octanol and the second fluid-component may be 2-octanol. As another example, the first fluid-component may be kerosene and the second fluid-component may be 1-octanol. As another example, the first fluid-component may be propane and the second fluid-component may be propylene. As another example, the first fluid-component may be kerosene, the second fluid-component may be 1-octanol, and the third fluid-component may be 2-octanol.

Figure 6:
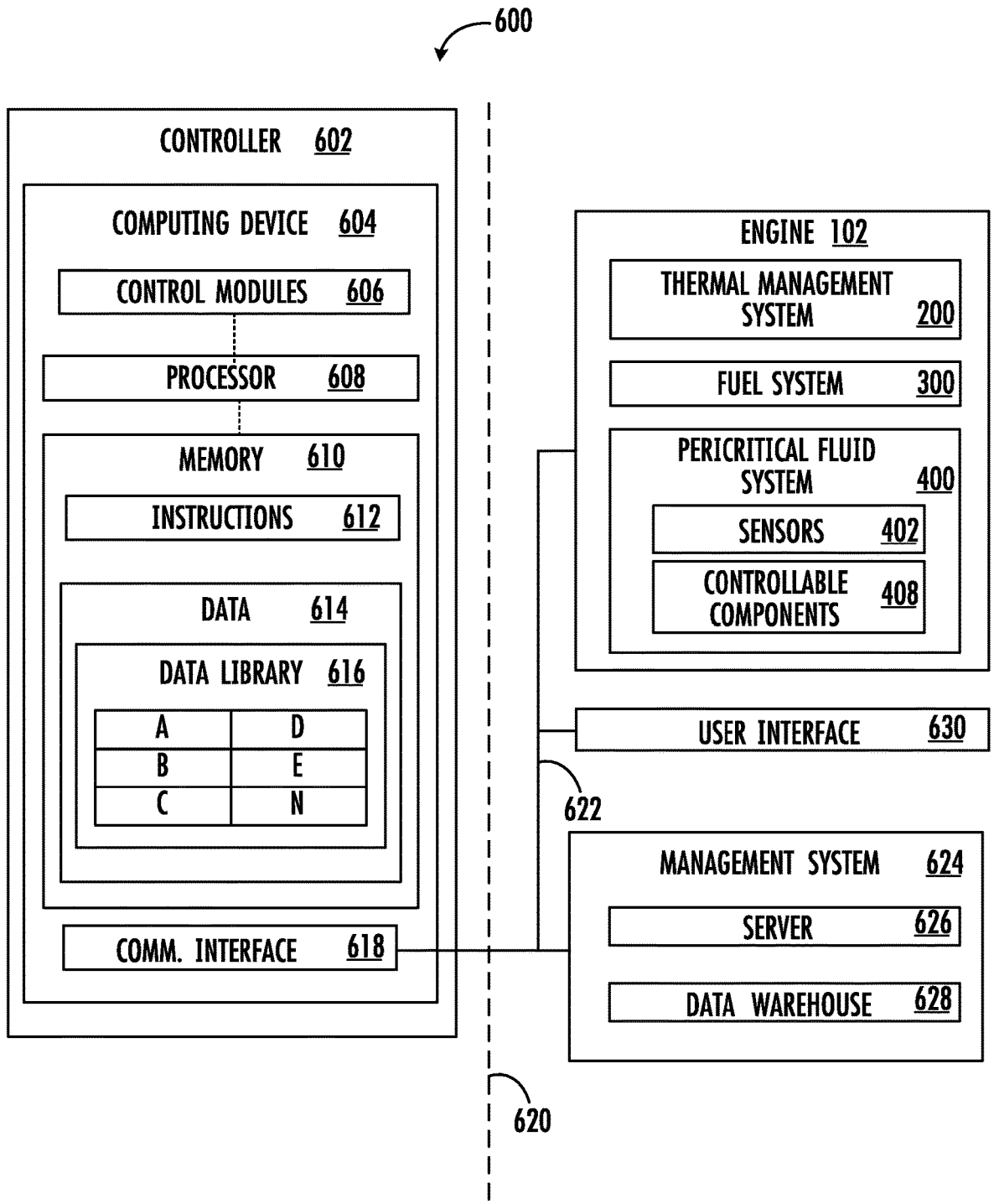
FIG. 6 schematically depicts an exemplary control system that may be utilized to perform control operations in accordance with the present disclosure.

Referring now to FIG. 6, exemplary control systems 600 are further described. An exemplary control system 600 may be utilized to monitor and/or control various features of a power generation system 100, such as various features of an engine 102, a thermal management system 200, a fuel system 300, and/or a pericritical fluid system 400. The control system 600 may be configured to perform any desired control operations in accordance with the present disclosure. As shown in FIG. 6, an exemplary control system 600 may include a controller 602, such as an electronic engine controller, a full-authority digital engine control (FADEC) device, or the like.

The controller 602 may include one or more computing devices 604 configured to perform the desired control operations. The one or more computing devices 604 may be located locally or remotely relative to the power generation system 100 and/or the engine 102. The control operations may include determining, generating, transmitting, and/or receiving sensor outputs 404 from one or more sensors 402. Additionally, or in the alternative, the control operations may include determining, generating, transmitting, and/or receiving fluid monitoring data 406, for example, based at least in part on the sensor outputs 404. Additionally, or in the alternative, the control operations may include determining, generating, transmitting, and/or receiving one or more control commands 409, for example, based at least in part on the fluid monitoring data 406 and/or the sensor outputs 404. The control commands 409 may be transmitted to one or more controllable components 408.

The computing device 604 may be communicatively coupled with the one or more sensors 402 and/or with the one or more controllable components 408. The computing device 604 may include one or more control modules 606 configured to cause the controller 602 to perform the one or more control operations, for example, based at least in part on one or more models, lookup tables, or the like.

The one or more computing devices 604 may include one or more processors 608 and one or more memory devices 610. The one or more processors 608 may include any suitable processing device, such as a microprocessor, microcontroller, integrated circuit, logic device, and/or other suitable processing device. The one or more memory devices 610 may include one or more computer-readable media, including but not limited to non-transitory computer-readable media, RAM, ROM, hard drives, flash drives, and/or other memory devices 610. The one or more control modules 606 may be implemented at least in part by the one or more processors 608 and/or the one or more memory devices 610.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 610 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 610 may store information accessible by the one or more processors 608, including computer-executable instructions 612 that can be executed by the one or more processors 608. The instructions 612 may include any set of instructions which when executed by the one or more processors 608 cause the one or more processors 608 to perform operations, including control operations. The one or more memory devices 610 may store data 614 accessible by the one or more processors 608, such as data associated with the power generation system 100, the engine 102, the thermal management system 200, the fuel system 300, and/or the pericritical fluid system 400. The data 614 may include the fluid monitoring data 406. The data 614 may include current or real-time data 614, past data 614, or a combination thereof. The data 614 may be stored in a data library 616. The data 614 may also include other data sets, parameters, outputs, information, associated with the power generation system 100, the engine 102, the thermal management system 200, the fuel system 300, and/or the pericritical fluid system 400.

The one or more computing devices 604 may also include a communication interface 618 configured to communicate with various nodes on a communication network 620 via wired or wireless communication lines 622. The communication interface 618 may include any suitable components for interfacing with one or more network(s), including for example, transmitters, receivers, ports, controllers, antennas, and/or other suitable components. The communication network 620 may include, for example, a local area network (LAN), a wide area network (WAN), SATCOM network, VHF network, a HF network, a Wi-Fi network, a WiMAX network, a gatelink network, and/or any other suitable communication network 620 for transmitting messages to and/or from the computing device 604 across the communication lines 622. The communication lines 622 of communication network 620 may include a data bus or a combination of wired and/or wireless communication links.

The control system 600 may include a management system 624 located locally or remotely relative to the power generation system 100 and/or the engine 102. The management system 624 may include a server 626 and/or a data warehouse 628. As an example, at least a portion of the data 614 may be stored in the data warehouse 628, and the server 626 may be configured to transmit data 614 from the data warehouse 628 to the one or more computing device 604, and/or to receive data 614 from the one or more computing devices 604 and to store the received data 614 in the data warehouse 628 for further purposes. The server 626 and/or the data warehouse 628 may be implemented as part of the one or more computing devices 604 and/or as part of the management system 624. The control system 600 may also include a user interface 630 configured to allow a user to interact with the various features of the control system 600, for example, by way of the communication interface 618. The communication interface 618 may allow the one or more computing devices 604 to communicate with various nodes associated with the power generation system 100 and/or the engine 102, the management system 624, and/or the user interface 630.

Figure 7:
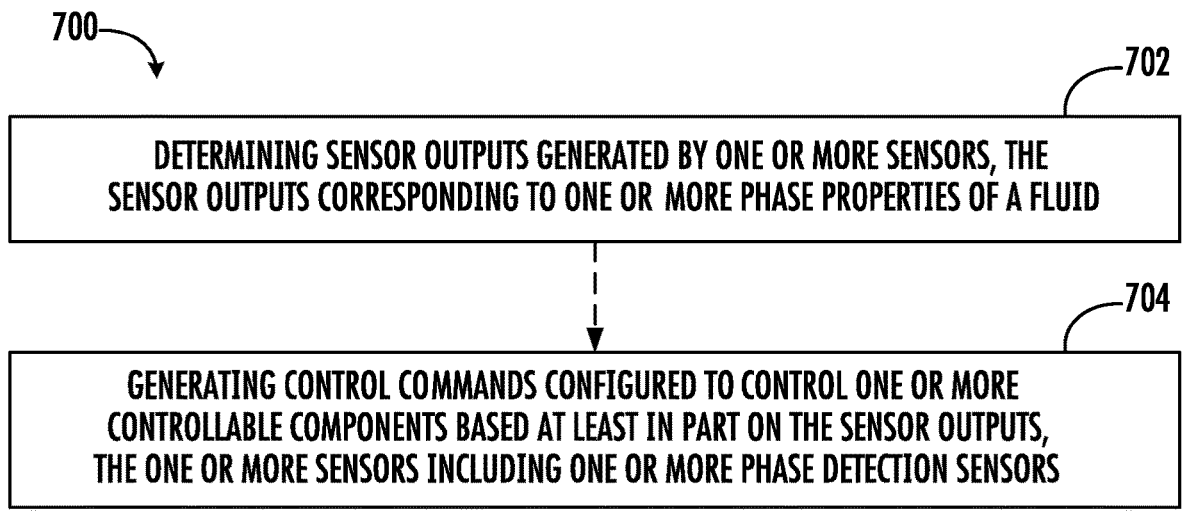
FIG. 7 shows a flow chart depicting an exemplary method of controlling a phase state of a fluid, such as in connection with a thermal management system or a fuel system.

Referring now to FIG. 7, exemplary methods in accordance with the present disclosure are further described. By way of example, an exemplary method 700 may include a method of controlling a phase state of a fluid. The exemplary method 700 may be performed in connection with a thermal management system 200 and/or in connection with a fuel system 300. Additionally, or in the alternative, the exemplary method 700 may be performed in connection with one or more operations of a power generation system 100 and/or an engine 102, such as a turbine engine.

As shown in FIG. 7, an exemplary method 700 may include, at block 702, determining sensor outputs 404 generated by one or more sensors 402. The sensor outputs may correspond to one or more phase properties of a fluid 401. The fluid 401 may be a pericritical fluid, such as a supercritical fluid or a near-supercritical fluid. In some embodiments, the fluid 401 may be a cooling fluid 206. The fluid 401, such as a cooling fluid 206, may flow through a cooling circuit 208 of a thermal management system 200. The sensor outputs 404 may be determined with respect to the fluid 401, such as a cooling fluid 206, when flowing through the cooling circuit 208, such as through one or more cooling conduits 210 or in a tank or vessel configured to supply cooling fluid 206 to the cooling circuit 208. Additionally, or in the alternative, the fluid 401 may be a fuel 306. The fluid 401, such as a fuel 306, may flow through a fuel pathway 302 of a fuel system 300. The sensor outputs 404 may be determined with respect to the fluid 401, such as a fuel 306, when flowing through the fuel pathway 302, such as through one or more fuel conduits 304 or in a fuel tank 308 configured to store the fuel 306.

At block 704, the exemplary method 700 may include generating control commands 409 configured to control one or more controllable components 408 based at least in part on the sensor outputs 404. In some embodiments, the controllable components 408 may be associated with a thermal management system 200. In some embodiments, the controllable components 408 may be associated with a fuel system 300. The one or more sensors may include one or more phase detection sensors 410. In some embodiments, the one or more phase detection sensors may include an acoustic sensor, such as a speed of sound sensor or an acoustic wave sensor. In some embodiments, the one or more phase detection sensors may include an optical sensor or a pressure drop sensor.

Accordingly, the presently disclosed systems and methods may be utilized to monitor and/or control a phase state of fluid, such as within a pericritical phase, a supercritical phase, and/or a near-supercritical phase.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. The steam system thus includes hot water that may be used as a heat transfer medium to transfer heat between various fluids and systems of the turbine engine. More specifically, in the embodiments discussed herein, the fuel is heated by the water from the steam system. Such systems may be particularly beneficial when the fuel is a cryogenic fuel, such as hydrogen fuel. The water may be used to transfer heat to the fuel and to heat (or vaporize) the fuel.

Figure 8:
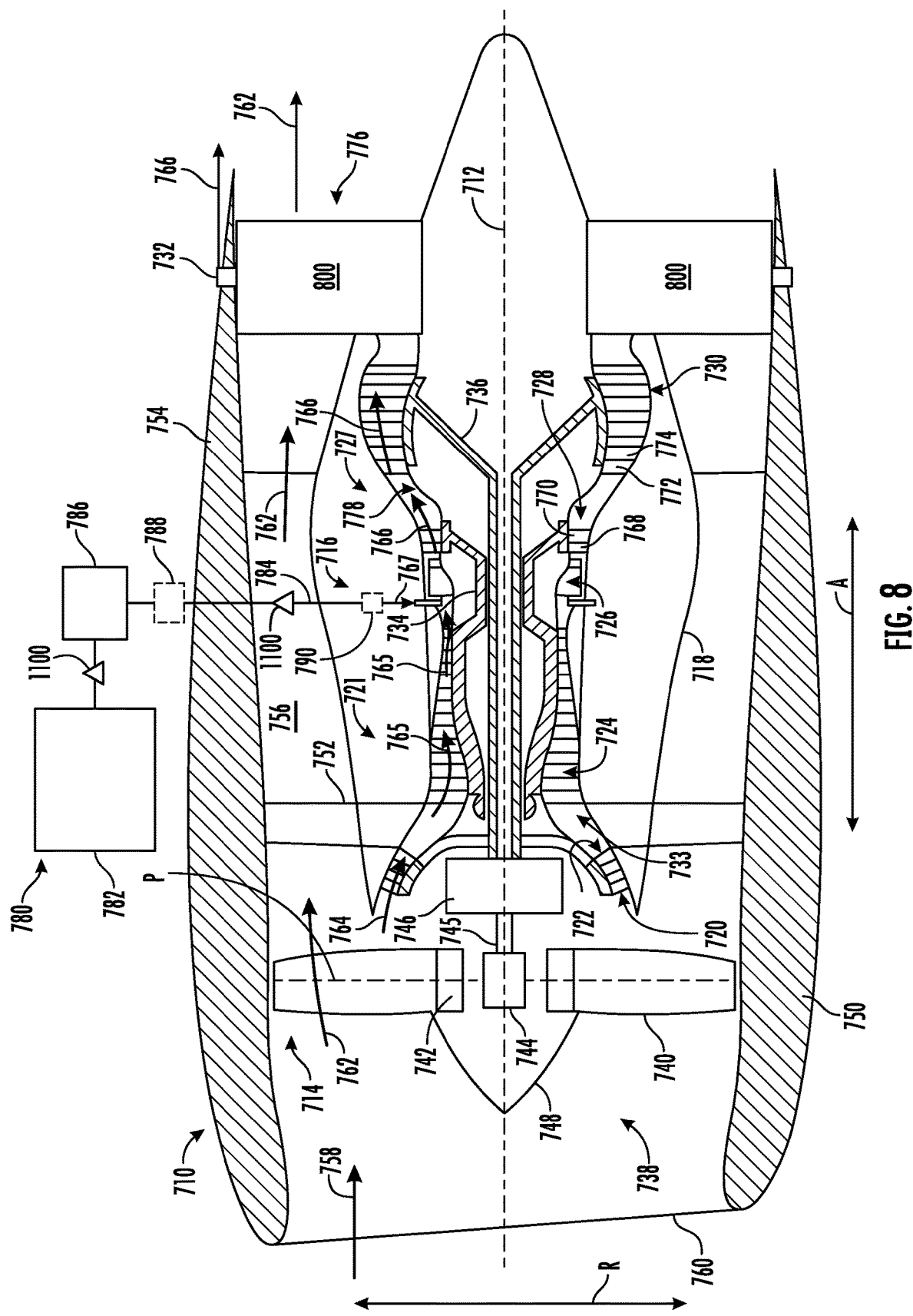
FIG. 8 is a schematic cross-sectional diagram of a turbine engine including a steam system, taken along a longitudinal centerline axis of the turbine engine, according to the present disclosure.

Referring now to FIG. 8 is a schematic cross-sectional diagram of a turbine engine 710 including a steam system 800, taken along a longitudinal centerline axis 712 (provided for reference) of the turbine engine 710, according to an embodiment of the present disclosure. As shown in FIG. 8, the turbine engine 710 has an axial direction A (extending parallel to the longitudinal centerline axis 712) and a radial direction R that is normal to the axial direction A. In general, the turbine engine 710 includes a fan section 714 and a turbomachine 716 disposed downstream from the fan section 714.

The turbomachine 716 includes an outer casing 718 that is substantially tubular and defines an annular core inlet 720. As schematically shown in FIG. 8, the outer casing 718 encases, in serial flow relationship, a compressor second 721 including a booster or a low-pressure compressor (LPC) 722 followed downstream by a high-pressure compressor (HPC) 724, a combustor 726, a turbine section 727, including a high-pressure turbine (HPT) 728, followed downstream by a low-pressure turbine (LPT) 730, and one or more core exhaust nozzles 732. A high-pressure (HP) shaft 734 or a spool drivingly connects the HPT 728 to the HPC 724 to rotate the HPT 728 and the HPC 724 in unison. The HPT 728 is drivingly coupled to the HP shaft 734 to rotate the HP shaft 734 when the HPT 728 rotates. A low-pressure (LP) shaft 736 drivingly connects the LPT 730 to the LPC 722 to rotate the LPT 730 and the LPC 722 in unison. The LPT 730 is drivingly coupled to the LP shaft 736 to rotate the LP shaft 736 when the LPT 730 rotates. The compressor second 721, the combustor 726, the turbine section 727, and the one or more core exhaust nozzles 732 together define a core air flow path 733.

For the embodiment depicted in FIG. 8, the fan section 714 includes a fan 738 (e.g., a variable pitch fan) having a plurality of fan blades 740 coupled to a disk 742 in a spaced apart manner. As depicted in FIG. 8, the fan blades 740 extend outwardly from the disk 742 generally along the radial direction R. Each fan blade 740 is rotatable relative to the disk 742 about a pitch axis P by virtue of the fan blades 740 being operatively coupled to an actuator 744 configured to collectively vary the pitch of the fan blades 740 in unison. The fan blades 740, the disk 742, and the actuator 744 are together rotatable about the longitudinal centerline axis 712 via a fan shaft 745 that is powered by the LP shaft 736 across a power gearbox, also referred to as a gearbox assembly 746. The gearbox assembly 746 is shown schematically in FIG. 8. The gearbox assembly 746 includes a plurality of gears for adjusting the rotational speed of the fan shaft 745 and, thus, the fan 738 relative to the LP shaft 736.

Referring still to the exemplary embodiment of FIG. 8, the disk 742 is covered by a rotatable fan hub 748 aerodynamically contoured to promote an airflow through the plurality of fan blades 740. In addition, the fan section 714 includes an annular fan casing or a nacelle 750 that circumferentially surrounds the fan 738 and/or at least a portion of the turbomachine 716. The nacelle 750 is supported relative to the turbomachine 716 by a plurality of circumferentially spaced outlet guide vanes 752. Moreover, a downstream section 754 of the nacelle 750 extends over an outer portion of the turbomachine 716 to define a bypass airflow passage 756 therebetween. The one or more core exhaust nozzles 732 may extend through the nacelle 750 and be formed therein. In this embodiment, the one or more core exhaust nozzles 732 include one or more discrete nozzles that are spaced circumferentially about the nacelle 750. Other arrangements of the core exhaust nozzles 732 may be used including, for example, a single core exhaust nozzle that is annular, or partially annular, about the nacelle 750.

During operation of the turbine engine 710, a volume of air 758 enters the turbine engine 710 through an inlet 760 of the nacelle 750 and/or the fan section 714. As the volume of air 758 passes across the fan blades 740, a first portion of air (bypass air 762) is directed or routed into the bypass airflow passage 756, and a second portion of air (core air 764) is directed or is routed into the upstream section of the core air flow path 733, or, more specifically, into the core inlet 720. The ratio between the first portion of air (bypass air 762) and the second portion of air (core air 764) is known as a bypass ratio. In some embodiments, the bypass ratio is greater than 18:1, enabled by a steam system 800, detailed further below. The pressure of the core air 764 is then increased by the LPC 722, generating compressed air 765, and the compressed air 765 is routed through the HPC 724 and further compressed before being directed into the combustor 726, where the compressed air 765 is mixed with fuel 767 and burned to generate combustion gases 766 (combustion products). One or more stages may be used in each of the LPC 722 and the HPC 724, with each subsequent stage further compressing the compressed air 765. The HPC 724 has a compression ratio greater than 20:1, preferably, in a range of 20:1 to 40:1. The compression ratio is a ratio of a pressure of a last stage of the HPC 724 to a pressure of a first stage of the HPC 724. The compression ratio greater than 20:1 is enabled by the steam system 800, as detailed further below.

The combustion gases 766 are routed into the HPT 728 and expanded through the HPT 728 where a portion of thermal energy and/or kinetic energy from the combustion gases 766 is extracted via sequential stages of HPT stator vanes 768 that are coupled to the outer casing 718 and HPT rotor blades 770 that are coupled to the HP shaft 734, thus, causing the HP shaft 734 to rotate, thereby supporting operation of the HPC 724. The combustion gases 766 are then routed into the LPT 730 and expanded through the LPT 730. Here, a second portion of thermal energy and/or the kinetic energy is extracted from the combustion gases 766 via sequential stages of LPT stator 772 that are coupled to the outer casing 718 and LPT rotor blades 774 that are coupled to the LP shaft 736, thus, causing the LP shaft 736 to rotate, thereby supporting operation of the LPC 722 and rotation of the fan 738 via the gearbox assembly 746. One or more stages may be used in each of the HPT 728 and the LPT 730. The HPC 724 having a compression ratio in a range of 20:1 to 40:1 enables the HPT 728 to have a pressure expansion ratio in a range of 1.5:1 to 4:1 and the LPT 730 having a pressure expansion ratio in a range of 4.5:1 to 28:1.

The combustion gases 766 are subsequently routed through the one or more core exhaust nozzles 732 of the turbomachine 716 to provide propulsive thrust. Simultaneously with the flow of the core air 764 through the core air flow path 733, the bypass air 762 is routed through the bypass airflow passage 756 before being exhausted from a fan bypass nozzle 776 of the turbine engine 710, also providing propulsive thrust. The HPT 728, the LPT 730, and the one or more core exhaust nozzles 732 at least partially define a hot gas path 778 for routing the combustion gases 766 through the turbomachine 716.

As noted above, the compressed air 765 (the core air 764) is mixed with the fuel 767 in the combustor 726 to generate a fuel and air mixture, and combusted, generating combustion gases 766 (combustion products). The fuel 767 can include any type of fuel used for turbine engines, such as, for example, sustainable aviation fuels (SAF) including biofuels, JetA, or other hydrocarbon fuels. The fuel 767 also may be a hydrogen-based fuel ($H_2$), and, while hydrogen-based fuel may include blends with hydrocarbon fuels, the fuel 767 used herein is preferably unblended, and referred to herein as hydrogen fuel. In some embodiments, the hydrogen fuel may comprise substantially pure hydrogen molecules (i.e., diatomic hydrogen). The fuel 767 may also be a cryogenic fuel. For example, when the hydrogen fuel is used, the hydrogen fuel may be stored in a liquid phase at cryogenic temperatures.

The turbine engine 710 includes a fuel system 780 for providing the fuel 767 to the combustor 726. The fuel system 780 includes a fuel tank 782 for storing the fuel 767 therein, and a fuel delivery assembly 784. The fuel tank 782 can be located on an aircraft (not shown) to which the turbine engine 710 is attached. While a single fuel tank 782 is shown in FIG. 8, the fuel system 780 can include any number of fuel tanks 82, as desired. The fuel delivery assembly 784 delivers the fuel 767 from the fuel tank 782 to the combustor 726. The fuel delivery assembly 784 includes one or more lines, conduits, pipes, tubes, etc., configured to carry the fuel 767 from the fuel tank 782 to the combustor 726. The fuel delivery assembly 784 also includes a pump 786 to induce the flow of the fuel 767 through the fuel delivery assembly 784 to the combustor 726. Steam 878 injected directly into or upstream of the combustor 726 adds mass flow to the core air 764 such that less core air 764 is needed to produce the same amount of work through the turbine section 727. In this way, the pump 786 pumps the fuel 767 from the fuel tank 782, through the fuel delivery assembly 784, and into the combustor 726. The fuel system 780 and, more specifically, the fuel tank 782 and the fuel delivery assembly 784, either collectively or individually, may be a fuel source for the combustor 726.

In some embodiments, for example, when the fuel 767 is a hydrogen fuel, the fuel system 780 includes one or more vaporizers 788 (illustrated by dashed lines) and a metering valve 790 (illustrated by dashed lines) in fluid communication with the fuel delivery assembly 784. In this example, the hydrogen fuel is stored in the fuel tank 782 as liquid hydrogen fuel. The one or more vaporizers 788 heat the liquid hydrogen fuel flowing through the fuel delivery assembly 784. The one or more vaporizers 788 are positioned in the flow path of the fuel 767 between the fuel tank 782 and the combustor 726, and are located downstream of the pump 786. The one or more vaporizers 788 are in thermal communication with at least one heat source, such as, for example, waste heat from the turbine engine 710 and/or from one or more systems of the aircraft (not shown). The one or more vaporizers 788 heat the liquid hydrogen fuel and convert the liquid hydrogen fuel into a gaseous hydrogen fuel within the one or more vaporizers 788. The fuel delivery assembly 784 directs the gaseous hydrogen fuel into the combustor 726.

The metering valve 790 is positioned downstream of the one or move vaporizers 788 and the pump 786. The metering valve 790 receives hydrogen fuel in a substantially completely gaseous phase, or in a substantially completely supercritical phase. The metering valve 790 provides the flow of fuel to the combustor 726 in a desired manner. More specifically, the metering valve 790 provides a desired volume of hydrogen fuel at, for example, a desired flow rate, to a fuel manifold that includes one or more fuel injectors that inject the hydrogen fuel into the combustor 726. The fuel system 780 can include any components for supplying the fuel 767 from the fuel tank 782 to the combustor 726, as desired.

The turbine engine 710 includes the steam system 800 in fluid communication with the one or more core exhaust nozzles 732 and the fan bypass nozzle 776. The steam system 800 extracts steam from the combustion gases 766 as the combustion gases 766 flow through the steam system 800, as detailed further below.

The turbine engine 710 depicted in FIG. 8 is by way of example only. In other exemplary embodiments, the turbine engine 710 may have any other suitable configuration. For example, in other exemplary embodiments, the fan 738 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 9:
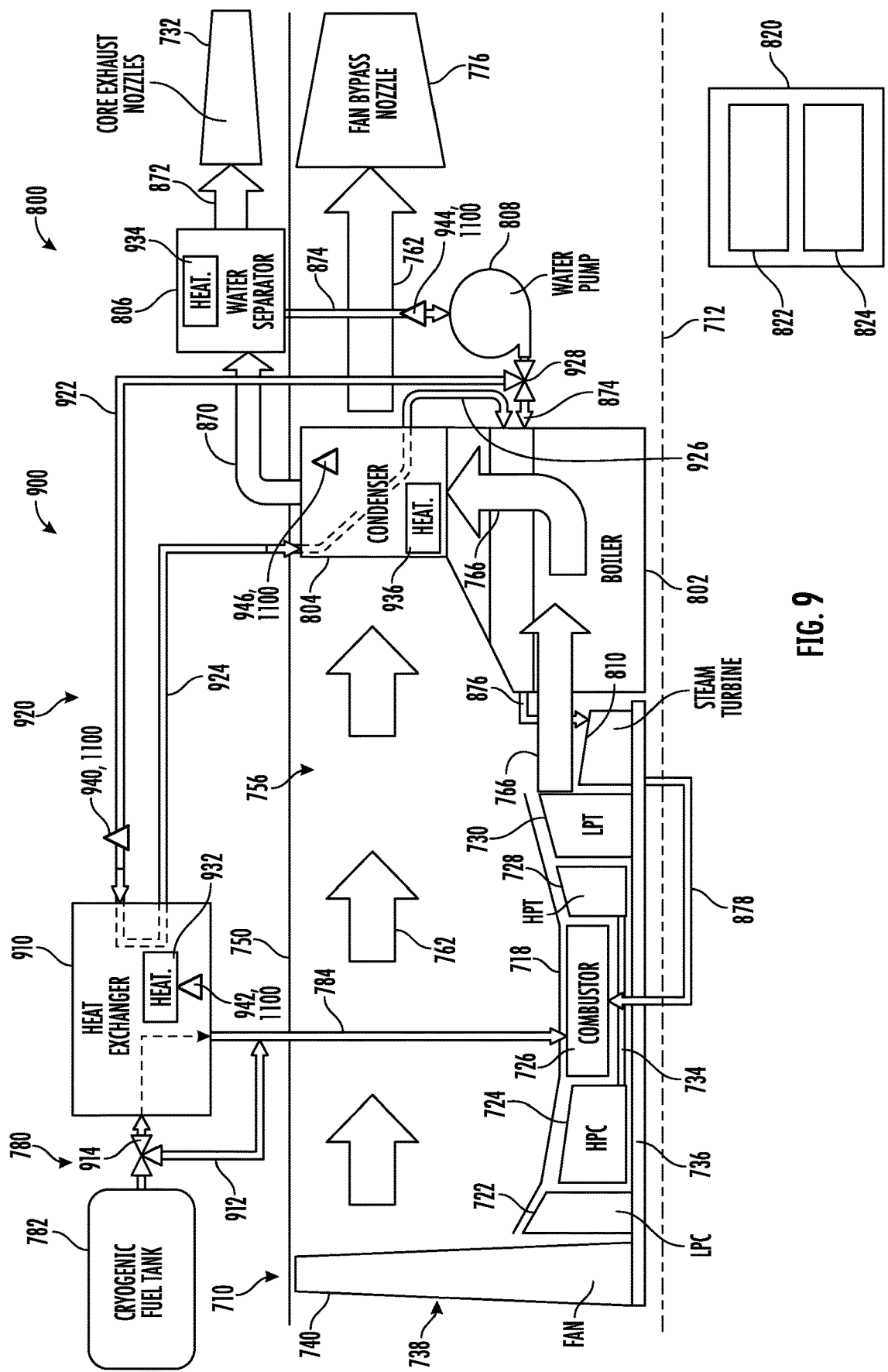
FIG. 9 is a schematic diagram of the turbine engine and a steam system with a thermal transport system according to an embodiment of the present disclosure.

FIG. 9 is a schematic diagram of the turbine engine 710 and the steam system 800 of FIG. 8 having a thermal transport system 900 according to the present disclosure. For clarity with the other thermal transport systems discussed herein, the thermal transport system 900 of this embodiment will be referred to as a first thermal transport system 900. The turbine engine 710 is shown schematically in FIG. 9 and some components are not shown in FIG. 9. The steam system 800 includes a boiler 802, a condenser 804, a water separator 806, a water pump 808, and a steam turbine 810.

The boiler 802 is a heat exchanger that vaporizes liquid water from a water source to generate steam or water vapor, as detailed further below. The boiler 802 is thus a steam source. In particular, the boiler 802 is an exhaust gas-water heat exchanger. The boiler 802 is in fluid communication with the hot gas path 778 (FIG. 8) and is positioned downstream of the LPT 730. The boiler 802 is also in fluid communication with the water pump 808, as detailed further below. The boiler 802 can include any type of boiler or heat exchanger for extracting heat from the combustion gases 766 and vaporizing liquid water into steam or water vapor as the liquid water and the combustion gases 766 flow through the boiler 802.

The condenser 804 is a heat exchanger that further cools the combustion gases 766 as the combustion gases 766 flow through the condenser 804, as detailed further below. In particular, the condenser 804 is an air-exhaust gas heat exchanger. The condenser 804 is in fluid communication with the boiler 802 and, in this embodiment, is positioned within the bypass airflow passage 756. The condenser 804, however, may be positioned elsewhere and thermally connected to other cooling sources, such as being thermally connected to the fuel 767 to transfer heat to the fuel 767, particularly, when the fuel 767 is a cryogenic fuel such as hydrogen fuel. The condenser 804 can include any type of condenser for condensing water from the exhaust (e.g., the combustion gases 766).

The water separator 806 is in fluid communication with the condenser 804 for receiving cooled exhaust (combustion gases 766) having condensed water entrained therein. The water separator 806 is also in fluid communication with the one or more core exhaust nozzles 732 and with the water pump 808. The water separator 806 includes any type of water separator for separating water from the exhaust. For example, the water separator 806 can include a cyclonic separator that uses vortex separation to separate the water from the air. In such embodiments, the water separator 806 generates a cyclonic flow within the water separator 806 to separate the water from the cooled exhaust. In FIG. 9, the water separator 806 is schematically depicted as being in the nacelle 750, but the water separator 806 could be located at other locations within the turbine engine 710, such as, for example, radially inward of the nacelle 750, closer to the turbomachine 716. The water separator 806 may be driven to rotate by one of the engine shafts, such as the HP shaft 734 or the LP shaft 736. As noted above, the boiler 802 receives liquid water from a water source to generate steam or water vapor. In the embodiment depicted in FIG. 9, the condenser 804 and the water separator 806, individually or collectively, are the water source for the boiler 802.

The water pump 808 is in fluid communication with the water separator 806 and with the boiler 802. The water pump 808 is in fluid communication with the condenser 804 via the water separator 806. The water pump 808 may be any suitable pump, such as a centrifugal pump or a positive displacement pump. The water pump 808 directs the separated liquid water through the boiler 802 where it is converted back to steam. This steam is sent through the steam turbine 810 then injected into core air flow path 733, such as into the combustor 726.

In operation, the combustion gases 766, also referred to as exhaust, flow from the LPT 730 into the boiler 802. The combustion gases 766 transfer heat into the water 874 (e.g., in liquid form) within the boiler 802, as detailed further below. The combustion gases 766 then flow into the condenser 804. The condenser 804 condenses the water 874 (e.g., in liquid form) from the combustion gases 766. The bypass air 762 flows through the bypass airflow passage 756 and over or through the condenser 804 and extracts heat from the combustion gases 766, cooling the combustion gases 766 and condensing the water 874 from the combustion gases 766, to generate an exhaust-water mixture 870. The bypass air 762 is then exhausted out of the turbine engine 710 through the fan bypass nozzle 776 to generate thrust, as detailed above. The condenser 804 thus may be positioned in bypass airflow passage 756.

The exhaust-water mixture 870 flows into the water separator 806. The water separator 806 separates the water 874 from the exhaust of the exhaust-water mixture 870 to generate separate exhaust 872 and the water 874. The exhaust 872 is exhausted out of the turbine engine 710 through the one or more core exhaust nozzles 732 to generate thrust, as detailed above. The boiler 802, the condenser 804, and the water separator 806 thus also define a portion of the hot gas path 778 (see FIG. 8) for routing the combustion gases 766, the exhaust-water mixture 870, and the exhaust 872 through the steam system 800 of the turbine engine 710.

The water pump 808 pumps the water 874 (e.g., in liquid form) through one or more water lines (as indicated by the arrow for the water 874 in FIG. 9) and the water 874 flows through the boiler 802. As the water 874 flows through the boiler 802, the combustion gases 766 flowing through the boiler 802 transfer heat into the water 874 to vaporize the water 874 and to generate the steam 876 (e.g., vapor). The steam turbine 810 includes one or more stages of steam turbine blades (not shown) and steam turbine stators (not shown). The steam 876 flows from the boiler 802 into the steam turbine 810, through one or more steam lines (as indicated by the arrow for the steam 876 in FIG. 9), causing the steam turbine blades of the steam turbine 810 to rotate, thereby generating additional work in an output shaft (e.g., one of the core shafts) connected to the turbine blades of the steam turbine 810.

As noted above, the turbomachine 716 includes shafts, also referred to as core shafts, coupling various rotating components of the turbomachine 716 and other thrust producing components such as the fan 738. In the turbomachine 716 shown in FIG. 8, these core shafts include the HP shaft 734 and the LP shaft 736. The steam turbine 810 is coupled to one of the core shafts of the turbomachine 716, such as the HP shaft 734 or the LP shaft 736. In the illustrated embodiment, the steam turbine 810 is coupled to the LP shaft 736. As the steam 876 flows from the boiler 802 through the steam turbine 810, the kinetic energy of this gas is converted by the steam turbine 810 into mechanical work in the LP shaft 736. The reduced temperature steam (as steam 878) exiting the steam turbine 810 is then injected into the core air flow path 733, such as into the combustor 726, upstream of the combustor 726, or downstream of the combustor 726. The steam 878 flows through one or more steam lines from the steam turbine 810 to the core air flow path 733. The steam 878 injected into the core air flow path 733 adds mass flow to the core air 764 such that less core air 764 is needed to produce the same amount of work through the turbine section 727. In this way, the steam system 800 extracts additional work from the heat in exhaust gas that would otherwise be wasted. The steam 878 injected into the core air flow path 733 is in a range of 20% to 50% of the mass flow through the core air flow path 733.

The steam turbine 810 may have a pressure expansion ratio in a range of 2:1 to 6:1. The pressure expansion ratio is a ratio of the pressure at an inlet of the steam turbine 810 to the pressure at an exit of the steam turbine 810. The steam turbine 810 may contribute approximately 25% of the power to the LP shaft 736 (or to the HP shaft 734) when the steam system 800 recovers approximately 70% of the water 874 and converts the water 874 into the steam 876. The steam turbine 810 has a pressure expansion ratio in a range of 2:1 to 6:1, the LPT 730 has a pressure expansion ratio in a range of 4.5:1 to 28:1, and the steam 878 contributes to 20% to 50% of the mass flow through the core air flow path 733. The steam turbine 810 expands the steam 876, thereby reducing the energy of the steam 878 exiting the steam turbine 810 and reducing the temperature of the steam 878 to approximately a temperature of the compressed air 765 (see FIG. 8) that is discharged from the HPC 724. Such a configuration enables the steam 878 to reduce hot spots in the combustor 726 from the combustion of the fuel (e.g., in particular when the fuel is supercritical hydrogen or gaseous hydrogen).

The steam 878 injected into the core air flow path 733 also enables the HPT 728 to have a greater energy output with fewer stages of the HPT 728 as compared to HPTs without the benefit of the present disclosure. For example, the additional mass flow from the steam 878 through the turbine section 727 helps to produce a greater energy output. In this way, HPT 728 may only have one stage capable sustainably driving a higher number of stages of the HPC 724 (e.g., 10, 11, or 12 stages of the HPC 724) due to the higher mass flow (resulting from the steam injection) exiting the combustor 726. The steam 878 that is injected into the core air flow path 733 enables the HPT 728 to have only one stage that drives the plurality of stages of the HPC 724 without reducing an amount of work that the HPT 728 produces as compared to HPTs without the benefit of the present disclosure, while also reducing a weight of the HPT 728 and increasing an efficiency of the HPT 728, as compared to HPTs without the benefit of the present disclosure.

With less core air 764 (see FIG. 8) needed due to the added mass flow from the steam 876, the compression ratio of the HPC 724 may be increased as compared to HPCs without the benefit of the present disclosure. In this way, the HPC 724 has a compression ratio greater than 20:1. In some embodiments, the compression ratio of the HPC 724 is in a range of 20:1 to 40:1. Thus, the compression ratio of the HPC 724 is increased, thereby increasing the thermal efficiency of the turbine engine 710 as compared to HPCs and turbine engines without the benefit of the present disclosure. Further, the HPC 724 may have a reduced throat area due to the added mass flow in the turbomachine 716 provided by the steam 876, 878 injected into the turbomachine 716. Accordingly, the HPC 724 has a reduced size (e.g., outer diameter) and a reduced weight, as compared to turbine engines without the benefit of the present disclosure.

In some embodiments, the HPC stator vanes of at least two stages of the HPC 724 are variable stator vanes that are controlled to be pitched about a pitch axis to vary a pitch of the HPC stator vanes. In some embodiments, the HPC 724 includes one or more compressor bleed valves that are controlled to be opened to bleed a portion of the compressed air 765 (see FIG. 8) from the HPC 724. The one or more compressor bleed valves are preferably positioned between a fourth stage of the HPC 724 and a last stage of the HPC 724. The HPC stator vanes that are variable stator vanes, and the one or more compressor bleed valves help to balance the air flow (e.g., the compressed air 765) through all stages of the HPC 724. Such a balance, in combination with the steam 878 injected into the core air flow path 733, enables the number of stages of the HPC 724 to include ten to twelve stages for compression ratios to be greater than 20:1, and preferably in a range of 20:1 to 40:1.

The additional work that is extracted by the steam system 800 and the steam 878 injected into the core air flow path 733 enables a size of the turbomachine 716 (FIG. 8) to be reduced, thereby increasing the bypass ratio of the turbine engine 710, as compared to turbine engines without the benefit of the present disclosure. In this way, the turbine engine 710 has a bypass ratio greater than 18:1, preferably, in a range of 18:1 to 100:1, more preferably, in a range of 25:1 to 85:1, and, most preferably, in a range of 28:1 to 70:1. In this way, the steam system 800 can enable an increased bypass ratio in which the turbine engine 710 can move a larger mass of air through the bypass, reducing the pressure ratio of the fan 738 and increasing the efficiency of the turbine engine 710 as compared to turbine engines without the benefit of the present disclosure.

The turbine engine 710 may also include an engine controller 820. The engine controller 820 is configured to operate various aspects of the turbine engine 710, including, in this embodiment, the water pump 808, a fuel bypass valve 914, a selector valve 928, a first heater 932, a second heater 934, and a third heater 936. The engine controller 820 may be a Full Authority Digital Engine Control (FADEC). In this embodiment, the engine controller 820 is a computing device having one or more processors 812 and one or more memories 814. The processor 822 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 824 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 824 can store information accessible by the processor 822, including computer-readable instructions that can be executed by the processor 822. The instructions can be any set of instructions or a sequence of instructions that, when executed by the processor 822, causes the processor 822 and the engine controller 820 to perform operations. In some embodiments, the instructions can be executed by the processor 822 to cause the processor 822 to complete any of the operations and functions for which the engine controller 820 is configured, as will be described further below. The instructions can be software written in any suitable programming language, or can be implemented in hardware. Additionally, and/or alternatively, the instructions can be executed in logically and/or virtually separate threads on the processor 822. The memory 824 can further store data that can be accessed by the processor 822.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Heating the fuel 767 (FIG. 8) prior to injecting the fuel 767 into the combustor 726 may be used for various reasons. Some fuels, such as hydrocarbon-based fuels may be heated, for example, to prevent ice formation or for performance benefits. Other fuels, such as cryogenic fuels, may be heated and vaporized (converted from a liquid state in which the cryogenic fuel is stored to a vapor state for combustion), prior to being injected into the combustor 726. As noted above, the embodiments discussed herein utilize a thermal transport system to transfer heat from the turbine engine 710 and to use that heat to help heat the fuel 767. More specifically, in the embodiments discussed herein, the water 874 is used as the heat transfer fluid to transfer heat from the steam system 800 to the fuel 767 in the fuel system 780. The following discussion makes reference to cryogenic fuel and, more specifically, hydrogen fuel, but the thermal transport systems discussed herein may be applicable to other fuel systems.

The fuel tank 782 is configured to hold the hydrogen fuel at least partially within the liquid phase and is configured to provide hydrogen fuel to the fuel delivery assembly 784 substantially completely in the liquid phase, such as completely in the liquid phase. The fuel tank 782 has a fixed volume and contains a volume of the hydrogen fuel in the liquid phase (e.g., liquid hydrogen fuel). As the fuel tank 782 provides hydrogen fuel to the fuel delivery assembly 784 substantially completely in the liquid phase, the volume of the liquid hydrogen fuel in the fuel tank 782 decreases and the remaining volume in the fuel tank 782 is made up by, for example, hydrogen substantially completely in the gaseous phase (gaseous hydrogen). As used herein, the term "substantially completely" is used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 782 at very low (cryogenic) temperatures, and, thus, the fuel tank 782 may also be referred to herein as a cryogenic fuel tank. For example, the hydrogen fuel may be stored in the fuel tank 782 at about −253 degrees Celsius (twenty Kelvin) or less at atmospheric pressure, or at other temperatures and pressures to maintain the hydrogen fuel substantially completely in the liquid phase. In some embodiments, the hydrogen fuel may be stored in the fuel tank 782 at temperatures from −259 degrees Celsius (fourteen Kelvin) to −243 degrees Celsius (thirty Kelvin), and, more preferably, from −253 degrees Celsius (twenty Kelvin) to −243 degrees Celsius (thirty Kelvin). To store the hydrogen fuel in the liquid phase, the fuel tank 782 stores and maintains the hydrogen cryogenically and may be a cryostat. The fuel tank 782 may thus be, for example, a dual wall tank, including an inner vessel (e.g., an inner cryogenic liquid tank) and an outer vessel (e.g., a vacuum vessel). The inner vessel may be positioned within the outer vessel with a gap formed between the inner vessel and the outer vessel. To provide thermal isolation for the inner vessel, the gap may be under vacuum. The gap may include a void space or be an entirely void space, but, alternatively, the gap may include multi-layer insulation (MLI), such as aluminized polyester films (e.g., aluminized Mylar®), for example.

The turbine engine 710 shown in FIG. 9 includes the first thermal transport system 900 that may be used to transfer heat from the steam system 800 to the fuel system 780. The first thermal transport system 900 includes a fuel heat exchanger 910 fluidly connected to the fuel delivery assembly 784. The fuel heat exchanger 910 of this embodiment is a fuel/water heat exchanger, and as the fuel 767 flows from the fuel tank 782 to the combustor 726, the fuel 767 absorbs (receives) heat from the water 874 of the steam system 800 and is heated. In some embodiments, the fuel heat exchanger 910 may be one of the vaporizers 788 discussed above. Although the fuel heat exchanger 910 may also be in addition to the vaporizers 788. The fuel heat exchanger 910 may be any suitable heat exchanger, including, for example, a plate heat exchanger or a tubular heat exchanger, such as a tube and shell heat exchanger. The fuel heat exchanger 910 thus includes a fluid flow path for the heat transfer fluid.

There may be instances when heating the fuel 767 with the water 874 is not desirable or when removing heat from the water 874 is not desirable. Such conditions include startup, as discussed further below, when the water 874 is not sufficiently hot enough to flow through the fuel heat exchanger 910 and to heat the fuel 767. Accordingly, the fuel system 780 of this embodiment includes a fuel bypass line 912 (i.e., a fuel bypass flow path) that fluidly connects a portion of the fuel delivery assembly 784 upstream of the fuel heat exchanger 910 with a portion of the fuel delivery assembly 784 downstream of the fuel heat exchanger 910, thus, bypassing the fuel heat exchanger 910. The fuel system 780 is, thus, selectively operable to redirect the fuel 767, or a portion thereof, and to bypass the fuel heat exchanger 910. The fuel bypass line 912 includes a fuel bypass valve 914 located in the fuel bypass line 912 and the fuel delivery assembly 784. The fuel bypass valve 914 is operable to open and to direct the fuel 767 through the fuel bypass line 912, bypassing the fuel heat exchanger 910, and, thus, the fuel bypass valve 914 selectively operates the fuel system 780 to bypass the fuel heat exchanger 910. The fuel bypass valve 914 may be any suitable valve including a three-way valve. The fuel bypass valve 914 may also be a flow control valve (e.g., a proportional control valve) that directs a portion of the fuel 767 and or controls the flow of the fuel 767 through the fuel heat exchanger 910 and the fuel bypass line 912. The fuel bypass valve 914 may be any suitable valve including, for example, an electrically operable valve, a hydraulically operable valve, or a pneumatically operable valve. When the fuel bypass valve 914 is hydraulically operable, the hydraulic fluid may be suitable fluids of the turbine engine 710 including, for example, the fuel 767, lubrication oil, and the like.

The first thermal transport system 900 includes a heat transfer loop 920 that thermally couples the condenser 804 with the fuel heat exchanger 910 to transfer heat from the condenser 804 with the fuel heat exchanger 910. More specifically, the water 874 flows through the heat transfer loop 920 to transfer heat from the condenser 804 to the fuel heat exchanger 910. The heat transfer loop 920 includes a supply line 922. The supply line 922 is fluidly connected to the line conveying the water 874 between the water pump 808 and the boiler 802. Thus, the supply line 922 is fluidly connected downstream of the water pump 808 and upstream of the boiler 802. As noted above, the water pump 808 directs the separated liquid water 874 through the boiler 802, and, with the location of the water pump 808 relative to the supply line 922, the water pump 808 may also be used to direct the flow of the water 874 through the first thermal transport system 900. The water 874 thus flows from the water pump 808 through the supply line 922 to the fuel heat exchanger 910.

Although the exhaust-water mixture 870 has been cooled to a temperature low enough to condense water from the combustion gases 766, the temperature of the water 874 may still be relatively high, such as from one hundred degrees Fahrenheit (100° F.) (thirty-eight degrees Celsius (38° C.)) to two hundred twelve degrees Fahrenheit (212° F.) (one hundred degrees Celsius (100° C.)) and more likely from one hundred fifty degrees Fahrenheit (150° F.) (sixty-six degrees Celsius (66° C.)) to two hundred twelve degrees Fahrenheit (212° F.) (one hundred degrees Celsius (100° C.)). Such temperatures are still higher than the temperature of the fuel 767, particularly, when the fuel is a cryogenic liquid fuel, such as hydrogen fuel, stored in the fuel tank 782 at cryogenic temperatures. Thus, as the water 874 flows through the fuel heat exchanger 910, the heat from the water 874 is transferred from the water 874 to the fuel 767, and the fuel 767 absorbs the heat from the water 874. The fuel 767 is thus heated and may be vaporized by the heat from the water 874 and the water 874 is cooled.

The water 874 then flows from the fuel heat exchanger 910 back to the boiler 802 where the water 874 can then be heated to form the steam 876 in the manner discussed above. The first thermal transport system 900 thus includes a return line 926 through which the water 874 flows from the fuel heat exchanger 910 and into the boiler 802. In FIG. 9, the return line 926 is shown as being fluidly connected to the boiler 802, but, alternatively, the return line 926 may be fluidly connected to a water line upstream of the boiler 802, such as a waterline directly connecting the water pump 808 with the boiler 802.

The water 874, having been cooled by the fuel 767, may be preheated before flowing into the boiler 802. A preheat heat exchanger may be located in the return line 926 to preheat the water 874. In this embodiment, the preheat heat exchanger is the condenser 804. The first thermal transport system 900 includes an intermediate return line 924 fluidly connecting the fuel heat exchanger 910 to a flow passage within the condenser 804, and the return line 926 fluidly connects the flow passage of the condenser 804 to the boiler 802. The water 874 may thus be preheated by the combustion gases 766 flowing through the condenser 804 before being introduced into the boiler 802.

The heat transfer loop 920 may be selectively operable such that the heat transfer loop 920 may be isolated or such that only a portion of the water 874 flows through the heat transfer loop 920. The heat transfer loop 920 includes a selector valve 928 located in the water line between the water pump 808 and the boiler 802. The selector valve 928 is operable to open and to direct the water 874 through the supply line 922 and to the fuel heat exchanger 910. The selector valve 928 may be any suitable valve including a three-way valve. The selector valve 928 may also be a flow control valve (e.g., a proportional control valve) that directs a portion of the water 874 and or controls the flow of the water 874 through the heat transfer loop 920. As with the fuel bypass valve 914 discussed above, the selector valve 928 may be an electrically operable valve, a hydraulically operable valve, or a pneumatically operable valve.

The water 874 is used as the heat transfer medium of the heat transfer loop 920 of this embodiment. To avoid freezing the water 874, the first thermal transport system 900 includes a plurality of heaters, including a first heater 932, a second heater 934, and a third heater 936. Any suitable heater may be used including, for example, one or more electrical resistance heaters, a catalytic heater, or a burner. In some environments, startup of the turbine engine 710 may occur at cold temperatures (e.g., as low as negative forty degrees Fahrenheit (−40° F.) (negative forty degrees Celsius (−40° C.))). At startup, the turbine engine 710 and, more specifically, the combustor 726, has not begun to operate and, thus, the components in the hot gas path 778 (FIG. 8) are closer to ambient conditions than their operational temperatures. With the components of the steam system 800 and/or the first thermal transport system 900 at these cold temperatures, the water 874 within the steam system 800 and the first thermal transport system 900 may freeze when the water 874 comes into contact with these components. To avoid such freezing, the heaters 932, 934, 936 are used to increase the temperature of these components above the freezing point of water (thirty-two degrees Fahrenheit (32° F.) (zero degrees Celsius (0° C.))), such as from thirty-five degrees Fahrenheit (35° F.) (one degree Celsius (1° C.)) to fifty degrees Fahrenheit (50° F.) (ten degrees Celsius (10° C.)). The first heater 932 may be located in the fuel heat exchanger 910 and used to raise the temperature of the fuel heat exchanger 910. The second heater 934 may be located in the water separator 806 and used to raise the temperature of the water separator 806. The third heater 936 may be located in the condenser 804 and used to raise the temperature of the condenser 804.

One or more temperature sensors (e.g., a first temperature sensor 940, a second temperature sensor 942, a third temperature sensor 944, and a fourth temperature sensor 946) may be used with the heaters 932, 934, 936 to provide input to operate the heaters 932, 934, 936 to heat the components as discussed above. The second temperature sensor 942 may be located within the fuel heat exchanger 910 and used to detect the temperature of the fuel heat exchanger 910. The second temperature sensor 942 may be communicatively coupled to the first heater 932 and, thus, provides input to operate the first heater 932 based on the temperatures sensed by the second temperature sensor 942. Similarly, the fourth temperature sensor 946 is located within the condenser 804 and may be used to detect the temperature of the condenser 804. The third heater 936 may be operated to increase the temperature of the condenser 804 based on the temperature sensed by the fourth temperature sensor 946. The first heater 932 and the third heater 936 may thus be operated to increase the temperature of the fuel heat exchanger 910 and the third heater 936, respectively, to increase the temperatures of these components, as discussed above.

When the temperatures of the fuel heat exchanger 910 and the condenser 804 have increased sufficiently, the water 874 may be circulated through the water line connecting the water separator 806 to the boiler 802 and the heat transfer loop 920. The water 874 may be initially heated within the water separator 806 by the second heater 934. The first temperature sensor 940 may be located in the supply line 922 to determine the temperature of the supply line 922 and the water 874 flowing therein. Similarly, the third temperature sensor 944 may be located in a water line positioned downstream of the water separator 806 and upstream of the boiler 802 to determine the temperature of the water line and the water 874 flowing therein. The second heater 934 positioned in the water separator 806 may be used to increase the temperature of the water separator 806 and also the water 874 before flowing through the steam system 800 and the first thermal transport system 900. The first temperature sensor 940 and the third temperature sensor 944 may thus be used to monitor the temperature of the water 874 and to provide input to operate the heaters 932, 934, 936 based on these temperatures.

When the fuel 767 is a cryogenic fuel, the fuel 767 may be directed through the fuel bypass line 912 during startup operations to avoid cooling the fuel heat exchanger 910 and negating the effects of the first heater 932. As the water 874 increases in temperature, as detected by, for example, the first temperature sensor 940, the fuel bypass valve 914 may be operated to slowly introduce the fuel 767 into the fuel heat exchanger 910.

A method of starting-up the turbine engine 710 may start with the steam injection system off due to the potential for sub-freezing temperatures. The fuel bypass valve 914 may be positioned to bypass the fuel heat exchanger 910 and have fuel 767 flow through the fuel bypass line 912. The selector valve 928 is also positioned to direct all of the water 874 to the boiler 802 and to bypass the heat transfer loop 920. The turbine engine 710 is started with the water pump 808 off. The turbine engine 710 is brought up to idle using, for example, a starter motor. Using the second temperature sensor 942, the temperature of the fuel heat exchanger 910 is measured. If the temperature of the fuel heat exchanger 910 is not above a heater threshold temperature, the first heater 932 is used to heat the fuel heat exchanger 910 to the temperatures discussed above. Preferably, the heater threshold temperature is greater than the freezing temperature of water (i.e., greater than thirty-two degrees Fahrenheit (32° F.) (zero degrees Celsius (0° C.))), such as from thirty-five degrees Fahrenheit (35° F.) (one degree Celsius (1° C.)) to fifty degrees Fahrenheit (50° F.) (ten degrees Celsius (10° C.)). If (or once) the temperature of the fuel heat exchanger 910 reaches the heater threshold temperature, the water pump 808 and/or the selector valve 928 is modulated (controlled) to send at least some water 874 through the heat transfer loop 920.

Once the water 874, flowing through the fuel heat exchanger 910, is above a minimum threshold as measured by the first temperature sensor 940, the fuel bypass valve 914 is used to modulate (i.e., control) the flow of fuel 767 into the fuel heat exchanger 910. The fuel 767 may be modulated using the fuel bypass valve 914 to maintain the water 874 above the minimum threshold temperature. The water 874 is preferably at least eighty degrees Fahrenheit (80° F.) (twenty-six degrees Celsius (26° C.)) before the fuel 767 is introduced into the fuel heat exchanger to prevent instant freezing of the water 874, and thus the minimum threshold may be, for example eighty degrees Fahrenheit (80° F.) (twenty-six degrees Celsius (26° C.)) or more, such as, preferably, from eighty degrees Fahrenheit (80° F.) (twenty-six degrees Celsius (26° C.)) to one hundred sixty degrees Fahrenheit (160° F.) (seventy-one degrees Celsius (71° C.)). A water 874 temperature at the inlet to the fuel heat exchanger 910 of one hundred sixty degrees Fahrenheit (160° F.) (seventy-one degrees Celsius (71° C.)) or less minimize the potential foil boiling at altitude. As the temperature of the water 874 increases due to operation of the turbine engine 710, the selector valve 928 and/or the water pump 808 may be controlled to increase the flow of the water 874 through the first thermal transport system 900 to a maximum position. The fuel bypass valve 914 may be used to modulate the fuel 767 flowing into the fuel heat exchanger 910 as the flow of water 874 flowing through the heat transfer loop 920 is increased. The flow of the water 874 and the flow of the fuel 767 are increased until the turbine engine 710 reaches a full idle operation.

Once the combustor 726 is producing the combustion gases 766, the condenser 804 and the water separator 806 will have these hot combustion gases 766 flowing therethrough, providing heat to these components. During the start-up sequence, particularly for start-up when the turbine engine 710 has been exposed to sub-freezing temperatures while shutdown, the second heater 934 and the third heater 936 may be used to heat the water separator 806 and the condenser 804, respectively, to temperatures above the freezing point of water (thirty-two degrees Fahrenheit (32° F.)), such as from thirty-five degrees Fahrenheit (35° F.) (one degree Celsius (1° C.)) to fifty degrees Fahrenheit (50° F.) (ten degrees Celsius (10° C.)). The method of starting-up the turbine engine 710, thus may also include, using the fourth temperature sensor 946 to measure the temperature of the condenser 804. If the temperature of the condenser 804 is not above a heater threshold temperature (discussed above), the fourth temperature sensor 946 is used to heat the condenser 804 to the temperatures discussed above. If (or once) the temperature of the condenser 804 reaches the heater threshold temperature, the turbine engine 710 can be started, such as by igniting the fuel 767 in the combustor 726. Once the combustor ignition has occurred, the second heater 934 and the third heater 936 may be turned off. In some embodiments, the third temperature sensor 944, positioned in the water line fluidly connecting the water separator 806 with the water pump 808, can be used to control the second heater 934 during the startup sequence and determine when to turn off the second heater 934.

A method of shutting down the turbine engine 710 may include decelerating the turbine engine 710 to ground idle thrust. Then, the fuel bypass valve 914 is positioned to bypass all of the fuel 767 around the fuel heat exchanger 910 and through the fuel bypass line 912. The selector valve 928 is then positioned to direct all of the water 874 directly to the boiler 802, bypassing the heat transfer loop 920. The water pump 808 is then shut off. The combustion gases 766 continue to flow through the hot gas path 778 with the water pump 808 shut off allowing the condenser 804 and the water separator 806 to be dried out at temperatures above freezing. Once dry, the pump 786 that pumps the fuel 767 from the fuel tank 782, through the fuel delivery assembly 784, can be shut off to shut down the turbine engine 710.

As noted above, the engine controller 820 is configured to operate various aspects of the turbine engine 710, including, in this embodiment, the components described in the methods above. Accordingly, in some embodiments, the engine controller 820 is configured to execute the steps of the method discussed above. More specifically, for example, the processor 822 may execute a sequence of instructions stored on the memory 824 to operate the turbine engine 710 in the manner described above.

Figure 10:
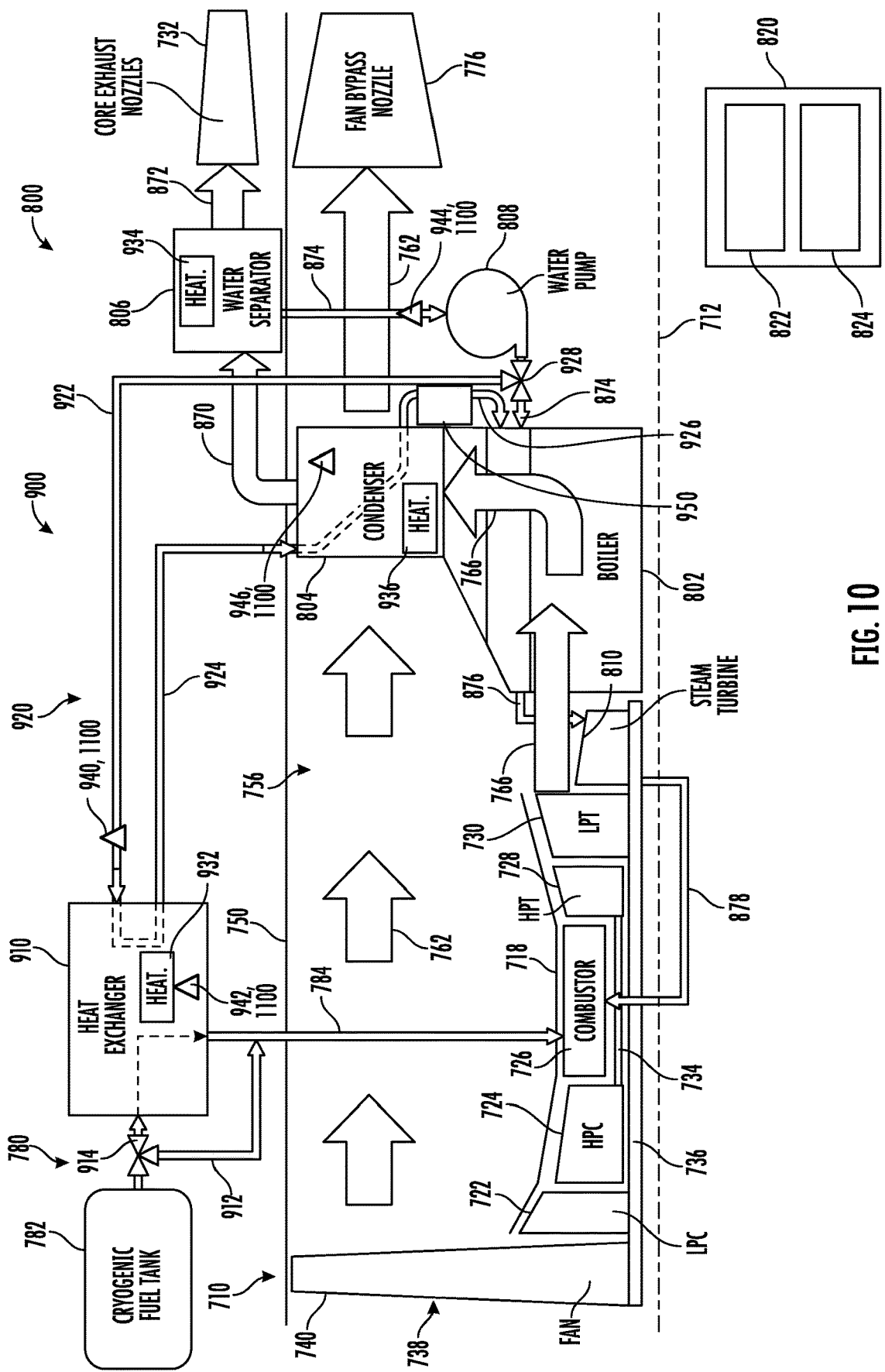
FIG. 10 is a schematic diagram of the turbine engine and the steam system with a thermal transport system according to an embodiment of the present disclosure.

FIG. 10 is a schematic diagram of the turbine engine 710 and the steam system 800 of FIG. 8 having a thermal transport system 902, according to the present disclosure. For clarity with the other thermal transport systems discussed herein, the thermal transport system 902 of this embodiment will be referred to as a second thermal transport system 902. The second thermal transport system 902 is similar to the first thermal transport system 900 discussed above with reference to FIG. 9. The same reference numerals will be used for components of the second thermal transport system 902 that are the same as or similar to the components of the first thermal transport system 900 discussed above. The description of these components above also applies to this embodiment, and a detailed description of these components is omitted here.

The water 874 in the heat transfer loop 920 of the first thermal transport system 900 discussed above with reference to FIG. 9 is routed between the fuel heat exchanger 910 and the condenser 804. The water 874, however, may be routed to other components to either transfer heat to those components or to receive heat from those components. The heat transfer loop 920 of the second thermal transport system 902 thus includes an additional heat exchanger. In this embodiment, the additional heat exchanger is a water/oil heat exchanger 950. The water/oil heat exchanger 950 is positioned in the return line 926 downstream of the condenser 804 and upstream of the boiler 802. The water/oil heat exchanger 950 may be located at other locations within the heat transfer loop 920, including in fluidic communication with the intermediate return line 924 downstream of the fuel heat exchanger 910 and upstream of the condenser 804. After flowing through the condenser 804, the water 874 is further heated by extracting heat (i.e., absorbing heat) from oil, such as lubrication oil, flowing through the turbine engine 710. The water/oil heat exchanger 950 may thus be used as a heat sink (e.g., an oil coiler) for the lubrication oil to cool the lubrication oil flowing through the turbine engine 710. The other (or additional) engine components also may include electrical devices, including motors, generators, and controls. This additional heat exchanger may be a heat exchanger or heat sink for other systems of the turbine engine 710 or aircraft, such as, for example, a cooler for an environmental control system (ECS) of the aircraft.

Figure 11:
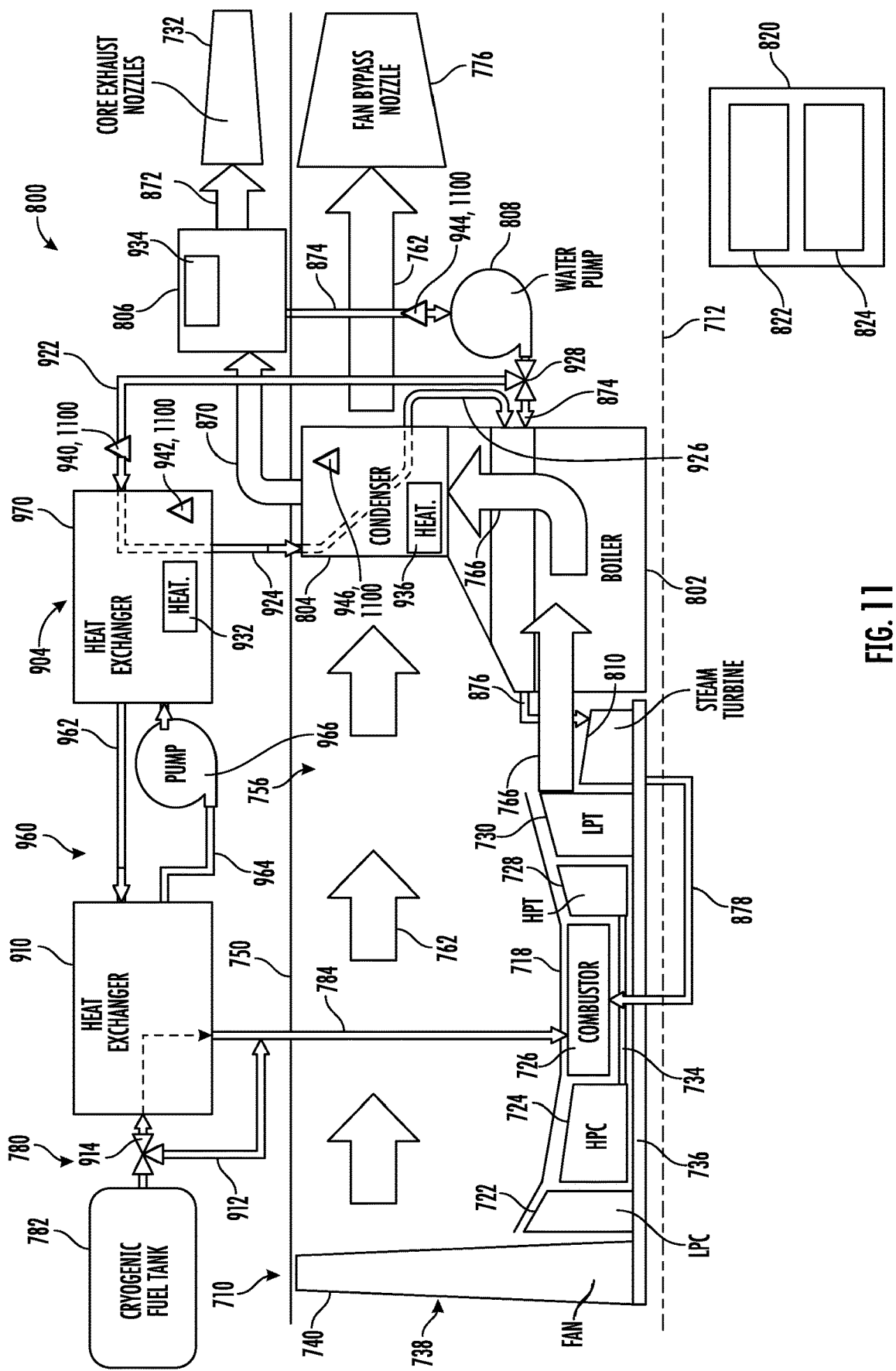
FIG. 11 is a schematic diagram of the turbine engine and the steam system with a thermal transport system according to an embodiment of the present disclosure.

FIG. 11 is a schematic diagram of the turbine engine 710 and the steam system 800 of FIG. 8 having a thermal transport system 904, according to the present disclosure. For clarity with the other thermal transport systems discussed herein, the thermal transport system 904 of this embodiment will be referred to as a third thermal transport system 904. The third thermal transport system 904 is similar to the first thermal transport system 900 discussed above with reference to FIG. 9. The same reference numerals will be used for components of the third thermal transport system 904 that are the same as or similar to the components of the first thermal transport system 900 discussed above. The description of these components above also applies to this embodiment, and a detailed description of these components is omitted here.

A single heat transfer medium or a working fluid (water 874) is used in the first thermal transport system 900. Using an additional working fluid (e.g., an intermediate heat transfer medium) may be advantageous with the fuel 767 at cryogenic temperatures and the water 874 at relatively hot temperatures (as discussed above). The third thermal transport system 904 of this embodiment thus includes an intermediate heat transfer loop 960 through which the intermediate heat transfer medium flows. With the fuel 767 at cryogenic temperatures, the intermediate heat transfer medium may be a fluid other than water, and suitable intermediate heat transfer mediums include, for example, helium, nitrogen, or carbon dioxide. When carbon dioxide is used, the carbon dioxide is preferably gaseous carbon dioxide and, more preferably supercritical carbon dioxide.

Instead of being directed to the fuel heat exchanger 910, the water 874 flows through the heat transfer loop 920 (referred to in this embodiment as a first heat transfer loop or a water heat transfer loop) into an intermediate heat exchanger 970. The intermediate heat exchanger 970 may be similar to the fuel heat exchanger 910 discussed above, but instead of having the fuel 767 flow therethrough, the intermediate heat transfer medium flows through the intermediate heat exchanger 970 and the heat from the water 874 is transferred from the water 874 and absorbed by the intermediate heat transfer medium.

The intermediate heat transfer loop 960 includes a supply line 962 fluidly connecting the intermediate heat exchanger 970 with the fuel heat exchanger 910. The intermediate heat transfer medium, after being heated in the fuel heat exchanger 910, flows from the intermediate heat exchanger 970 to the fuel heat exchanger 910. In the fuel heat exchanger 910, the heat is transferred from the intermediate heat transfer medium to the fuel 767 in a manner similar that discussed above for the water 874. The intermediate heat transfer loop 960 also includes a return line 964, fluidly connecting the fuel heat exchanger 910 with the intermediate heat exchanger 970. After transferring heat to the fuel 767 and being cooled, the intermediate heat transfer medium flows through the return line 964 from the fuel heat exchanger 910 to the intermediate heat exchanger 970.

The intermediate heat transfer loop 960 includes an intermediate fluid pump 966. The intermediate fluid pump 966 induces the flow of the intermediate heat transfer medium through intermediate heat transfer loop 960 between the fuel heat exchanger 910 and the intermediate heat exchanger 970. The intermediate fluid pump 966 may be located at any suitable location within the intermediate heat transfer loop 960, but, in this embodiment, the intermediate fluid pump 966 is located in the return line 964.

The turbine engine 710 of the embodiments discussed herein includes a steam system 800. The turbine engine 710 also includes a thermal transport system that may be used to transfer heat from the steam system 800 to the fuel 767 and to heat (or vaporize) the fuel 767. Using the water 874 and thermal transport systems discussed have the advantage of reducing the size of the boiler 802 by raising the temperature of the water 874 at the inlet of the boiler 802. If cryogenic fuel is heated by being routed through the condenser 804, the condenser 804 risks icing due to the extreme cold of the cryogenic fuel. Using the water 874 and the thermal transport systems discussed herein mitigates the risk of icing in the condenser 804, where the ice could block the bypass air 762 from the fan 738, reducing thrust.

Figure 12:
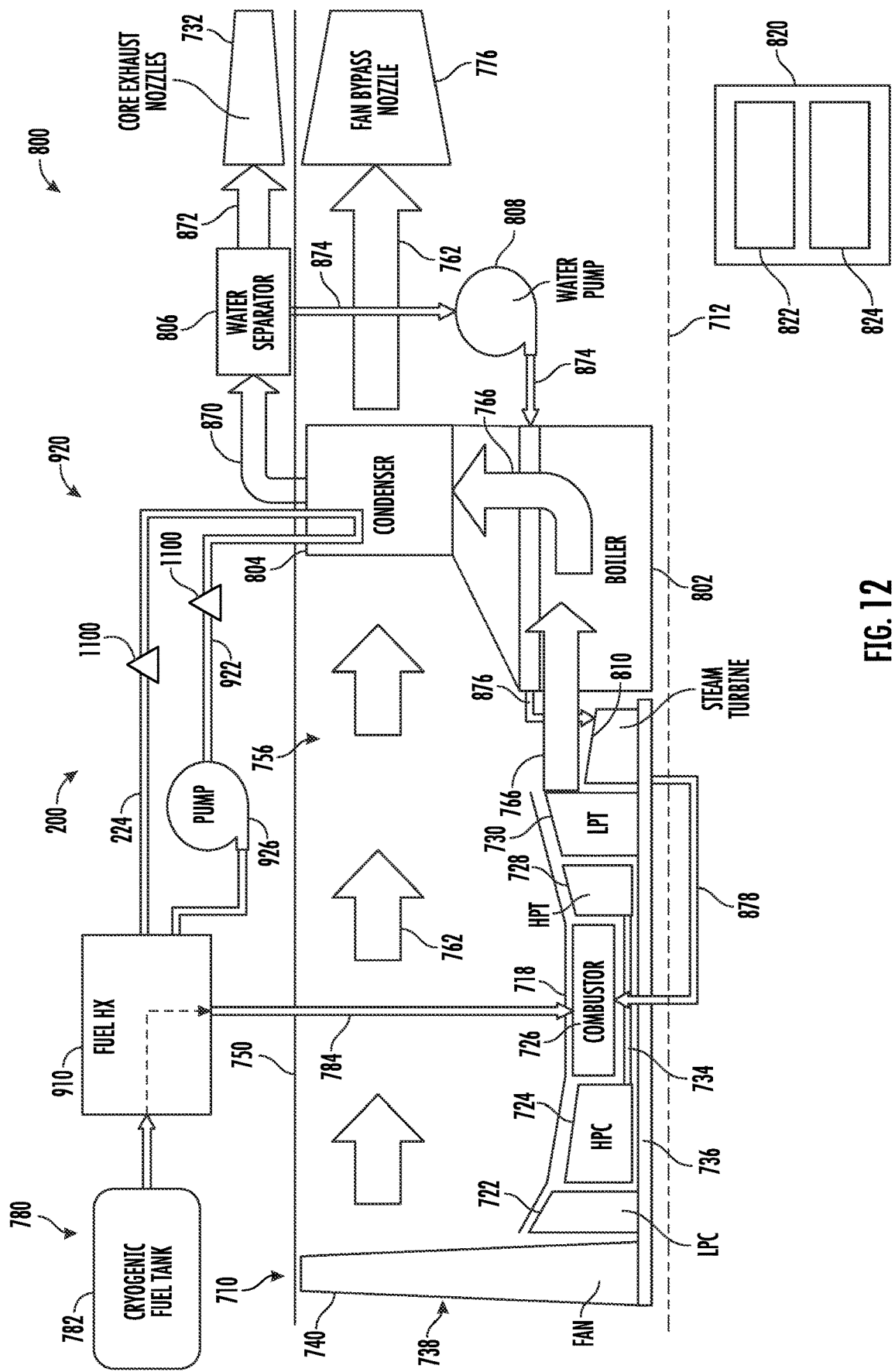
FIG. 12 is a schematic diagram of the turbine engine and a steam system with a thermal transport system according to an embodiment of the present disclosure.

Referring now to FIG. 12, another exemplary embodiment of a turbine engine 7100 of the present disclosure is provided. The turbine engine 7100 of FIG. 12 may be configured in substantially the same manner as one or more of the gas turbine engines 800 described above, e.g., with reference to FIG. 9.

For example, the gas turbine engine 7100 includes a first thermal transport system 900. However, a heat transfer fluid of the first thermal transport system 900 may not be water, as the first thermal transport system 900 may be fluidly separated from the water/steam flows through the gas turbine engine 100.

For the embodiment shown, the first thermal transport system 900 includes a heat transfer loop 920 that thermally couples the condenser 804 with the fuel heat exchanger 910 to transfer heat from the condenser 804 with the fuel heat exchanger 910. More specifically, a heat transfer fluid flows through the heat transfer loop 920, and the heat transfer loop 920 is fluidly connected to the fuel heat exchanger 910 and the condenser 804 to circulate the heat transfer fluid between the fuel heat exchanger 910 and the condenser 804. The condenser 804 includes a fluid flow path for the heat transfer fluid, and, as heat transfer fluid flows through the condenser 804, the heat transfer fluid is heated by the combustion gases 766 also flowing through the condenser 804. The heat transfer fluid thus R absorbs heat from the combustion gases 766.

The heat transfer loop 920 includes a supply line 922. The supply line 922 is fluidly connected to each of the condenser 804 and the fuel heat exchanger 910. The heat transfer fluid, after being heated by the combustion gases 766, flows through the supply line 922 from the condenser 804 to the fuel heat exchanger 910 where, as discussed above, heat is transferred from the heat transfer fluid to the fuel 767.

The heat transfer loop 920 also includes a return line 924 fluidly connected to each of the fuel heat exchanger 910 and the condenser 804. The heat transfer fluid, after transferring heat to the fuel 767, flows through the return line 924 from the fuel heat exchanger 910 to the condenser 804 where, as discussed above, heat is transferred from the combustion gases 766 to the heat transfer fluid.

The heat transfer loop 920 also includes a heat transfer fluid pump 927. The heat transfer fluid pump 927 induces the flow of the heat transfer fluid through the heat transfer loop 920 between the fuel heat exchanger 910 and the condenser 804. The heat transfer fluid pump 927 may be located at any suitable location within the heat transfer loop 920, but, in this embodiment, the heat transfer fluid pump 927 is located in the supply line 922. Any pump suitable for the heat transfer fluid may be used, such as, for example, a positive displacement pump, a centrifugal pump, or a compressor. The heat transfer fluid may be a suitable working fluid that is used to transfer heat between the environments of the combustion gases 766 and the fuel 767. Suitable heat transfer fluids include, for example, helium, nitrogen, supercritical carbon dioxide, a silicon-based heat transfer fluid (e.g., Syltherm™ 800 or Syltherm™ XLT, each produced by Dow of Midland, Michigan, USA), or sulfur hexafluoride.

Figure 13:
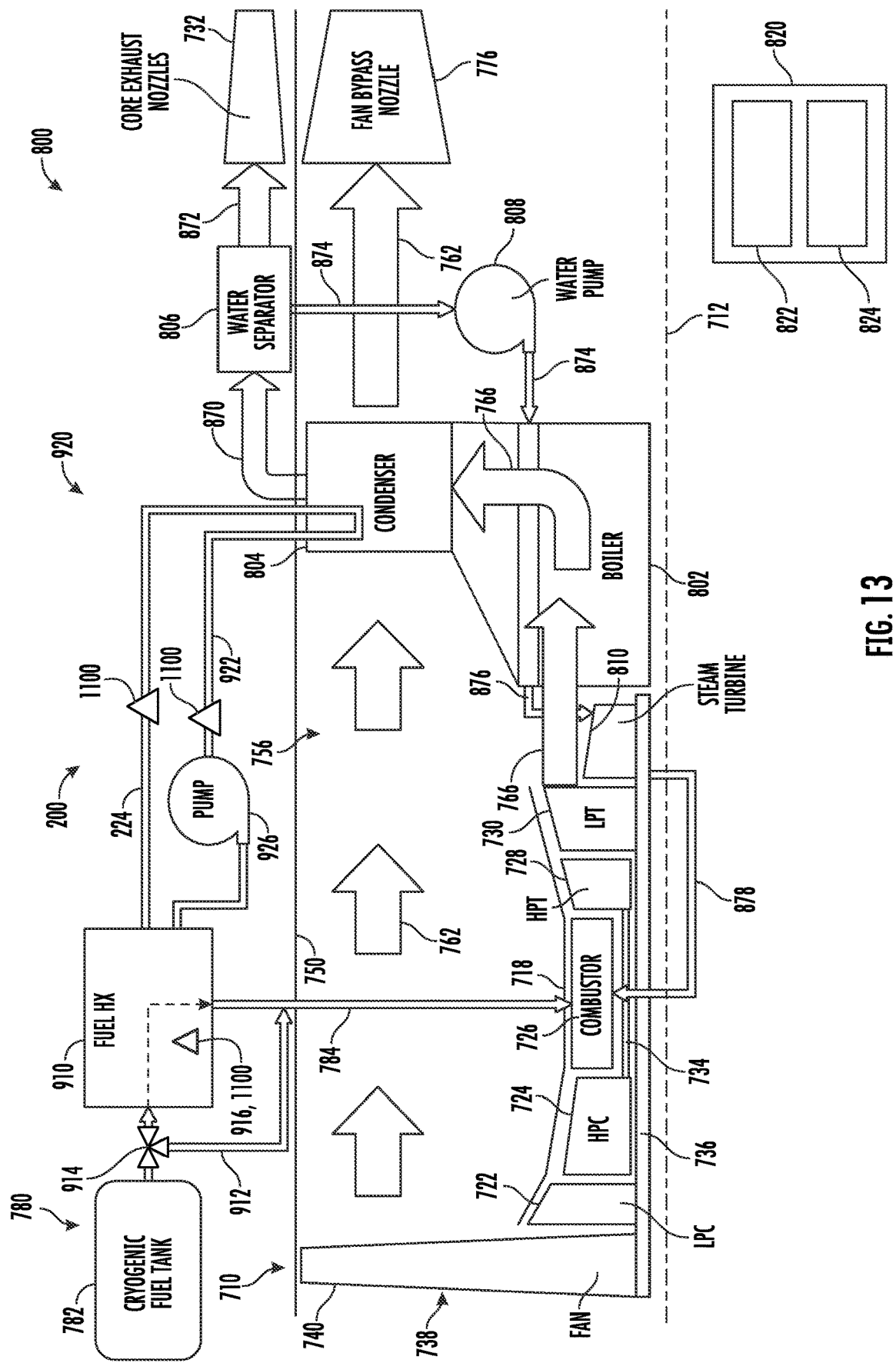
FIG. 13 is a schematic diagram of the turbine engine and the steam system with a thermal transport system according to an embodiment of the present disclosure.

FIG. 13 is a schematic diagram of the turbine engine 710 and the steam system 800 of FIG. 8 having a thermal transport system 901, according to the present disclosure. For clarity with the other thermal transport systems discussed herein, the thermal transport system 901 of this embodiment will be referred to as a second thermal transport system 901. The second thermal transport system 901 is similar to the first thermal transport system 900 discussed above with reference to FIG. 12. The same reference numerals will be used for components of the second thermal transport system 901 that are the same as or similar to the components of the first thermal transport system 900 discussed above. The description of these components above also applies to this embodiment, and a detailed description of these components is omitted here.

Referring now to FIG. 13, another exemplary embodiment of the present disclosure is provided. The exemplary embodiment of FIG. 13 may be configured in a similar manner as the exemplary embodiment of FIG. 12, and the same or similar numbers may refer to the same or similar parts.

However, the embodiment of FIG. 13 includes a fuel bypass line 912 (i.e., a fuel bypass flow path) that fluidly connects a portion of the fuel delivery assembly 784 upstream of the fuel heat exchanger 910 with a portion of the fuel delivery assembly 784 downstream of the fuel heat exchanger 910, thus, bypassing the fuel heat exchanger 910. The fuel system 780 is, thus, selectively operable to redirect the fuel 767, or a portion thereof, and to bypass the fuel heat exchanger 910. The fuel bypass line 912 includes a fuel bypass valve 914 located in the fuel bypass line 912 and the fuel delivery assembly 784.

Figure 14:
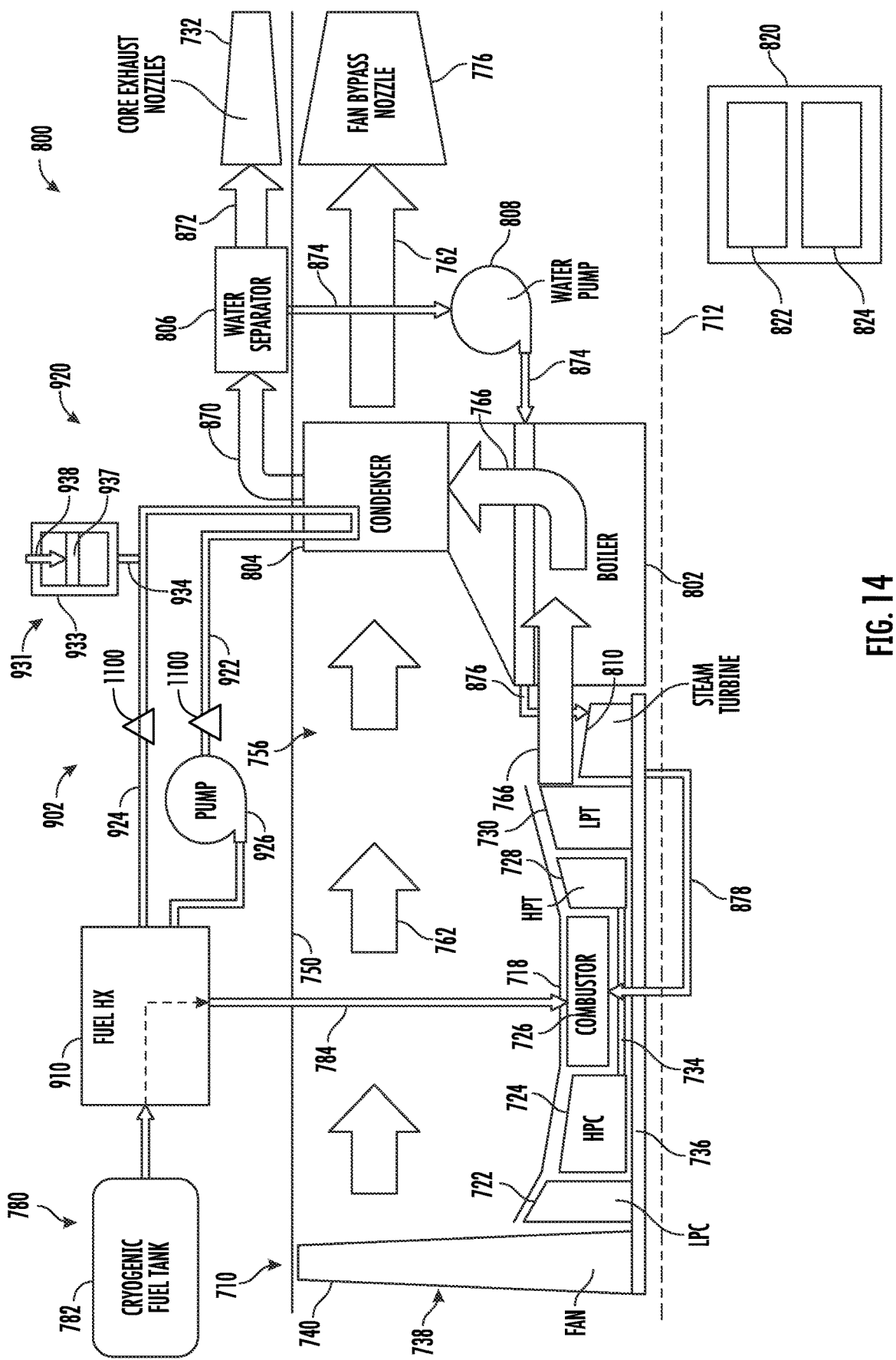
FIG. 14 is a schematic diagram of the turbine engine and the steam system with a thermal transport system according to an embodiment of the present disclosure.

Referring now to FIG. 14, another exemplary embodiment of the present disclosure is provided. The exemplary embodiment of FIG. 14 may be configured in a similar manner as the exemplary embodiment of FIG. 12, and the same or similar numbers may refer to the same or similar parts.

However, for the embodiment of FIG. 14, a heat transfer loop 920 of the gas turbine engine 7100 also includes an accumulator 931. The accumulator 931 may be used to regulate a volume of a heat transfer fluid within the heat transfer loop 920 and/or the pressure of the heat transfer fluid within the heat transfer loop 920. The accumulator 931 may be particularly advantageous when the heat transfer fluid is a heat transfer fluid that has a propensity to change phases under the operational conditions of the heat transfer loop 920 discussed herein. The accumulator 931 may be used to regulate the pressure of the heat transfer fluid and maintain the heat transfer fluid in the desired phase.

For example, supercritical carbon dioxide is one such heat transfer fluid that has a propensity to change phases and accumulator 931 may be used to regulate the pressure of the heat transfer fluid in the heat transfer loop 920 to maintain carbon dioxide in a supercritical state. The accumulator 931 includes a fluid reservoir 933, such as a tank that is fluidly connected to the heat transfer loop 920 by an accumulator line 934. The accumulator 931 may be fluidly connected by the accumulator line 934 at any suitable location within the heat transfer loop 920, but, in this embodiment, the accumulator 931 is fluidly connected to the return line 924.

The accumulator 931 may be a variable volume accumulator that includes, for example, a diaphragm 937 or other suitable movable component to change the volume of the fluid reservoir 933. The diaphragm 937 may be moved by a movement mechanism 938. For example, the diaphragm 937 may be actively controlled by an actuator as the movement mechanism 938 to move the diaphragm 937. Suitable actuators include, for example, an electrical actuator or a hydraulic actuator. When a hydraulic actuator is used, the hydraulic fluid may be suitable fluids of the turbine engine 710 including, for example, the fuel 767, lubrication oil, and the like. When the diaphragm 937 is actively controlled, a pressure sensor or other sensor is located within the heat transfer loop 920 and communicatively connected to the engine controller 820. The engine controller 820 is communicatively and operatively connected to the movement mechanism 938, and the engine controller 820 is configured to operate the movement mechanism 938 and to move the diaphragm 937 based on the input received from the sensor. Alternatively, the diaphragm 937 may be passively controlled, in which the case, the movement mechanism 938 is a passive mechanism (e.g., a biasing member) such as a spring or a bellows that exerts a desired force (i.e., a biasing force) on the diaphragm 937 such that the volume of the accumulator 931 increases in response to an increase in pressure of the heat transfer fluid in the heat transfer loop 920 and decreases in volume in response to a decrease in pressure of the heat transfer fluid in the heat transfer loop 920.

Figure 15A:
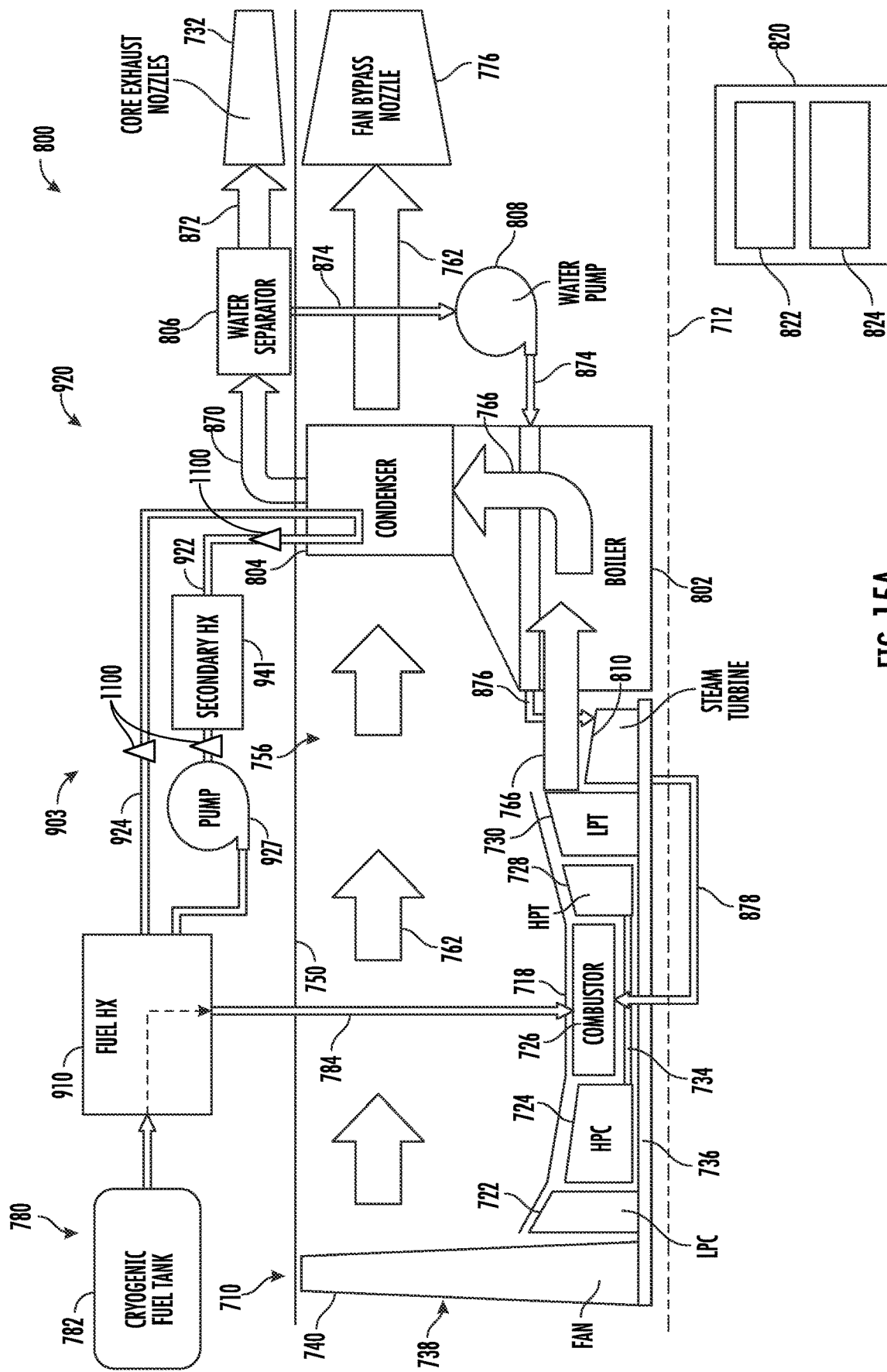
FIG. 15A is a schematic diagram of the turbine engine and the steam system with a thermal transport system according to an embodiment of the present disclosure.

FIG. 15A is a schematic diagram of the turbine engine 710 and the steam system 800 of FIG. 8 having a thermal transport system 903, according to the present disclosure. For clarity with the other thermal transport systems discussed herein, the thermal transport system 903 of this embodiment will be referred to as a fourth thermal transport system 903. The fourth thermal transport system 903 is similar to the first thermal transport system 900 discussed above with reference to FIG. 12. The same reference numerals will be used for components of the fourth thermal transport system 903 that are the same as or similar to the components of the first thermal transport system 900 discussed above. The description of these components above also applies to this embodiment, and a detailed description of these components is omitted here.

The heat transfer fluid and the heat transfer loop 920 may also be used to transfer heat to or from other components of the turbine engine 710. The temperature of the heat transfer fluid exiting the condenser 804 may be, for example, less than two hundred twelve degrees Fahrenheit (212° F.) and thus may be suitable for use as a heat sink for other systems within the turbine engine 710, such as lubrication oil systems. The heat transfer loop 920 is thus fluidly connected to another device or a system and, more specifically, a secondary heat exchanger 941 of the other device or the system. The heat transfer fluid flows through the secondary heat exchanger 941 and transfers heat to or absorbs heat from the other device or the system. The secondary heat exchanger 941 is located in series with the condenser 804. The secondary heat exchanger 941 may be located at any suitable location within the heat transfer loop 920, but, in this embodiment, the secondary heat exchanger 941 is located in the supply line 922, downstream of the condenser 804 and upstream of the fuel heat exchanger 910. The secondary heat exchanger 941 is also located upstream of the heat transfer fluid pump 927. The heat transfer fluid may be used to absorb heat from the other device or the system and, thus, be used to cool the other device or the system. The other device may be, for example, motor generators. The other system may include, for example, an oil system with the secondary heat exchanger 941 being an oil cooler used to cool oil, such as lubrication oil, a cooling air system, or a heat exchanger located downstream of the HPC 724 or in the later stages of the HPC 724 to cool the compressed air.

Figure 15B:
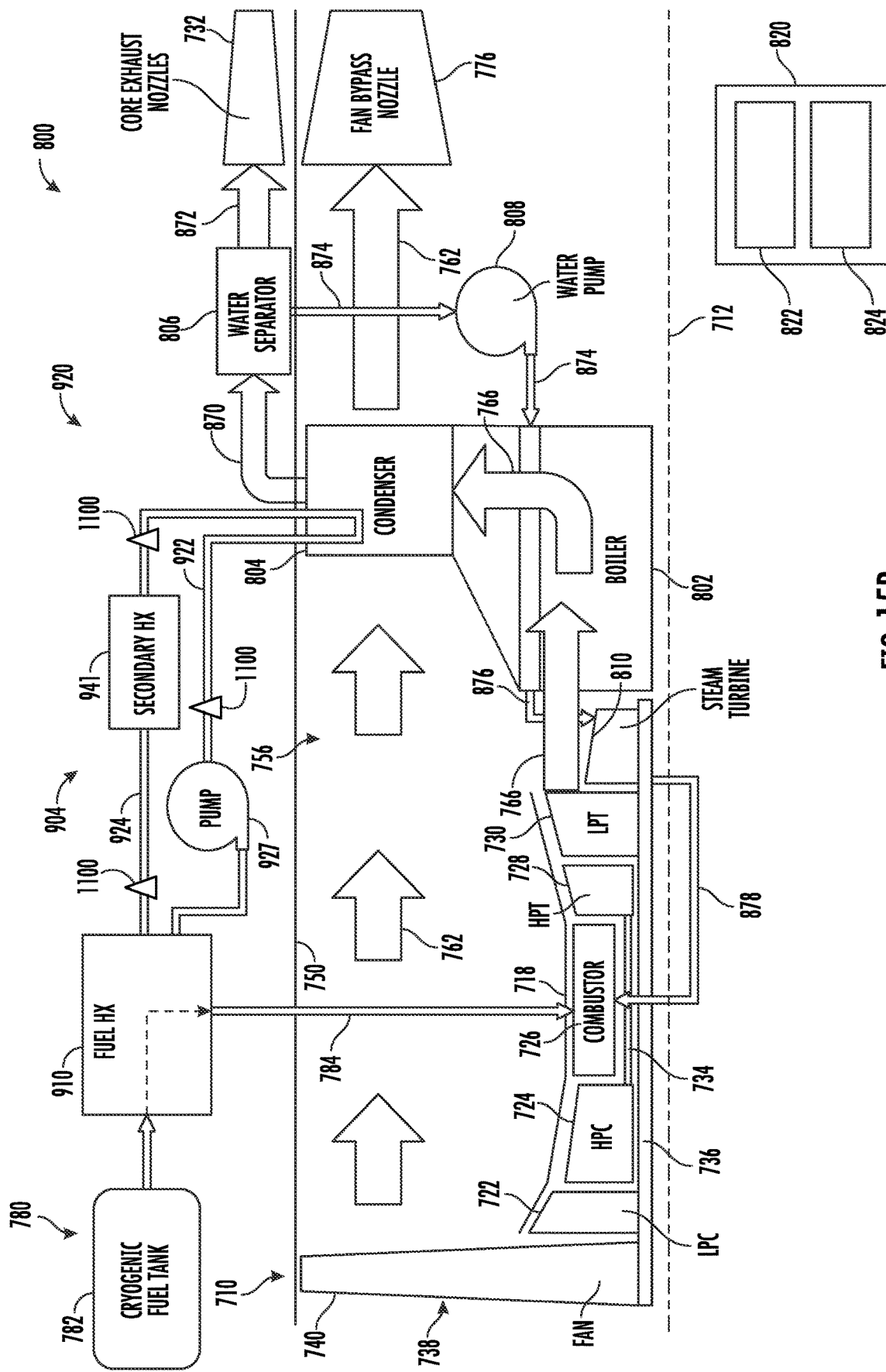
FIG. 15B is a schematic diagram of the turbine engine and the steam system with a thermal transport system according to an embodiment of the present disclosure.

FIG. 15B is a schematic diagram of the turbine engine 710 and the steam system 800 of FIG. 8 having a thermal transport system 904, according to the present disclosure. For clarity with the other thermal transport systems discussed herein, the thermal transport system 904 of this embodiment will be referred to as a fifth thermal transport system 904. The fifth thermal transport system 904 is similar to the fourth thermal transport system 903 discussed above with reference to FIG. 15A. The same reference numerals will be used for components of the fifth thermal transport system 904 that are the same as or similar to the components of the fourth thermal transport system 903 discussed above. The description of these components above also applies to this embodiment, and a detailed description of these components is omitted here. In the fourth thermal transport system 903 of FIG. 15A, the secondary heat exchanger 941 is located in the supply line 922, downstream of the condenser 804 and upstream of the fuel heat exchanger 910. As noted above, however, the secondary heat exchanger 941 may be located at other positions within the heat transfer loop 920. The secondary heat exchanger 941 of this embodiment is located in the return line 924, downstream of the fuel heat exchanger 910 and upstream of the condenser 804.

Figure 16:
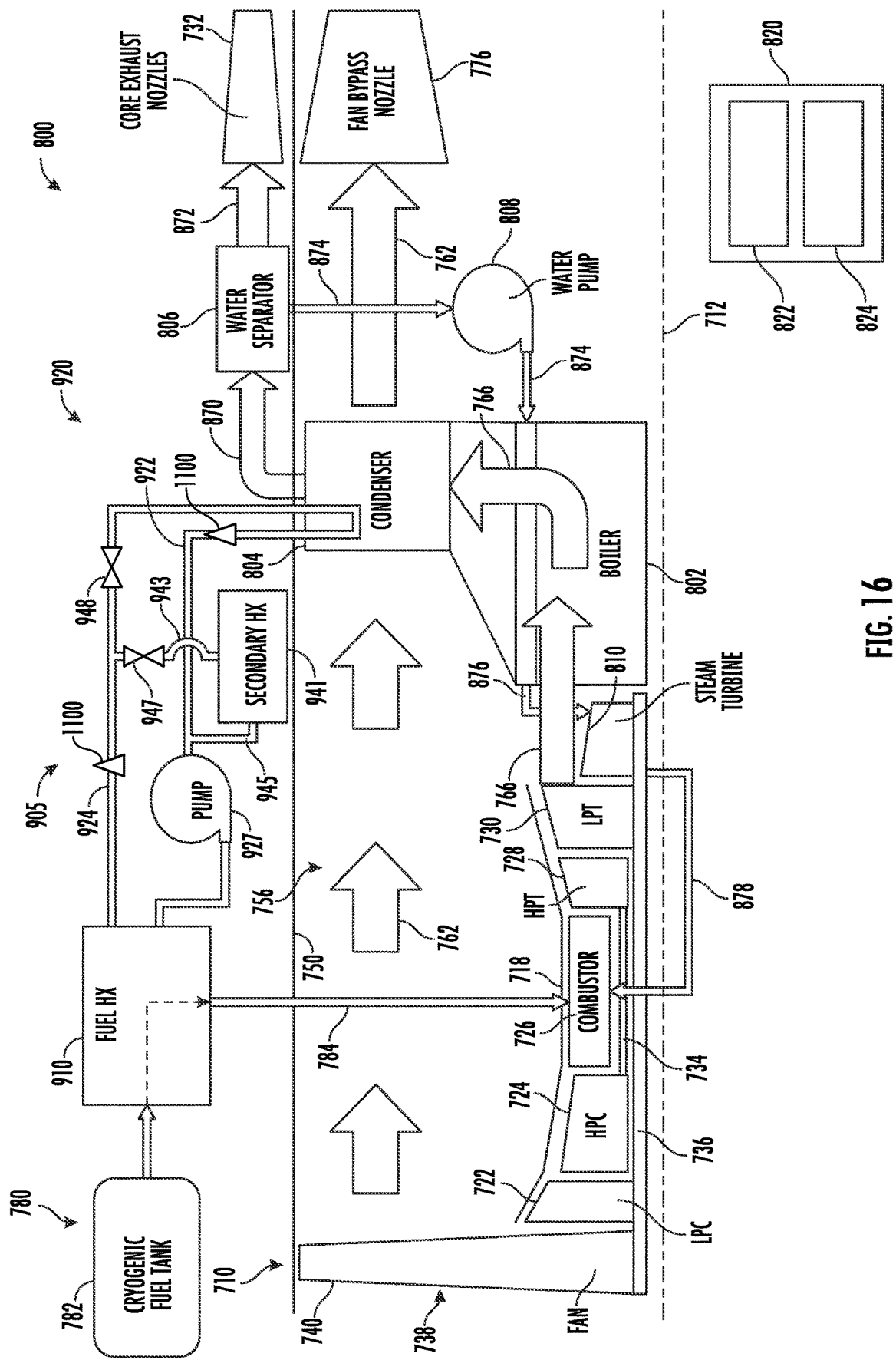
FIG. 16 is a schematic diagram of the turbine engine and the steam system with a thermal transport system according to an embodiment of the present disclosure.

FIG. 16 is a schematic diagram of the turbine engine 710 and the steam system 800 of FIG. 8 having a thermal transport system 905, according to the present disclosure. For clarity with the other thermal transport systems discussed herein, the thermal transport system 905 of this embodiment will be referred to as a sixth thermal transport system 905. The sixth thermal transport system 905 is similar to the fourth thermal transport system 903 discussed above with reference to FIG. 15A. The same reference numerals will be used for components of the sixth thermal transport system 905 that are the same as or similar to the components of the fourth thermal transport system 903 discussed above. The description of these components above also applies to this embodiment, and a detailed description of these components is omitted here.

In the fourth thermal transport system 903, the secondary heat exchanger 941 is located in series with the condenser 804, but other arrangements of the secondary heat exchanger 941 may be used. In this embodiment, the secondary heat exchanger 941 is located in parallel with the condenser 804. The secondary heat exchanger 941 may be fluidly connected to the return line 924 by a secondary input line 943. The heat transfer fluid flows from the fuel heat exchanger 910 and into the secondary heat exchanger 941 via the secondary input line 943. After absorbing heat in the secondary heat exchanger 941, the heat transfer fluid flowing through the secondary heat exchanger 941 then flows back into the supply line 922 of the heat transfer loop 920 via a secondary output line 945. The secondary output line 945 is fluidly connected to the supply line 922 at a position upstream of the condenser 804 and downstream of the fuel heat exchanger 910 and, more specifically, upstream of the heat transfer fluid pump 927.

The flow of the heat transfer fluid through the secondary heat exchanger 941 and the condenser 804 may be regulated by one or more flow control valves. More specifically, in this embodiment, a secondary flow control valve 947 is located in the secondary input line 943 to control the flow of the heat transfer fluid flowing through the secondary heat exchanger 941. Likewise, a primary flow control valve 948 is located in the return line 924 to control the flow of the heat transfer fluid flowing through the condenser 804. The primary flow control valve 948 may be located upstream of the condenser 804 and downstream of the location where the secondary input line 943 fluidly connects to the return line 924. Any suitable flow control valve may be used as the secondary flow control valve 947 or the primary flow control valve 948. Such flow control valves may have a closed position and a plurality of open positions including a fully open position. The flow control valves may be electrically operable valves, hydraulically operable valves, or pneumatically operable valves. When the flow control valves are hydraulically operable, the hydraulic fluid may be suitable fluids of the turbine engine 710 including, for example, the fuel 767, lubrication oil, and the like.

Figure 17:
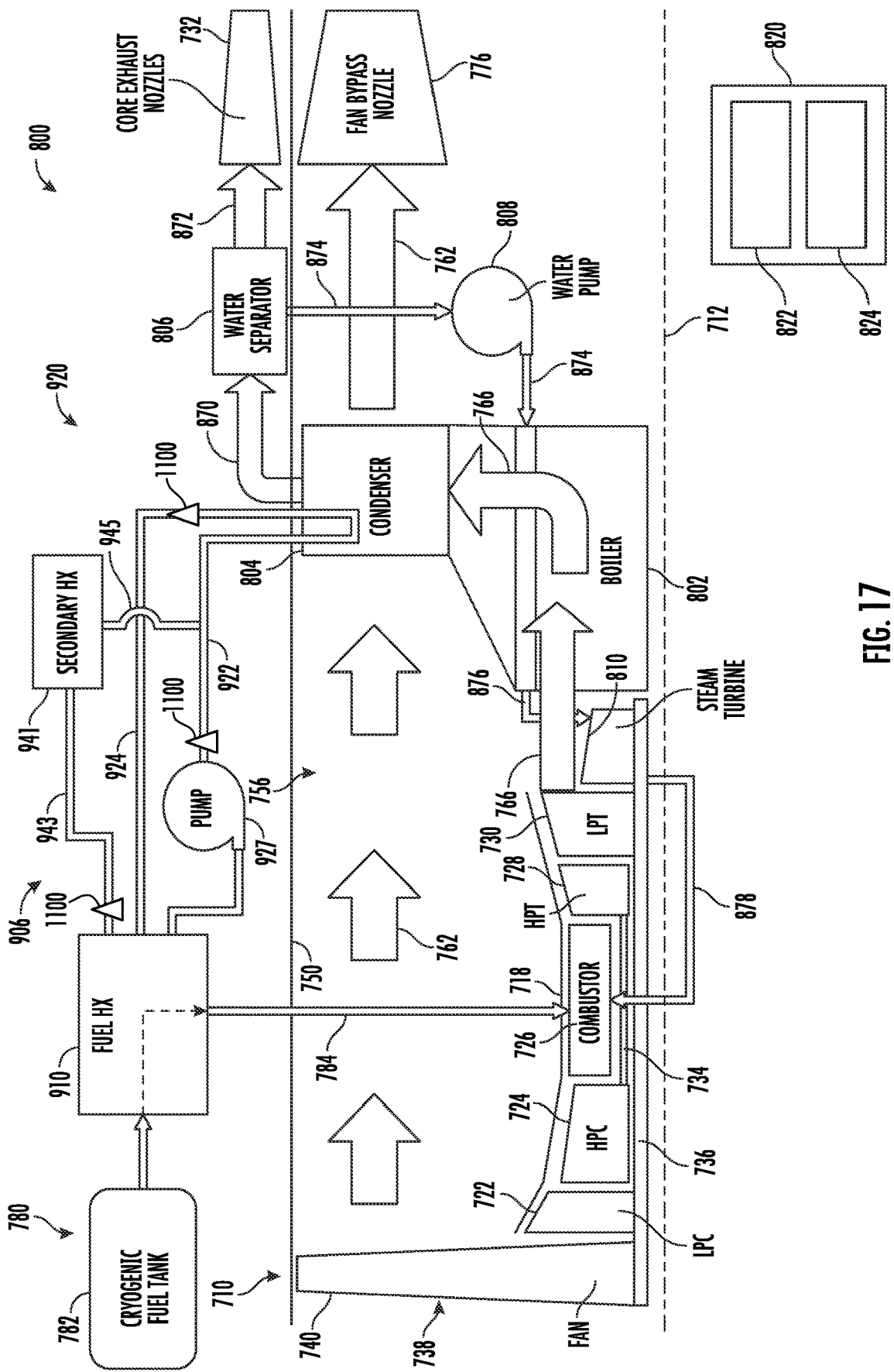
FIG. 17 is a schematic diagram of the turbine engine and the steam system with a thermal transport system according to an embodiment of the present disclosure.

FIG. 17 is a schematic diagram of the turbine engine 710 and the steam system 800 of FIG. 8 having a thermal transport system 906, according to the present disclosure. For clarity with the other thermal transport systems discussed herein, the thermal transport system 906 of this embodiment will be referred to as a seventh thermal transport system 906. The seventh thermal transport system 906 is similar to the fourth thermal transport system 903 discussed above with reference to FIG. 15A. The same reference numerals will be used for components of the seventh thermal transport system 906 that are the same as or similar to the components of the fourth thermal transport system 903 discussed above. The description of these components above also applies to this embodiment, and a detailed description of these components is omitted here.

The secondary heat exchanger 941 may also be fluidly connected to the secondary heat exchanger 941 in other arrangements. In this embodiment, the fuel heat exchanger 910 includes a plurality of outlets for the heat transfer fluid. The return line 924 may be fluidly connected to one outlet to supply the heat transfer fluid, as discussed above, to the condenser 804, and the secondary input line 943 may be connected to the second outlet to supply the heat transfer fluid, as discussed above, to the secondary heat exchanger 941. The outlets may be connected to different positions of the flow path for the heat transfer fluid through the fuel heat exchanger 910 to provide the heat transfer fluid to the condenser 804 and the secondary heat exchanger 941. For example, the first outlet may be connected to the return line 924 at a position upstream of the second outlet connected to the secondary input line 943 to provide the heat transfer fluid to the condenser 804 at a lower temperature than the secondary heat exchanger 941. Although not shown in FIG. 7, the secondary flow control valve 947 and the primary flow control valve 948 may be used in this embodiment.

Figure 18:
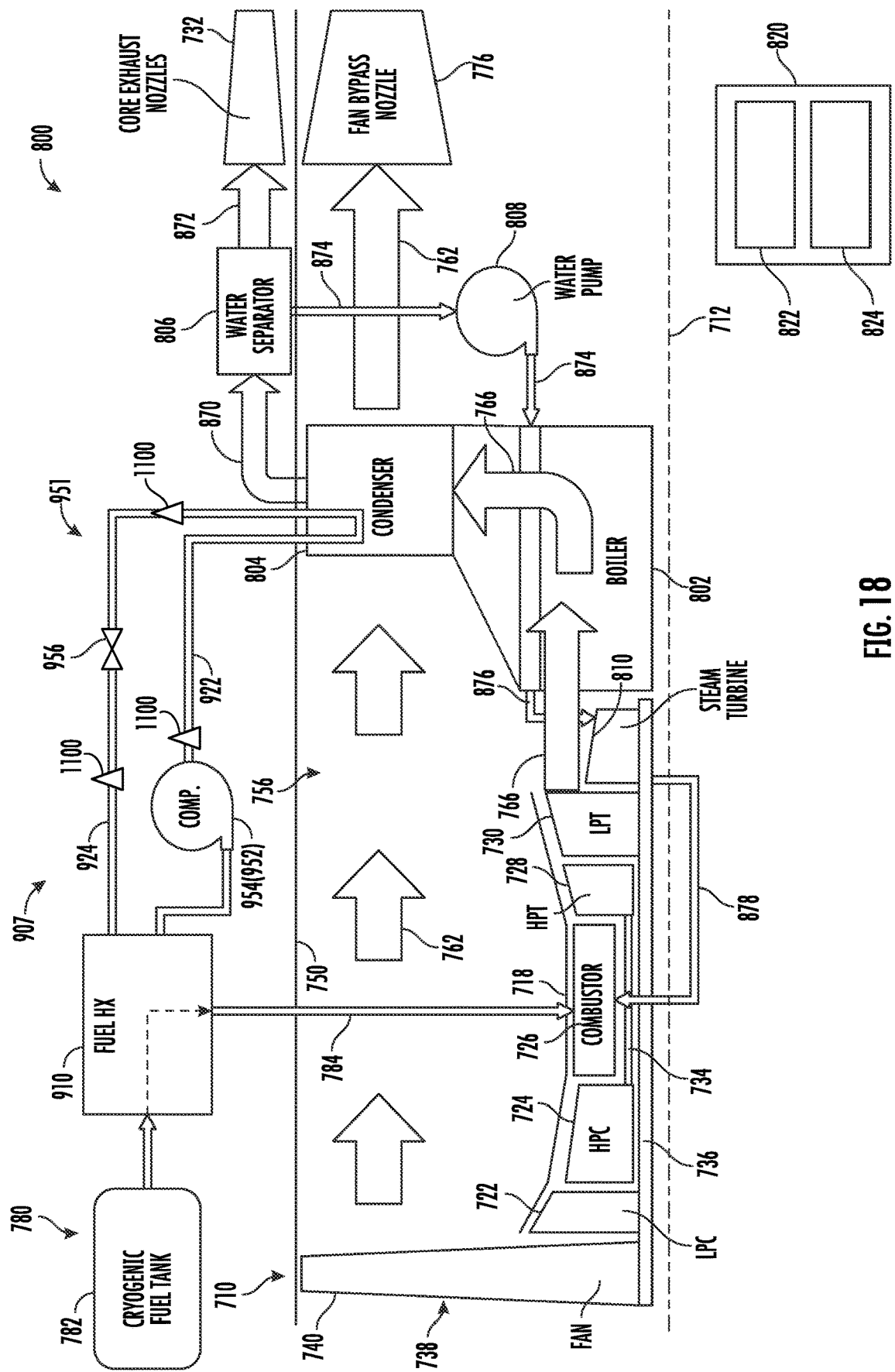
FIG. 18 is a schematic diagram of the turbine engine and the steam system with a thermal transport system according to an embodiment of the present disclosure.

FIG. 18 is a schematic diagram of the turbine engine 710 and the steam system 800 of FIG. 8 having a thermal transport system 907, according to the present disclosure. For clarity with the other thermal transport systems discussed herein, the thermal transport system 907 of this embodiment will be referred to as an eighth thermal transport system 907. The eighth thermal transport system 907 is similar to the first thermal transport system 900 discussed above with reference to FIG. 12. The same reference numerals will be used for components of the eighth thermal transport system 907 that are the same as or similar to the components of the first thermal transport system 900 discussed above. The description of these components above also applies to this embodiment, and a detailed description of these components is omitted here.

The eighth thermal transport system 907 of this embodiment includes a heat transfer loop 951 that is similar to the heat transfer loop 920 having a supply line 922 and a return line 924 fluidly connecting the fuel heat exchanger 910 and the condenser 804. The description of the heat transfer loop 920 described above also applies to the heat transfer loop 951 of this embodiment.

The heat transfer fluid may be a single-phase fluid, but two-phase fluids may also be used. The eighth thermal transport system 907 of this embodiment uses a two-phase fluid. Suitable two-phase fluids include, for example, refrigerants, such as chlorofluorocarbon (CFC), hydrochlorofluorocarbon (HCFC), or hydrofluorocarbon (HFC). As the heat transfer fluid flows through the condenser 804, the fluid is heated and changes phase (i.e., evaporated) into a gas phase. The heat transfer fluid then flows in the gas phase to the fuel heat exchanger 910 through the supply line 922. In the fuel heat exchanger 910, the heat transfer fluid is cooled and condensed, changing phase back into the liquid phase.

The heat transfer loop 920 of this embodiment includes a heat transfer fluid pump 952 to induce the flow of the heat transfer fluid through the heat transfer loop 951 between the fuel heat exchanger 910 and the condenser 804. The heat transfer fluid pump 952 of this embodiment may be similar to the heat transfer fluid pump 927 discussed above and located at any suitable location within the heat transfer loop 951.

In some embodiments, the heat transfer fluid pump 952 may be located in the return line 924 to pump the heat transfer fluid in the liquid phase, but, in the embodiment shown in FIG. 18, the heat transfer fluid pump 952 is located in the supply line 922 and operates as a compressor. The heat transfer fluid pump 952 is thus referred to as a compressor 954 herein. With the compressor 954 located in the supply line 922, the compressor 954 also increases the pressure of the heat transfer fluid in the gas phase, super heating the heat transfer fluid. When the compressor 954 is used, the heat transfer loop 951 may also include an expansion valve 956 located in the return line 924 to maintain high-pressure on the inlet side (i.e., the fuel heat exchanger 910 side), while also expanding the liquid refrigerant and lowering the pressure on the outlet side (i.e., the condenser 804 side).

Figure 19:
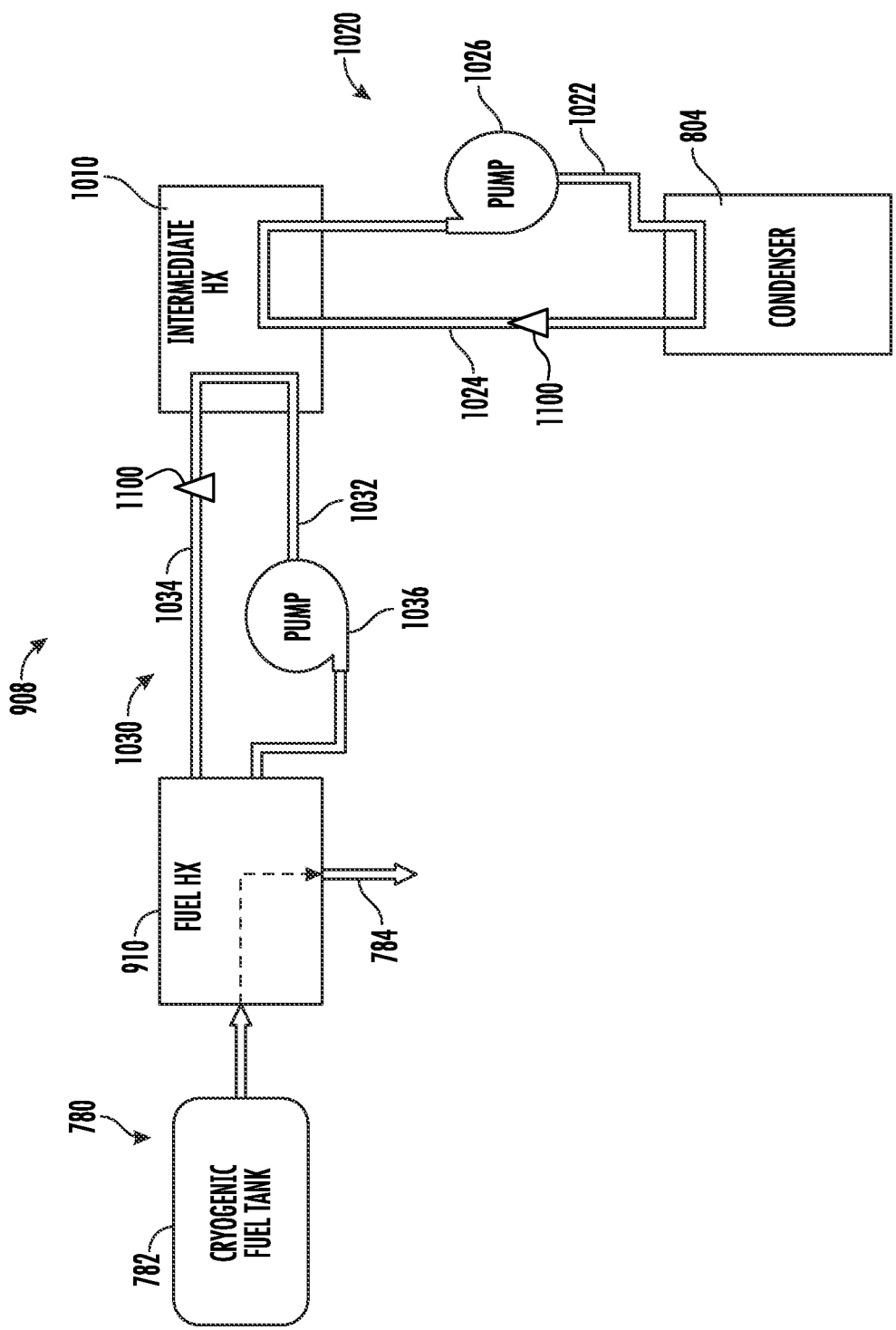
FIG. 19 is a schematic diagram of a thermal transport system according to an embodiment of the present disclosure.

FIG. 19 shows a thermal transport system 908, according to the present disclosure that may be used in the turbine engine 710 and the steam system 800 discussed above. For clarity with the other thermal transport systems discussed herein, the thermal transport system 908 of this embodiment will be referred to as a ninth thermal transport system 908. The ninth thermal transport system 908 is similar to the first thermal transport system 900 discussed above with reference to FIG. 12. The same reference numerals will be used for components of the ninth thermal transport system 908 that are the same as or similar to the components of the first thermal transport system 900 discussed above. The description of these components above also applies to this embodiment, and a detailed description of these components is omitted here.

The combustion gases 766 (FIG. 12) entering the condenser 804 and the fuel 767 (FIG. 8) entering the fuel heat exchanger 910 may have a relatively large temperature difference, particularly when the fuel is a cryogenic fuel such as hydrogen fuel. The hydrogen fuel may have the cryogenic temperatures discussed above and the combustion gases 766 entering the condenser 804 during operation may have temperatures from five hundred degrees Fahrenheit (500° F.) (two hundred sixty degrees Celsius (260° C.) to one thousand six hundred degrees Fahrenheit (1600° F.) (eight hundred seventy-one degrees Celsius (871° C.), for example. It may be difficult to accommodate both these extreme cold conditions and extreme hot conditions with a single working fluid (i.e., heat transfer fluid), and, thus, in this embodiment, two working fluids (e.g., a first heat transfer fluid and a second heat transfer fluid) may be used.

The ninth thermal transport system 908 of this embodiment includes an intermediate heat exchanger 1010. The intermediate heat exchanger 1010 is fluidly connected to each of the condenser 804 and the fuel heat exchanger 910. The intermediate heat exchanger 1010 may be any suitable heat exchanger, such as, for example, a tubular heat exchanger or a plate heat exchanger having flow paths for the first heat transfer fluid and the second heat transfer fluid. The intermediate heat exchanger 1010 transfers heat from the first heat transfer fluid to the second heat transfer fluid as each fluid flows through the intermediate heat exchanger 1010. As discussed further below, the first heat transfer fluid receives heat from the combustion gases 766 as it flows through the condenser 804 and the second heat transfer fluid transfers heat to the fuel 767 in the manner described above with reference to FIG. 12. The first heat transfer fluid is a working fluid selected for use in a high temperature environment such as those experienced in the turbine engine 710 and may include, for example, a silicon-based heat transfer fluid (e.g., Syltherm™ 800 or Syltherm™ XLT, each produced by Dow of Midland, Michigan, USA) or supercritical carbon dioxide. The second heat transfer fluid is in thermal contact with the cryogenic fuel and may be selected for use at these extremely low temperatures. Non-limiting examples include helium, nitrogen, or sulfur hexafluoride.

The intermediate heat exchanger 1010 is fluidly connected to the condenser 804 by a first heat transfer loop 1020. The first heat transfer loop 1020 is similar to the heat transfer loop 920 discussed above and the discussion of the heat transfer loop 920 also apples to the first heat transfer loop 1020. The first heat transfer loop 1020 includes a supply line 1022 similar to the supply line 922 discussed above. The supply line 1022 is fluidly connected to each of the condenser 804 and the intermediate heat exchanger 1010. The first heat transfer fluid flows through a fluid passage of the condenser 804 and, after being heated by the combustion gases 766, flows through the supply line 1022 from the condenser 804 to the intermediate heat exchanger 1010 where, as discussed above, heat is transferred from the first heat transfer fluid to the second heat transfer fluid. The first heat transfer loop 1020 also includes a return line 1024 fluidly connected to each of the intermediate heat exchanger 1010 and the condenser 804. The first heat transfer fluid, after transferring heat to the second heat transfer fluid, flows through the return line 1024 from the intermediate heat exchanger 1010 to the condenser 804 where, as discussed above, heat is transferred from the combustion gases 766 to the second heat transfer fluid.

The first heat transfer loop 1020 also includes a first heat transfer fluid pump 1026. The first heat transfer fluid pump 1026 may be similar to the heat transfer fluid pump 927 discussed above and the discussion of the heat transfer fluid pump 927 applies to this embodiment. The first heat transfer fluid pump 1026 induces the flow of the first heat transfer fluid through the first heat transfer loop 1020 between the condenser 804 and the intermediate heat exchanger 1010. The first heat transfer fluid pump 1026 may be located at any suitable location within the first heat transfer loop 1020, but, in this embodiment, the first heat transfer fluid pump 1026 is located in the supply line 1022.

The intermediate heat exchanger 1010 is fluidly connected to the fuel heat exchanger 910 by a second heat transfer loop 1030. The second heat transfer loop 1030 is similar to the heat transfer loop 920 discussed above and the discussion of the heat transfer loop 920 also apples to the second heat transfer loop 1030. The second heat transfer loop 1030 includes a supply line 1032 similar to the supply line 922 discussed above. The supply line 1032 is fluidly connected to each of the intermediate heat exchanger 1010 and the fuel heat exchanger 910. The second heat transfer fluid flows through a fluid passage of the intermediate heat exchanger 1010 and, after being heated by the first heat transfer fluid, flows through the supply line 1032 from the intermediate heat exchanger 1010 to the fuel heat exchanger 910 where, as discussed above, heat is transferred from the second heat transfer fluid to the fuel 767. The second heat transfer loop 1030 also includes a return line 1034 fluidly connected to each of the fuel heat exchanger 910 and the intermediate heat exchanger 1010. The second heat transfer fluid, after transferring heat to the fuel 767, flows through the return line 1034 from the fuel heat exchanger 910 to the intermediate heat exchanger 1010 where, as discussed above, heat is transferred from the first heat transfer fluid to the second heat transfer fluid.

The second heat transfer loop 1030 also includes a second heat transfer fluid pump 1036. The second heat transfer fluid pump 1036 may be similar to the heat transfer fluid pump 927 discussed above and the discussion of the heat transfer fluid pump 927 applies to this embodiment. The second heat transfer fluid pump 1036 induces the flow of the second heat transfer fluid through the second heat transfer loop 1030 between the intermediate heat exchanger 1010 and the second heat transfer loop 1030. The second heat transfer fluid pump 1036 may be located at any suitable location within the second heat transfer loop 1030, but, in this embodiment, the second heat transfer fluid pump 1036 is located in the supply line 1032.

The foregoing discussion includes various components in different embodiments of the thermal transport system. However, the components and features of the each of these thermal transport systems are not mutually exclusive and one or more of the components shown and described in one thermal transport system may be applied to another thermal transport system.

The turbine engine 710 of the embodiments discussed herein includes a steam system 800. The turbine engine 710 also includes a thermal transport system that may be used to transfer heat from the steam system 800 and, more specifically, the combustion gases 766, to the fuel 767 and to heat (i.e., or vaporize) the fuel 767. If cryogenic fuel is heated by being routed through the condenser 804, the condenser 804 risks icing due to the extreme cold of the cryogenic fuel. Using the water 874 and the thermal transport systems discussed herein mitigates the risk of icing in the condenser 804, where the ice could block the bypass air 762 from the fan 738, reducing thrust.

Referring generally to FIGS. 8 through 19, it will be appreciated that the exemplary turbine engines 710 depicted each also include a pericritical fluid sensor assembly operable with a fluid system of the turbine engine 710. In one or more of these embodiments, the fluid system may be the fuel delivery assembly, the heat transfer assembly, or both.

Further, the pericritical fluid sensor assembly includes one or more pericritical fluid sensors 1100, with each of the pericritical fluid sensors 1100 configured in a similar manner as one or more of the exemplary pericritical fluid sensors discussed above with reference to FIGS. 1 through 7. Accordingly, although not depicted in the embodiments of FIG. 8 through 19, the one or more pericritical fluid sensors 1100 of the pericritical fluid sensor assembly may generally include one or more sensors configured to generate sensor outputs corresponding to one or more phase properties of a pericritical fluid flowing through the fluid system; and a controller communicatively coupled to the one or more sensors. The controller may be configured to generate control commands configured to control one or more controllable components of the fluid system based at least in part on the sensor outputs. The one or more sensors may include one or more phase detection sensors, and the one or more phase detection sensors may include an acoustic sensor.

Inclusion of the pericritical fluid sensor assembly having the one or more pericritical fluid sensors 1100 in the exemplary embodiments of FIGS. 8 through 19 may allow for more precise control of the fluid system, more efficient operations, and/or other desirable operational outcomes.

Further aspects of the disclosure are provided by the subject matter of the following clauses:

A pericritical fluid system for a thermal management system associated with a turbine engine, the pericritical fluid system comprising: one or more sensors configured to generate sensor outputs corresponding to one or more phase properties of a pericritical fluid flowing through a cooling circuit of the thermal management system; and a controller communicatively coupled to the one or more sensors, the controller configured to generate control commands configured to control one or more controllable components of the thermal management system based at least in part on the sensor outputs; wherein the one or more sensors comprise one or more phase detection sensors, the one or more phase detection sensors comprising an acoustic sensor.

The pericritical fluid system of any preceding clause, comprising: the one or more controllable components, wherein the one or more controllable components are respectively configured to change one or more of: a temperature of the pericritical fluid, a pressure of the pericritical fluid, and/or a flow rate of the of the pericritical fluid.

The pericritical fluid system of any preceding clause, wherein the acoustic sensor comprises a speed of sound sensor, the speed of sound sensor comprising an ultrasonic transducer configured to emit sound waves, and a receiver configured to receive the sound waves and covert the sound waves into electrical signals.

The pericritical fluid system of any preceding clause, wherein the acoustic sensor comprises an acoustic wave sensor, the acoustic wave sensor configured to apply an oscillating electric field to generate acoustic waves that propagate through a piezoelectric substrate.

The pericritical fluid system of any preceding clause, wherein the acoustic wave sensor comprises a bulk acoustic wave sensor.

The pericritical fluid system of any preceding clause, wherein the acoustic wave sensor comprises a surface acoustic wave sensor.

The pericritical fluid system of any preceding clause, wherein the controller is configured to determine one or more phase properties of the pericritical fluid based at least in part on the sensor outputs.

The pericritical fluid system of any preceding clause, wherein the controller is configured to determine one or more phase properties of the pericritical fluid based at least in part on a correlation between the sensor outputs and the one or more phase properties of the pericritical fluid.

The pericritical fluid system of any preceding clause, wherein the controller is configured to determine one or more phase properties of the pericritical fluid based at least in part on a level of noise or deviation in sensor outputs.

The pericritical fluid system of any preceding clause, wherein the one or more sensors comprise one or more temperature sensors and/or one or more pressure sensors.

The pericritical fluid system of any preceding clause, wherein the sensor outputs comprise phase detection sensor outputs generated by the one or more phase detection sensors, and at least one of: temperature sensor outputs generated by the one or more temperature sensors, and pressure sensor outputs generated by the one or more pressure sensors; and wherein the controller is configured to determine one or more phase properties of the pericritical fluid based at least in part on the phase detection sensor outputs in combination with at least one of: the temperature sensor outputs and the pressure sensor outputs.

The pericritical fluid system of any preceding clause, wherein the one or more phase properties of the pericritical fluid comprises a phase change and a phase state corresponding to the phase change, and wherein the controller is configured to determine an occurrence of the phase change based at least in part on the phase detection sensor outputs, and wherein the controller is configured to determine the phase state corresponding to the phase change based at least in part on at least one of: the temperature sensor outputs and the pressure sensor outputs.

The pericritical fluid system of any preceding clause, wherein the pericritical fluid comprises at least one of: carbon monoxide, carbon dioxide, ammonia, methane, methanol, ethanol, ethylene, propane, propylene, heptane, 1-octanol, 2-octanol, 2-propanol, difluoromethane, ethane, difluoroethane, tetrafluoroethene, acetone, nitrous oxide, argon, bromine, neon, hydrogen, oxygen, and water.

The pericritical fluid system of any preceding clause, wherein the pericritical fluid comprises a multimodal fluid, the multimodal fluid comprising a first fluid-component and a second fluid-component, and wherein the sensor outputs correspond to one or more phase properties with respect to the second fluid-component, and wherein the controller is configured to determine one or more phase properties with respect to the first fluid-component based at least in part on the sensor outputs corresponding to the one or more phase properties with respect to the second fluid-component.

The pericritical fluid system of any preceding clause, wherein the one or more phase properties with respect to the second fluid-component comprises a phase state or a phase change in relation to a liquid saturation curve representing a transition of the second fluid-component from a liquid phase to a gas phase.

The pericritical fluid system of any preceding clause, wherein the multimodal fluid comprises a third fluid-component, and wherein the sensor outputs comprise additional sensor outputs corresponding to one or more phase properties with respect to the third fluid-component, and wherein the controller is configured to determine one or more phase properties with respect to the first fluid-component based at least in part on the additional sensor outputs corresponding to the one or more phase properties with respect to the third fluid-component; wherein the one or more phase properties with respect to the third fluid-component comprises a phase state or a phase change in relation to a vapor saturation curve representing a transition of the third fluid-component from a gas phase to a liquid phase; and wherein a vaporization curve for the first fluid-component is at least partially surrounded by the liquid saturation curve and the vapor saturation curve.

The pericritical fluid system of any preceding clause, wherein the second fluid-component and/or the third fluid-component has a concentration corresponding to a trace amount sufficient for determining the one or more phase properties.

The pericritical fluid system of any preceding clause, wherein the first fluid-component comprises carbon dioxide, and the second fluid-component and/or the third fluid-component comprises at least one of: carbon monoxide, ammonia, methane, methanol, ethanol, ethylene, propane, propylene, heptane, 1-octanol, 2-octanol, 2-propanol, difluoromethane, ethane, difluoroethane, tetrafluoroethene, acetone, nitrous oxide, argon, bromine, neon, hydrogen, oxygen, water.

A liquid fuel system for a turbine engine, the liquid fuel system comprising: one or more sensors configured to generate sensor outputs corresponding to one or more phase properties of a fuel supplied to the turbine engine through a fuel pathway; and a controller communicatively coupled to the one or more sensors, the controller configured to generate control commands configured to control one or more controllable components of the liquid fuel system based at least in part on the sensor outputs, wherein the one or more sensors comprise one or more phase detection sensors; wherein the fuel comprises hydrogen, and wherein the fuel has a liquid phase state.

The liquid fuel system of any preceding clause, wherein the one or more phase detection sensors comprises: an acoustic sensor, an optical sensor, or a pressure drop sensor.

The liquid fuel system of any preceding clause, wherein the one or more phase detection sensors comprises the acoustic sensor, wherein the acoustic sensor comprises a speed of sound sensor, the speed of sound sensor comprising an ultrasonic transducer configured to emit sound waves, and a receiver configured to receive the sound waves and covert the sound waves into electrical signals.

The liquid fuel system of any preceding clause, wherein the one or more phase detection sensors comprises the acoustic sensor, wherein the acoustic sensor comprises an acoustic wave sensor, the acoustic wave sensor configured to apply an oscillating electric field to generate acoustic waves that propagate through a piezoelectric substrate.

The liquid fuel system of any preceding clause, wherein the acoustic wave sensor comprises a bulk acoustic wave sensor.

The liquid fuel system of any preceding clause, wherein the acoustic wave sensor comprises a surface acoustic wave sensor.

The liquid fuel system of any preceding clause, wherein the one or more phase detection sensors comprises the optical sensor, wherein the optical sensor comprises a fiber-optic reflectometer, the fiber-optic reflectometer comprising a light source configured to generate a probe beam, an optical fiber configured to introduce the probe beam into a measuring chamber, and a photodiode configured to measure an intensity of the probe beam.

The liquid fuel system of any preceding clause, wherein the fiber-optic reflectometer comprises one or more microstructure optical fibers, the one or more microstructure optical fibers respectively comprising a core material and a plurality of channels defined within the core material, wherein the fiber-optic reflectometer is configured to guide light through the plurality of channels by way of total internal reflection and/or constructive interference of scattered light.

The liquid fuel system of any preceding clause, wherein the one or more phase detection sensors comprises the optical sensor, wherein the optical sensor comprises an infrared spectrometer, the infrared spectrometer comprising an infrared light source, a measurement window configured to be in contact with the fuel, and an infrared detector configured to detect infrared light transmitted through the measurement window.

The liquid fuel system of any preceding clause, wherein the infrared spectrometer comprises an attenuated total reflection infrared spectrometer configured to detect total internal reflection.

The liquid fuel system of any preceding clause, wherein the one or more phase detection sensors comprises the pressure drop sensor, wherein the pressure drop sensor comprises a micro-channel pressure drop sensor, or a packed-bed pressure drop sensor.

The liquid fuel system of any preceding clause, comprising: the one or more controllable components, wherein the one or more controllable components are respectively configured to change one or more of: a temperature of the fuel, a pressure of the fuel, and/or a flow rate of the of the fuel.

The liquid fuel system of any preceding clause, wherein the controller is configured to determine one or more phase properties of the fuel based at least in part on the sensor outputs.

The liquid fuel system of any preceding clause, wherein the controller is configured to determine one or more phase properties of the fuel based at least in part on a correlation between the sensor outputs and the one or more phase properties of the fuel.

The liquid fuel system of any preceding clause, wherein the controller is configured to determine one or more phase properties of the fuel based at least in part on a level of noise or deviation in sensor outputs.

The liquid fuel system of any preceding clause, wherein the one or more sensors comprise one or more temperature sensors and/or one or more pressure sensors.

The liquid fuel system of any preceding clause, wherein the sensor outputs comprise phase detection sensor outputs generated by the one or more phase detection sensors, and at least one of: temperature sensor outputs generated by the one or more temperature sensors, and pressure sensor outputs generated by the one or more pressure sensors; and wherein the controller is configured to determine one or more phase properties of the fuel based at least in part on the phase detection sensor outputs in combination with at least one of: the temperature sensor outputs and the pressure sensor outputs.

The liquid fuel system of any preceding clause, wherein the one or more phase properties of the fuel comprises a phase change and a phase state corresponding to the phase change, and wherein the controller is configured to determine an occurrence of the phase change based at least in part on the phase detection sensor outputs, and wherein the controller is configured to determine the phase state corresponding to the phase change based at least in part on at least one of: the temperature sensor outputs and the pressure sensor outputs.

The liquid fuel system of any preceding clause, comprising: the pericritical fluid system of any preceding clause.

A turbine engine, comprising: a thermal management system configured to circulate a pericritical fluid through a cooling circuit, the thermal management system comprising one or more controllable components; one or more sensors configured to generate sensor outputs corresponding to one or more phase properties of the pericritical fluid; and a controller communicatively coupled to the one or more sensors, the controller configured to generate control commands configured to control the one or more controllable components based at least in part on the sensor outputs; wherein the one or more sensors comprise one or more phase detection sensors, the one or more phase detection sensors comprising an acoustic sensor.

A turbine engine, comprising: a liquid fuel system configured to supply a fuel to the turbine engine through a fuel pathway, the liquid fuel system comprising one or more controllable components; one or more sensors configured to generate sensor outputs corresponding to one or more phase properties of the fuel; and a controller communicatively coupled to the one or more sensors, the controller configured to generate control commands configured to control the one or more controllable components based at least in part on the sensor outputs, wherein the one or more sensors comprise one or more phase detection sensors; wherein the fuel comprises hydrogen.

The turbine engine of any preceding clause, wherein the turbine engine comprises the pericritical fluid system of any preceding clause.

The turbine engine of any preceding clause, wherein the turbine engine comprises the liquid fuel system of any preceding clause.

A non-transitory computer-readable medium comprising computer-executable instructions, which when executed by a processor, cause the processor to perform a method of controlling one or more phase properties of a pericritical fluid associated with a thermal management system for a turbine engine, the method comprising: determining sensor outputs generated by one or more sensors, the sensor outputs corresponding to one or more phase properties of a pericritical fluid flowing through a cooling circuit of the thermal management system; and generating control commands configured to control one or more controllable components of the thermal management system based at least in part on the sensor outputs; wherein the one or more sensors comprise one or more phase detection sensors, the one or more phase detection sensors comprising an acoustic sensor.

A non-transitory computer-readable medium comprising computer-executable instructions, which when executed by a processor, cause the processor to perform a method of controlling one or more phase properties of a fuel associated with a liquid fuel system for a turbine engine, the method comprising: determining sensor outputs generated by one or more sensors, the sensor outputs corresponding to one or more phase properties of a fuel supplied to the turbine engine through a fuel pathway; and generating control commands configured to control one or more controllable components of the liquid fuel system based at least in part on the sensor outputs, wherein the one or more sensors comprise one or more phase detection sensors, wherein the fuel comprises hydrogen, and wherein the fuel has a liquid phase state.

A method of controlling one or more phase properties of a pericritical fluid associated with a thermal management system for a turbine engine, the method comprising: determining sensor outputs generated by one or more sensors, the sensor outputs corresponding to one or more phase properties of a pericritical fluid flowing through a cooling circuit of the thermal management system; and generating control commands configured to control one or more controllable components of the thermal management system based at least in part on the sensor outputs; wherein the one or more sensors comprise one or more phase detection sensors, the one or more phase detection sensors comprising an acoustic sensor.

A method of controlling one or more phase properties of a fuel associated with a liquid fuel system for a turbine engine, the method comprising: determining sensor outputs generated by one or more sensors, the sensor outputs corresponding to one or more phase properties of a fuel supplied to the turbine engine through a fuel pathway; and generating control commands configured to control one or more controllable components of the liquid fuel system based at least in part on the sensor outputs, wherein the one or more sensors comprise one or more phase detection sensors, and wherein the fuel comprises hydrogen, and wherein the fuel has a liquid phase state.

The method of any preceding clause, wherein the method is performed using the pericritical fluid system of any preceding clause.

The method of any preceding clause, wherein the method is performed using the liquid fuel system of any preceding clause.

The method of any preceding clause, wherein the method is performed using the non-transitory computer-readable medium of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

A turbine engine for an aircraft. The turbine engine includes a fuel delivery assembly for fuel to flow therethrough. The turbine engine also includes a turbomachine and a fan having a fan shaft coupled to the turbomachine to rotate the fan shaft. The turbine engine includes a core air flow path for core air to flow therethrough, a combustor, a core shaft, and a turbine. The combustor is located in the core air flow path to receive compressed air and fluidly coupled to the fuel delivery assembly to receive the fuel from the fuel delivery assembly. The fuel is injected into the combustor to mix with the compressed air to generate a fuel and air mixture. The fuel and air mixture is combusted in the combustor to generate combustion gases. The turbine is located downstream of the combustor to receive the combustion gases and to cause the turbine to rotate. The turbine is coupled to the core shaft to rotate the core shaft when the turbine rotates. The turbine engine further includes a condenser, a fuel heat exchanger, a boiler, and a steam turbine. The condenser is located downstream of the turbine to receive the combustion gases and to condense water from the combustion gases. The fuel heat exchanger is thermally coupled to the condenser to receive heat from the water. The fuel heat exchanger is located in the fuel delivery assembly to receive the fuel and to transfer the heat received from the water to the fuel. The boiler is located downstream of the fuel heat exchanger. The boiler receives the water and is fluidly connected to the combustor to receive the combustion gases and to boil the water to generate steam. The steam turbine is fluidly coupled to the boiler to receive the steam from the boiler and to cause the steam turbine to rotate. The steam turbine is coupled to the core shaft to rotate the core shaft when the steam turbine rotates.

The turbine engine of the preceding clause, further comprising a fuel tank holding fuel therein, the fuel delivery assembly being fluidly connected to the fuel tank to receive from the fuel tank.

The turbine engine of any preceding clause, wherein the combustor is fluidly coupled to the boiler to receive the steam from the boiler and to inject the steam into the combustor.

The turbine engine of any preceding clause, wherein the combustor is fluidly coupled to the steam turbine to receive the steam from the steam turbine and to inject the steam into the combustor.

The turbine engine of any preceding clause, wherein the fuel is a cryogenic fuel and the fuel tank is a cryogenic fuel tank for storing the fuel in the liquid phase.

The turbine engine of any preceding clause, wherein the fuel is hydrogen fuel.

The turbine engine of any preceding clause, further comprising a fuel bypass flow path selectively operable to redirect the fuel and to bypass the fuel heat exchanger.

The turbine engine of any preceding clause, further comprising a fuel bypass valve positioned in the fuel delivery assembly upstream of the fuel heat exchanger and selectively operable to redirect at least a portion of the fuel through the fuel bypass flow path.

The turbine engine of any preceding clause, wherein the fuel heat exchanger includes a heater.

The turbine engine of the preceding clause, wherein the heater is an electrical heater.

The turbine engine of any preceding clause, wherein the condenser includes a heater.

The turbine engine of the preceding clause, wherein the heater is an electrical heater.

The turbine engine of any preceding clause, wherein the fuel heat exchanger is fluidly coupled to the condenser to receive the water condensed by the condenser.

The turbine engine of any preceding clause, further comprising a heat transfer loop that includes a supply line to supply the fuel heat exchanger with the water condensed by the condenser.

The turbine engine of any preceding clause, further comprising a water pump in fluid communication with the boiler to direct the flow of water into the boiler, the supply line fluidly connected to the water pump at a location downstream of the water pump.

The turbine engine of any preceding clause, further comprising a valve in fluid communication with the supply line and a water line fluidly connecting the water pump with the boiler, the valve operable to direct at least a portion of the water through the supply line and to the fuel heat exchanger.

The turbine engine of any preceding clause, wherein the condenser generates an exhaust-water mixture when condensing the water from the combustion gases, the turbine engine further comprising a water separator located downstream of the condenser, the water separator separating the water from the exhaust-water mixture, the supply line fluidly coupled to the water separator at a position downstream of the water separator.

The turbine engine of any preceding clause, further comprising a water pump in fluid communication with the water separator to receive the water from the water separator and in fluid communication with the boiler to direct the flow of water into the boiler, the supply line fluidly connected to the water separator at a location downstream of the water pump.

The turbine engine of any preceding clause, wherein the water separator includes a heater.

The turbine engine of any preceding clause, wherein the heat transfer loop includes a return line fluidly connecting the fuel heat exchanger with the boiler for the water to flow from the fuel heat exchanger to the boiler.

The turbine engine of any preceding clause, further comprising a preheat heat exchanger located in the return line and fluidly coupled to the return line upstream of the boiler to heat the water flowing through the preheat heat exchanger.

The turbine engine of any preceding clause, wherein the preheat heat exchanger is the condenser, the condenser including a flow passage for the water to flow therethrough and to be preheated by the combustion gases flowing through the condenser.

The turbine engine of any preceding clause, wherein the heat transfer loop further includes an additional heat exchanger to heat or to cool the water flowing through the heat transfer loop.

The turbine engine of any preceding clause, wherein the additional heat exchanger is located in the return line downstream of the condenser and upstream of the boiler and heats the water flowing therethrough.

The turbine engine of any preceding clause, wherein the additional heat exchanger is a water/oil heat exchanger.

The turbine engine of any preceding clause, further comprising an intermediate heat exchanger that is fluidly coupled to the condenser to receive the water condensed by the condenser, heat being transferred from the water to an intermediate heat transfer medium in the intermediate heat exchanger, the fuel heat exchanger fluidly coupled to the intermediate heat exchanger to receive the intermediate heat transfer medium.

The turbine engine of any preceding clause, wherein the intermediate heat transfer medium is a fluid other than water.

The turbine engine of any preceding clause, wherein the intermediate heat transfer medium is one of helium, nitrogen, or carbon dioxide.

The turbine engine of any preceding clause, wherein the intermediate heat transfer medium is one of gaseous carbon dioxide or supercritical carbon dioxide.

The turbine engine of any preceding clause, further comprising an intermediate heat transfer loop that fluidly connects the intermediate heat exchanger with the fuel heat exchanger to circulate the intermediate heat transfer medium.

The turbine engine of any preceding clause, wherein the intermediate heat transfer loop includes an intermediate fluid pump to induce the flow of the intermediate heat transfer medium through the intermediate heat transfer loop.

The turbine engine of any preceding clause, wherein the intermediate heat transfer loop includes a supply line to supply the intermediate heat transfer medium to the fuel heat exchanger from the intermediate heat exchanger and a return line to supply the intermediate heat transfer medium to the intermediate heat exchanger from the fuel heat exchanger.

The turbine engine of any preceding clause, wherein the intermediate fluid pump is located in the return line.

The turbine engine of any preceding clause, further comprising a first heat transfer loop that includes a supply line to supply the intermediate heat exchanger with the water condensed by the condenser.

The turbine engine of any preceding clause, further comprising a water pump in fluid communication with the boiler to direct the flow of water into the boiler, the supply line fluidly connected to the water pump at a location downstream of the water pump.

The turbine engine of any preceding clause, further comprising a valve located in the supply line and in a water line fluidly connected the water pump with the boiler, the valve operable to direct at least a position of the water through the supply line and to the intermediate heat exchanger.

The turbine engine of any preceding clause, wherein the condenser generates an exhaust-water mixture when condensing the water from the combustion gases, the turbine engine further comprising a water separator located downstream of the condenser, the water separator separating the water from the exhaust-water mixture, the supply line fluidly coupled to the water separator at a position downstream of the water separator.

The turbine engine of any preceding clause, further comprising a water pump in fluid communication with the water separator to receive the water from the water separator and in fluid communication with the boiler to direct the flow of water into the boiler, the supply line fluidly connected to the water separator at a location downstream of the water pump.

The turbine engine of any preceding clause, wherein the first heat transfer loop includes a return line fluidly connecting the intermediate heat exchanger with the boiler for the water to flow from the fuel heat exchanger to the boiler.

The turbine engine of any preceding clause, further comprising a preheat heat exchanger located in the return line and fluidly coupled to the return line upstream of the boiler to heat the water flowing through the preheat heat exchanger.

The turbine engine of any preceding clause, wherein the preheat heat exchanger is the condenser, the condenser including a flow passage for the water to flow therethrough and to be preheated by the combustion gases flowing through the condenser.

The turbine engine of any preceding clause, wherein the first heat transfer loop further includes an additional heat exchanger to heat or to cool the water flowing through the heat transfer loop.

The turbine engine of any preceding clause, wherein the additional heat exchanger is located in the return line downstream of the condenser and upstream of the boiler to heat the water flowing therethrough.

The turbine engine of any preceding clause, wherein the additional heat exchanger is a water/oil heat exchanger.

The turbine engine of any preceding clause, wherein the core shaft is a low-pressure shaft and the turbine is a low-pressure turbine.

The turbine engine of any preceding clause, further comprising a low-pressure compressor connected to the low-pressure shaft to be driven by the low-pressure turbine and the steam turbine.

The turbine engine of any preceding clause, wherein the fan includes a plurality of blades.

The turbine engine of any preceding clause, wherein the fan shaft is coupled to the low-pressure shaft to be driven by the low-pressure shaft.

The turbine engine of any preceding clause, further comprising a bypass airflow passage. A first portion of air flowing into the fan flowing through the bypass airflow passage as bypass air and a second portion of the air flowing into the fan flowing through the core air flow path as core air. The condenser is positioned downstream of the boiler and in the bypass airflow passage for bypass air to cool the combustion gases and to condense the water from the combustion gases.

The turbine engine of any preceding clause, further comprising a low-pressure compressor positioned in the core air flow path upstream of the combustor, the low-pressure compressor being driven by the low-pressure shaft to compress the core air flowing through the core air flow path and to generate the compressed air.

The turbine engine of any preceding clause, further comprising a high-pressure shaft, a high-pressure turbine, and a high-pressure compressor. The high-pressure turbine is positioned downstream of the combustor to receive the combustion gases and to cause the high-pressure turbine to rotate. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor being driven by the high-pressure shaft to compress the core air flowing through the core air flow path and to generate the compressed air.

The turbine engine of any preceding clause, further comprising a bypass airflow passage for bypass air, the condenser positioned in the bypass airflow passage for bypass air to cool the combustion gases and to condense the water from the combustion gases, generating a cooled exhaust.

The turbine engine of any preceding clause, wherein the water separator is a cyclonic separator.

The turbine engine of any preceding clause, further comprising a turbomachine and a steam system. The turbomachine including the combustor and the turbine. The combustor and the turbine define a core air flow path. The steam system extracts water from the combustion gases using the condenser, vaporizes the water to generate steam using the boiler, and injects the steam into the core air flow path to add mass flow to the core air.

The turbine engine of the preceding clause, further comprising a nacelle, and a steam system. The fan including a plurality of fan blades that rotates to generate a volume of air. The nacelle circumferentially surrounds the fan. The nacelle defines a bypass airflow passage between the nacelle and the turbomachine. The volume of air from the fan is split and flows into the bypass airflow passage as bypass air and flows into the core air flow path as the core air.

The turbine engine of the preceding clause, wherein a bypass ratio of the bypass air to the core air is greater than 18:1.

The turbine engine of any preceding clause, wherein the bypass ratio is in a range of 18:1 to 100:1.

The turbine engine of any preceding clause, wherein the bypass ratio is in a range of 25:1 to 85:1.

The turbine engine of any preceding clause, wherein the bypass ratio is in a range of 28:1 to 70:1.

The turbine engine of any preceding clause, wherein the turbomachine further includes a compressor that compresses the core air to generate the compressed air. The compressor is coupled to the core shaft and defines a portion of the core air flow path.

The turbine engine of the preceding clause, wherein the compressor includes a high-pressure compressor and includes a compression ratio greater than 20:1.

The turbine engine of the preceding clause, wherein the plurality of stages of the compressor includes ten to twelve stages.

The turbine engine of any preceding clause, wherein the turbine includes a high-pressure turbine (HPT) and includes only one stage of HPT rotor blades and HPT stator vanes.

The turbine engine of any preceding clause, further comprising a low-pressure turbine.

The turbine engine of the preceding clause, wherein the low-pressure turbine has a low-pressure shaft coupled to the fan The turbine engine of any preceding clause, further comprising a low-pressure compressor coupled to the low-pressure shaft to be driven by the low-pressure turbine and the steam turbine.

The turbine engine of any preceding clause, the low-pressure turbine having a pressure expansion ratio in a range of 4.5:1 to 28:1.

The turbine engine of any preceding clause, the high-pressure turbine having a pressure expansion ratio in a range of 1.5:1 to 4:1.

A method of starting up a turbine engine, including the turbine engines of any preceding clause. The method includes causing fuel to flow from a fuel storage tank to a combustor, directing the fuel to bypass a fuel heat exchanger, measuring the temperature of the fuel heat exchanger, operating a first heater located within the fuel heat exchanger to heat the fuel heat exchanger to a first threshold temperature when the measured temperature of the fuel heat exchanger is less than the first threshold temperature, and causing water to flow through fuel heat exchanger when the measured temperature of the fuel heat exchanger is greater than the first threshold temperature.

The method of starting up a turbine engine of the preceding clause, wherein the fuel is a cryogenic fuel and the fuel tank is a cryogenic fuel tank for storing the fuel in a liquid phase.

The method of starting up a turbine engine of any preceding clause, wherein the fuel is hydrogen fuel.

The method of starting up a turbine engine of any preceding clause, further comprising causing the fuel to flow through the fuel heat exchanger after the water flows through the fuel heat exchanger.

The method of starting up a turbine engine of any preceding clause, wherein directing the fuel to bypass the fuel heat exchanger includes positioning a fuel bypass valve to direct the fuel through a bypass flow path to bypass the fuel heat exchanger.

The method of starting up a turbine engine of any preceding clause, wherein causing the water to flow through fuel heat exchanger includes positioning a water bypass valve to direct water into the fuel heat exchanger.

The method of starting up a turbine engine of any preceding clause, wherein causing the water to flow through fuel heat exchanger includes operating a water pump to direct water into the fuel heat exchanger.

The method of starting up a turbine engine of any preceding clause, further comprising modulating the flow of water to increase the amount of water flowing through the fuel heat exchanger.

The method of starting up a turbine engine of any preceding clause, further comprising modulating the flow of fuel to increase the amount of fuel flowing through the fuel heat exchanger.

The method of starting up a turbine engine of any preceding clause, further comprising bringing the turbine engine up to idle.

The turbine engine of any preceding clause, further comprising a controller that is configured to operate the turbine engine according to the method of starting up a turbine engine of any preceding clause.

A method of shutting down a turbine engine, including the turbine engines of any preceding clause. The method includes causing fuel to flow from a fuel storage tank to a combustor, directing all of the fuel to bypass a fuel heat exchanger, and directing the flow of water into a boiler, bypassing the fuel heat exchanger.

The turbine engine of any preceding clause, further comprising a controller that is configured to operate the turbine engine according to the method of shutting down a turbine engine of the preceding clause.

A turbine engine for an aircraft. The turbine engine includes a fuel delivery assembly for fuel to flow therethrough. The turbine engine also includes a turbomachine and a fan having a fan shaft coupled to the turbomachine to rotate the fan shaft. The turbine engine includes a core air flow path for core air to flow therethrough, a combustor, a core shaft, and a turbine. The combustor is located in the core air flow path to receive compressed air and fluidly coupled to the fuel delivery assembly to receive the fuel from the fuel delivery assembly. The fuel is injected into the combustor to mix with the compressed air to generate a fuel and air mixture. The fuel and air mixture is combusted in the combustor to generate combustion gases. The turbine engine further includes a condenser, a fuel heat exchanger, and at least one heat transfer loop. The condenser is located downstream of the combustor to receive the combustion gases and to condense water from the combustion gases. The fuel heat exchanger is thermally coupled to the condenser to receive heat from the condenser. The fuel heat exchanger is located in the fuel delivery assembly to receive the fuel and to transfer the heat received from the condenser. The at least one heat transfer loop thermally couples the condenser with the fuel heat exchanger to transfer heat from the condenser to the fuel heat exchanger. The at least one heat transfer loop includes a heat transfer fluid flowing therethrough. The at least one heat transfer loop is fluidly connected to a passage of the condenser for the heat transfer fluid to receive heat from the combustion gases and thermally connected to the fuel heat exchanger for the heat transfer fluid to transfer heat from the heat transfer fluid to the fuel and to cool the heat transfer fluid.

The turbine engine of the preceding clause, further comprising a fuel tank holding fuel therein, the fuel delivery assembly being fluidly connected to the fuel tank to receive from the fuel tank.

The turbine engine of any preceding clause, wherein the at least one heat transfer loop is fluidly coupled to the fuel heat exchanger to transfer heat from the heat transfer fluid to the fuel and to cool the heat transfer fluid.

The turbine engine of any preceding clause, wherein the heat transfer fluid is one of helium, nitrogen, supercritical carbon dioxide, a silicon-based heat transfer fluid, or sulfur hexafluoride.

The turbine engine of any preceding clause, wherein the heat transfer fluid is a fluid other than water.

The turbine engine of any preceding clause, wherein the at least one heat transfer loop includes a supply line fluidly connected to each of the condenser and the fuel heat exchange to supply the fuel heat exchanger with the heat transfer fluid heated by the condenser, and a return line fluidly connected to each of the fuel heat exchange and the condenser to return the cooled heat transfer fluid from the fuel heat exchanger to the condenser.

The turbine engine of any preceding clause, further comprising a secondary heat exchanger fluidly connected to the fuel heat exchanger by a secondary input line to receive the cooled heat transfer fluid from the fuel heat exchanger, wherein the fuel heat exchanger includes a plurality of outlets, the return line being fluidly connected to one of the plurality of outlets and the secondary input line being fluidly connected to another one of the plurality of outlets.

The turbine engine of the preceding clause, wherein the secondary input line is connected to the fuel heat exchanger at a location upstream or downstream, relative to the flow of the heat transfer fluid, of the return line to provide the secondary heat exchanger with the heat transfer fluid at a temperature different from the temperature of the heat transfer fluid provided to the condenser.

The turbine engine of any preceding clause, wherein the at least one heat transfer loop includes a heat transfer fluid pump in fluid communication with the at least one heat transfer loop to induce the flow of the heat transfer fluid within the at least one heat transfer loop.

The turbine engine of any preceding clause, wherein the heat transfer fluid pump is located in the supply line.

The turbine engine of any preceding clause, wherein the heat transfer fluid is a two-phase heat transfer fluid and the heat transfer fluid pump is a compressor.

The turbine engine of any preceding clause, wherein the at least one heat transfer loop includes an expansion valve located in the return line.

The turbine engine of any preceding clause, wherein the at least one heat transfer loop includes an accumulator having a fluid reservoir to store the heat transfer fluid therein.

The turbine engine of any preceding clause, wherein the fluid reservoir has an adjustable volume for storing the heat transfer fluid.

The turbine engine of the preceding clause, wherein the volume of the fluid reservoir is actively adjustable by an actuator operable to adjust the volume of the fluid reservoir.

The turbine engine of any preceding clause, further comprising a controller operatively coupled to the actuator to move the actuator and to adjust the volume adjust the volume of the fluid reservoir.

The turbine engine of any preceding clause, wherein the controller is configured to receive an input and to adjust the volume of the fluid reservoir based on the received input.

The turbine engine of any preceding clause, further comprising a sensor that is communicatively coupled to provide the input to the controller.

The turbine engine of the preceding clause, wherein the sensor is a pressure sensor located to provide an input indicative of the pressure of the heat transfer fluid in the at least one heat transfer loop.

The turbine engine of any preceding clause, wherein the volume of the fluid reservoir is passively adjustable by a biasing member exerting a biasing force to adjust the volume of the fluid reservoir in response to changes in pressure within the fluid reservoir.

The turbine engine of any preceding clause, wherein the accumulator includes a movable diaphragm to adjust the volume of the fluid reservoir.

The turbine engine of any preceding clause, further comprising a secondary heat exchanger fluidly connected to the at least one heat transfer loop to exchange heat with the heat transfer fluid flowing through the at least one heat transfer loop.

The turbine engine of any preceding clause, wherein the secondary heat exchanger is fluidly connected in series with the condenser relative to the flow of the heat transfer fluid.

The turbine engine of any preceding clause, wherein the secondary heat exchanger is fluidly connected in parallel with the condenser relative to the flow of the heat transfer fluid.

The turbine engine of any preceding clause, wherein the at least one heat transfer loop includes a supply line and a return line. The supply line is fluidly connected to each of the condenser and the fuel heat exchange to supply the fuel heat exchanger with the heat transfer fluid heated by the condenser. The return line is fluidly connected to each of the fuel heat exchange and the condenser to return the cooled heat transfer fluid from the fuel heat exchanger to the condenser. The secondary heat exchanger is fluidly connected to one of the supply line or the return line by a secondary input line to receive the heat transfer fluid from the one of the supply line or the return line.

The turbine engine of any preceding clause, wherein the secondary input line is fluidly connected to the return line.

The turbine engine of any preceding clause, wherein the secondary heat exchanger is fluidly connected to the supply line by a secondary output line for the heat transfer fluid to flow from the secondary heat exchanger to the supply line.

The turbine engine of any preceding clause, further comprising at least one flow control valve controlling the flow of the heat transfer fluid.

The turbine engine of the preceding clause, wherein the at least one flow control valve is located in the heat transfer loop to control the flow of the heat transfer fluid in the heat transfer loop.

The turbine engine of any preceding clause, further comprising a secondary flow control valve located to control the flow of the heat transfer fluid into the secondary heat exchanger.

The turbine engine of any preceding clause, wherein the secondary flow control valve is located in the secondary input line.

The turbine engine of any preceding clause, further comprising a primary flow control valve located in the heat transfer loop downstream of the secondary input line to control the flow of the heat transfer fluid into the condenser.

The turbine engine of any preceding clause, further comprising a plurality of heat transfer loops thermally coupling the condenser with the fuel heat exchanger to transfer heat from the condenser to the fuel heat exchanger. The at least one heat exchanger is a first heat transfer loop of the plurality of heat transfer loops and the heat transfer fluid flowing through the first heat transfer loop is a first heat transfer fluid.

The turbine engine of any preceding clause, further comprising an intermediate heat exchanger that is fluidly coupled to first heat transfer loop to receive the first heat transfer fluid heated by the condenser, heat being transferred from the first heat transfer fluid to a second heat transfer fluid in the intermediate heat exchanger.

The turbine engine of the preceding clause, wherein the first heat transfer fluid and the second heat transfer fluid are different.

The turbine engine of any preceding clause, wherein the first heat transfer fluid is one of a silicon-based heat transfer fluid or supercritical carbon dioxide.

The turbine engine of any preceding clause, wherein the second heat transfer fluid is one of helium, nitrogen, or sulfur hexafluoride.

The turbine engine of any preceding clause, wherein the plurality of heat transfer loops includes a second heat transfer loop fluidly coupling the intermediate heat exchanger with the fuel heat exchanger, the second heat transfer flowing through the second heat transfer loop to transfer heat from the second heat transfer fluid to the fuel and to cool the heat transfer fluid.

The turbine engine of any preceding clause, wherein the first heat transfer loop includes a first fluid pump to induce the flow of the first heat transfer fluid through the first heat transfer loop.

The turbine engine of any preceding clause, wherein the first heat transfer loop includes a supply line to supply the first heat transfer medium to the intermediate heat exchanger from the condenser heat exchanger and a return line to supply the first heat transfer medium to the condenser from the intermediate heat exchanger.

The turbine engine of any preceding clause, wherein the first fluid pump is located in the supply line.

The turbine engine of any preceding clause, wherein the second heat transfer loop includes a second fluid pump to induce the flow of the first heat transfer fluid through the first heat transfer loop.

The turbine engine of any preceding clause, wherein the second heat transfer loop includes a supply line to supply the second heat transfer medium to the fuel heat exchanger from the intermediate heat exchanger and a return line to supply the second heat transfer medium to the intermediate heat exchanger from the fuel heat exchanger.

The turbine engine of any preceding clause, wherein the second fluid pump is located in the supply line.

The turbine engine of any preceding clause, wherein the fuel is a cryogenic fuel and the fuel tank is a cryogenic fuel tank for storing the fuel in the liquid phase.

The turbine engine of any preceding clause, wherein the fuel is hydrogen fuel.

The turbine engine of any preceding clause, further comprising a fuel bypass flow path selectively operable to redirect the fuel and to bypass the fuel heat exchanger.

The turbine engine of the preceding clause, further comprising a fuel bypass valve positioned in the fuel delivery assembly upstream of the fuel heat exchanger and selectively operable to redirect at least a portion of the fuel through the fuel bypass flow path.

The turbine engine of any preceding clause, further comprising a boiler and a steam turbine. The turbine is located downstream of the combustor to receive the combustion gases and to cause the turbine to rotate. The turbine is coupled to the core shaft to rotate the core shaft when the turbine rotates. The condenser is located downstream of the turbine to receive the combustion gases from the turbine. The boiler is fluidly connected to the condenser to receive the water and is fluidly connected to the combustor to receive the combustion gases and to boil the water to generate steam. The steam turbine is fluidly coupled to the boiler to receive the steam from the boiler and to rotate the steam turbine. The steam turbine is coupled to the core shaft to rotate the core shaft when the steam turbine rotates.

The turbine engine of any preceding clause, wherein the combustor is fluidly coupled to the steam turbine to receive the steam from the steam turbine and to inject the steam into the combustor.

The turbine engine of any preceding clause, wherein the core shaft is a low-pressure shaft and the turbine is a low-pressure turbine.

The turbine engine of any preceding clause, further comprising a low-pressure compressor connected to the low-pressure shaft to be driven by the low-pressure turbine and the steam turbine.

The turbine engine of any preceding clause, wherein the fan shaft is coupled to the low-pressure shaft to be driven by the low-pressure shaft.

The turbine engine of any preceding clause, comprising a bypass airflow passage, a first portion of air flowing into the fan and flowing through the bypass airflow passage as bypass air and a second portion of the air flowing into the fan and flowing through the core air flow path as core air, the condenser being located in the bypass airflow passage for bypass air to cool the combustion gases and to condense the water from the combustion gases.

The turbine engine of the preceding clause, wherein the combustor is fluidly coupled to the boiler to receive the steam from the boiler and to inject the steam into the combustor.

The turbine engine of any preceding clause, further comprising a water pump in fluid communication with the boiler to direct the flow of water into the boiler.

The turbine engine of any preceding clause, wherein the condenser generates an exhaust-water mixture when condensing the water from the combustion gases, the turbine engine further comprising a water separator located downstream of the condenser, the water separator separating the water from the exhaust-water mixture.

The turbine engine of the preceding clause, further comprising a water pump in fluid communication with the water separator to receive the water from the water separator and in fluid communication with the boiler to direct the flow of water into the boiler.

The turbine engine of any preceding clause, further comprising a water pump in fluid communication with the boiler to direct the flow of water into the boiler.

The turbine engine of any preceding clause, further comprising a high-pressure shaft, a high-pressure turbine, and a high-pressure compressor. The high-pressure turbine is positioned downstream of the combustor to receive the combustion gases and to rotate the high-pressure turbine. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor is driven by the high-pressure shaft to compress the core air flowing through the core air flow path and to generate the compressed air.

The turbine engine of any preceding clause, further comprising a bypass airflow passage for bypass air, the condenser positioned in the bypass airflow passage for bypass air to cool the combustion gases and to condense the water from the combustion gases, generating a cooled exhaust.

The turbine engine of any preceding clause, wherein the water separator is a cyclonic separator.

A turbine engine comprising: a fuel delivery assembly configured to provide a flow of fuel therethrough; a turbomachine comprising a compressor, a combustor, and a turbine in serial flow order and defining a core air flowpath extending through the compressor, the combustor, and the turbine; a steam system operable with the turbomachine; a heat transfer assembly configured to transfer heat from the steam system to the flow of fuel; and a pericritical fluid sensor assembly operable with a fluid system, the fluid system being the fuel delivery assembly, the heat transfer assembly, or both, the pericritical fluid sensor assembly comprising: one or more sensors configured to generate sensor outputs corresponding to one or more phase properties of a pericritical fluid flowing through the fluid system; and a controller communicatively coupled to the one or more sensors, the controller configured to generate control commands configured to control one or more controllable components of the fluid system based at least in part on the sensor outputs; wherein the one or more sensors comprise one or more phase detection sensors, the one or more phase detection sensors comprising an acoustic sensor.

The turbine engine of any preceding clause, wherein the steam system comprises a water source and a boiler in fluid communication with the water source to receive water, the boiler further in fluid communication with the core air flowpath to receive combustion gases to boil the water and generate steam.

The turbine engine of any preceding clause, wherein the steam system further comprises a condenser in fluid communication with the boiler and in thermal communication with the heat transfer assembly, the condenser configured to condense the steam.

The turbine engine of any preceding clause, wherein the steam system further comprises a steam turbine in fluid communication with boiler to receive the steam from the boiler and to cause the steam turbine to rotate.

The turbine engine of any preceding clause, wherein the turbomachine comprises a shaft rotatable with the turbine, and wherein the steam turbine is rotatable with the shaft.

The turbine engine of any preceding clause, wherein the combustor is fluidly coupled to the steam turbine to receive the steam from the steam turbine and to inject the steam into the combustor.

The turbine engine of any preceding clause, wherein the fluid system is the heat transfer assembly, wherein the heat transfer assembly comprises a working fluid, and wherein the working fluid is in a pericritical state or supercritical state during an operation of the turbine engine.

The turbine engine of any preceding clause, wherein the working fluid is a supercritical carbon dioxide.

The turbine engine of any preceding clause, wherein the fluid system is the fuel delivery assembly, and wherein the fuel delivery assembly comprises a cryogenic fuel.

The turbine engine of any preceding clause, wherein the cryogenic fuel is a hydrogen fuel.

The turbine engine of any preceding clause, wherein the heat transfer assembly is a heat transfer loop, wherein the steam system further comprises a condenser, and wherein the turbine engine further comprises: a fuel heat exchanger thermally coupled to the flow of fuel through the fuel delivery assembly and to the condenser through the heat transfer loop.

The turbine engine of any preceding clause, wherein the heat transfer loop is fluidly connected to a passage of the condenser for a heat transfer fluid to receive heat from combustion gases and thermally connected to the fuel heat exchanger for the heat transfer fluid to transfer heat from the heat transfer fluid to the fuel and cool the heat transfer fluid.

The turbine engine of any preceding clause, wherein the steam system further comprises a condenser, and wherein the turbine engine further comprises: a fuel heat exchanger thermally coupled to the flow of fuel through the fuel delivery assembly and to the condenser through the heat transfer assembly, and wherein the heat transfer assembly comprises: a plurality of heat transfer loops thermally coupling the condenser with the fuel heat exchanger to transfer heat from the condenser to the fuel heat exchanger, the at least one heat transfer loop being a first heat transfer loop of the plurality of heat transfer loops and the heat transfer fluid flowing through the first heat transfer loop being a first heat transfer fluid; and an intermediate heat exchanger that is fluidly coupled to first heat transfer loop to receive the first heat transfer fluid heated by the condenser, wherein heat is transferred from the first heat transfer fluid to a second heat transfer fluid in the intermediate heat exchanger.

The turbine engine of any preceding clause, wherein the plurality of heat transfer loops includes a second heat transfer loop fluidly coupling the intermediate heat exchanger with the fuel heat exchanger, the second heat transfer fluid flowing through the second heat transfer loop to transfer heat from the second heat transfer fluid to the fuel and to cool the heat transfer fluid.

The turbine engine of any preceding clause, wherein the acoustic sensor comprises a speed of sound sensor, the speed of sound sensor comprising an ultrasonic transducer configured to emit sound waves, and a receiver configured to receive the sound waves and covert the sound waves into electrical signals.

The turbine engine of any preceding clause, wherein the controller is configured to determine one or more phase properties of the pericritical fluid based at least in part on the sensor outputs.

The turbine engine of any preceding clause, wherein the one or more sensors comprise one or more temperature sensors and/or one or more pressure sensors.

The turbine engine of any preceding clause, wherein the sensor outputs comprise phase detection sensor outputs generated by the one or more phase detection sensors, and at least one of: temperature sensor outputs generated by the one or more temperature sensors, and pressure sensor outputs generated by the one or more pressure sensors; and herein the controller is configured to determine one or more phase properties of the pericritical fluid based at least in part on the phase detection sensor outputs in combination with at least one of: the temperature sensor outputs and the pressure sensor outputs.

The turbine engine of any preceding clause, wherein the one or more phase properties of the pericritical fluid comprises a phase change and a phase state corresponding to the phase change, and wherein the controller is configured to determine an occurrence of the phase change based at least in part on the phase detection sensor outputs, and wherein the controller is configured to determine the phase state corresponding to the phase change based at least in part on at least one of: the temperature sensor outputs and the pressure sensor outputs.

The turbine engine of any preceding clause, wherein the acoustic sensor comprises a speed of sound sensor, the speed of sound sensor comprising an ultrasonic transducer configured to emit sound waves, and a receiver configured to receive the sound waves and covert the sound waves into electrical signals.

What is claimed is:

1. A turbine engine comprising:
    a fuel delivery assembly configured to provide a flow of fuel therethrough;
    a turbomachine comprising a compressor, a combustor, and a turbine in serial flow order and defining a core air flowpath extending through the compressor, the combustor, and the turbine;
    a steam system operable with the turbomachine;
    a heat transfer assembly configured to transfer heat from the steam system to the flow of fuel; and
    a pericritical fluid sensor assembly operable with a fluid system, the fluid system being the fuel delivery assembly, the heat transfer assembly, or both, the pericritical fluid sensor assembly comprising:
        one or more sensors configured to generate sensor outputs corresponding to one or more phase properties of a pericritical fluid flowing through the fluid system; and
        a controller communicatively coupled to the one or more sensors, the controller configured to generate control commands configured to control one or more controllable components of the fluid system based at least in part on the sensor outputs;
        wherein the one or more sensors comprise one or more phase detection sensors, the one or more phase detection sensors comprising an acoustic sensor.

2. The turbine engine of claim 1, wherein the steam system comprises a water source and a boiler in fluid communication with the water source to receive water, the boiler further in fluid communication with the core air flowpath to receive combustion gases to boil the water and generate steam.

3. The turbine engine of claim 2, wherein the steam system further comprises a condenser in fluid communication with the boiler and in thermal communication with the heat transfer assembly, the condenser configured to condense the steam.

4. The turbine engine of claim 2, wherein the steam system further comprises a steam turbine in fluid communication with boiler to receive the steam from the boiler and to cause the steam turbine to rotate.

5. The turbine engine of claim 4, wherein the turbomachine comprises a shaft rotatable with the turbine, and wherein the steam turbine is rotatable with the shaft.

6. The turbine engine of claim 4, wherein the combustor is fluidly coupled to the steam turbine to receive the steam from the steam turbine and to inject the steam into the combustor.

7. The turbine engine of claim 1, wherein the fluid system is the heat transfer assembly, wherein the heat transfer assembly comprises a working fluid, and wherein the working fluid is in a pericritical state or supercritical state during an operation of the turbine engine.

8. The turbine engine of claim 7, wherein the working fluid is a supercritical carbon dioxide.

9. The turbine engine of claim 1, wherein the fluid system is the fuel delivery assembly, and wherein the fuel delivery assembly comprises a cryogenic fuel.

10. The turbine engine of claim 9, wherein the cryogenic fuel is a hydrogen fuel.

11. The turbine engine of claim 1, wherein the heat transfer assembly is a heat transfer loop, wherein the steam system further comprises a condenser, and wherein the turbine engine further comprises:
    a fuel heat exchanger thermally coupled to the flow of fuel through the fuel delivery assembly and to the condenser through the heat transfer loop.

12. The turbine engine of claim 11, wherein the heat transfer loop is fluidly connected to a passage of the condenser for a heat transfer fluid to receive heat from combustion gases and thermally connected to the fuel heat exchanger for the heat transfer fluid to transfer heat from the heat transfer fluid to the fuel and cool the heat transfer fluid.

13. The turbine engine of claim 12, wherein the steam system further comprises a condenser, and wherein the turbine engine further comprises:
    a fuel heat exchanger thermally coupled to the flow of fuel through the fuel delivery assembly and to the condenser through the heat transfer assembly, and wherein the heat transfer assembly comprises:
        a plurality of heat transfer loops thermally coupling the condenser with the fuel heat exchanger to transfer heat from the condenser to the fuel heat exchanger, the at least one heat transfer loop being a first heat transfer loop of the plurality of heat transfer loops and the heat transfer fluid flowing through the first heat transfer loop being a first heat transfer fluid; and
        an intermediate heat exchanger that is fluidly coupled to first heat transfer loop to receive the first heat transfer fluid heated by the condenser, wherein heat is transferred from the first heat transfer fluid to a second heat transfer fluid in the intermediate heat exchanger.

14. The turbine engine of claim 13, wherein the plurality of heat transfer loops includes a second heat transfer loop fluidly coupling the intermediate heat exchanger with the fuel heat exchanger, the second heat transfer fluid flowing through the second heat transfer loop to transfer heat from the second heat transfer fluid to the fuel and to cool the heat transfer fluid.

15. The turbine engine of claim 1, wherein the acoustic sensor comprises a speed of sound sensor, the speed of sound sensor comprising an ultrasonic transducer configured to emit sound waves, and a receiver configured to receive the sound waves and covert the sound waves into electrical signals.

16. The turbine engine of claim 1, wherein the controller is configured to determine one or more phase properties of the pericritical fluid based at least in part on the sensor outputs.

17. The turbine engine of claim 1, wherein the one or more sensors comprise one or more temperature sensors and/or one or more pressure sensors.

18. The turbine engine of claim 17, wherein the sensor outputs comprise phase detection sensor outputs generated by the one or more phase detection sensors, and at least one of: temperature sensor outputs generated by the one or more temperature sensors, and pressure sensor outputs generated by the one or more pressure sensors; and wherein the controller is configured to determine one or more phase properties of the pericritical fluid based at least in part on the phase detection sensor outputs in combination with at least one of: the temperature sensor outputs and the pressure sensor outputs.

19. The turbine engine of claim 18, wherein the one or more phase properties of the pericritical fluid comprises a phase change and a phase state corresponding to the phase change, and wherein the controller is configured to determine an occurrence of the phase change based at least in part on the phase detection sensor outputs, and wherein the controller is configured to determine the phase state corresponding to the phase change based at least in part on at least one of: the temperature sensor outputs and the pressure sensor outputs.

20. The turbine engine of claim 1, wherein the acoustic sensor comprises a speed of sound sensor, the speed of sound sensor comprising an ultrasonic transducer configured to emit sound waves, and a receiver configured to receive the sound waves and covert the sound waves into electrical signals.

* * * * *